United States Patent
Roberts et al.

(10) Patent No.: US 12,336,053 B2
(45) Date of Patent: Jun. 17, 2025

(54) SYSTEM AND METHOD FOR IoT DEVICE IDENTIFICATION AND INITIALIZATION USING BLUETOOTH ADVERTISING CHANNELS

(71) Applicant: AFERO, INC., Los Altos, CA (US)

(72) Inventors: Dave Roberts, Los Altos, CA (US); Kerry Quinn, Santa Cruz, CA (US)

(73) Assignee: Afero, Inc., Los Altos, CA (US)

( * ) Notice: Subject to any disclaimer, the term of this patent is extended or adjusted under 35 U.S.C. 154(b) by 321 days.

(21) Appl. No.: 17/748,603

(22) Filed: May 19, 2022

(65) Prior Publication Data

US 2023/0379683 A1 Nov. 23, 2023

(51) Int. Cl.
*H04W 8/00* (2009.01)
*H04W 4/80* (2018.01)
*H04W 12/04* (2021.01)
*H04W 76/14* (2018.01)
*H04L 9/40* (2022.01)

(52) U.S. Cl.
CPC ............ *H04W 8/005* (2013.01); *H04W 4/80* (2018.02); *H04W 12/04* (2013.01); *H04W 76/14* (2018.02); *H04L 63/062* (2013.01)

(58) Field of Classification Search
CPC ....... H04W 8/005; H04W 4/80; H04W 12/04; H04W 76/14; H04W 4/70; H04W 12/50; H04L 63/062
USPC ........................................................ 455/414
See application file for complete search history.

(56) References Cited

U.S. PATENT DOCUMENTS

| | | | | |
|---|---|---|---|---|
| 2017/0004381 | A1* | 1/2017 | Rantaeskola | H04B 10/11 |
| 2019/0025771 | A1* | 1/2019 | Park | G05B 15/02 |
| 2019/0163707 | A1* | 5/2019 | Whigham | G06F 21/6218 |
| 2020/0169460 | A1* | 5/2020 | Bartlett | H04W 12/50 |

FOREIGN PATENT DOCUMENTS

WO      2019/067630 A1      4/2019

OTHER PUBLICATIONS

International Search Report and Written Opinion, PCT App. No. PCT/US23/22788, Aug. 23, 2023, 11 pages.

* cited by examiner

*Primary Examiner* — Tanmay K Shah
(74) *Attorney, Agent, or Firm* — Nicholson De Vos Webster & Elliott LLP

(57) ABSTRACT

A system and method are described for identifying an IoT device model from a key broadcast in an advertising channel. For example, one embodiment of a system comprises: a target Internet of Things (IoT) device to transmit a key over a Bluetooth (BT) advertising channel, the key associated with a model of the target IoT device; mobile application program code which, when installed on a mobile device, is to cause the mobile device to listen to the BT advertising channel to extract the key; and a key dictionary to be installed on the mobile device, the key dictionary mapping each of a plurality of keys with an IoT device model and associated data, the mobile application program code to perform a lookup using the key extracted from the BT advertising channel to identify the target IoT device model and/or associated data, and to use the target IoT device model and/or associated data for onboarding the target IoT device.

24 Claims, 56 Drawing Sheets

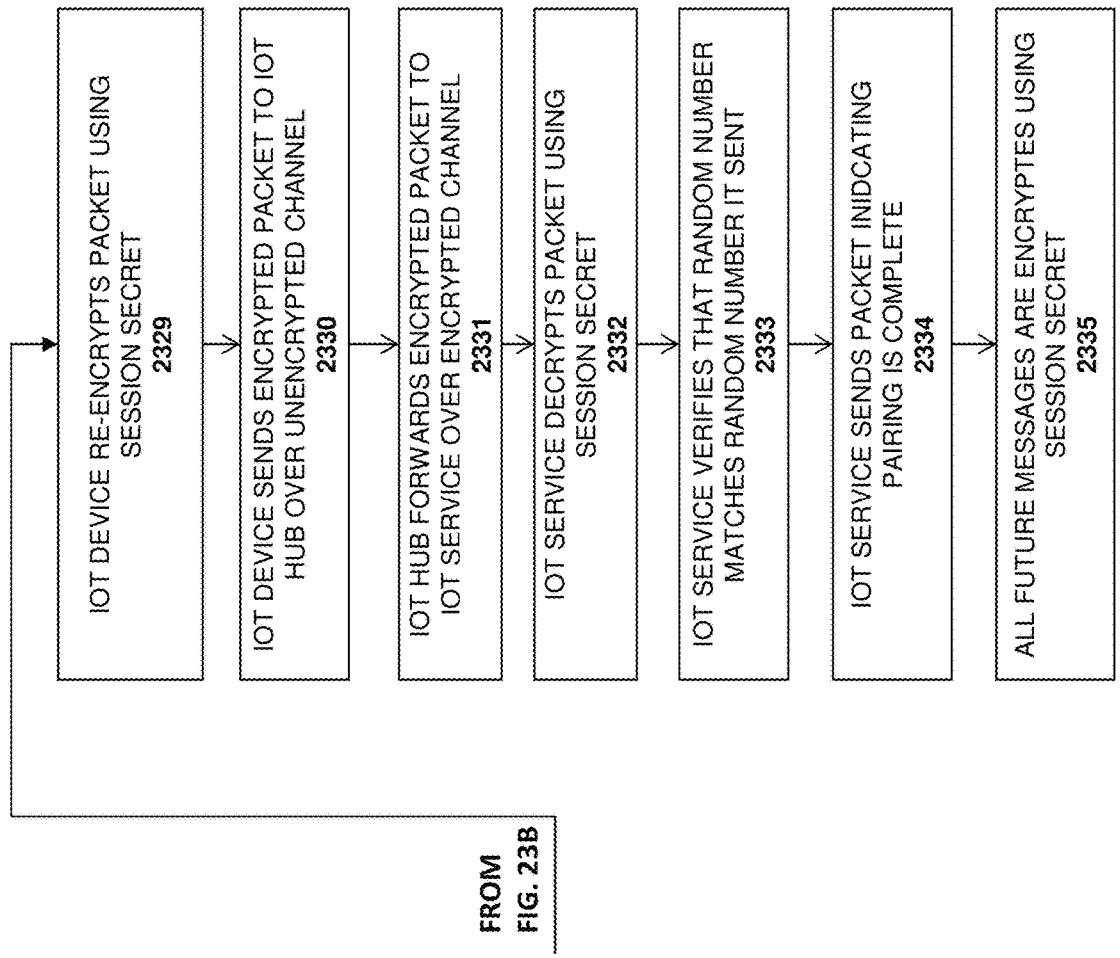

SYSTEM AND METHOD FOR IoT DEVICE IDENTIFICATION AND INITIALIZATION USING BLUETOOTH ADVERTISING CHANNELS

BACKGROUND

Field of the Invention

This invention relates generally to the field of computer systems. More particularly, the invention relates to a machine-learning-based IoT device provisioning system and method.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

BRIEF DESCRIPTION OF THE DRAWINGS

A better understanding of the present invention can be obtained from the following detailed description in conjunction with the following drawings, in which:

FIGS. 23A-C illustrate a method for secure pairing in accordance with one embodiment of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
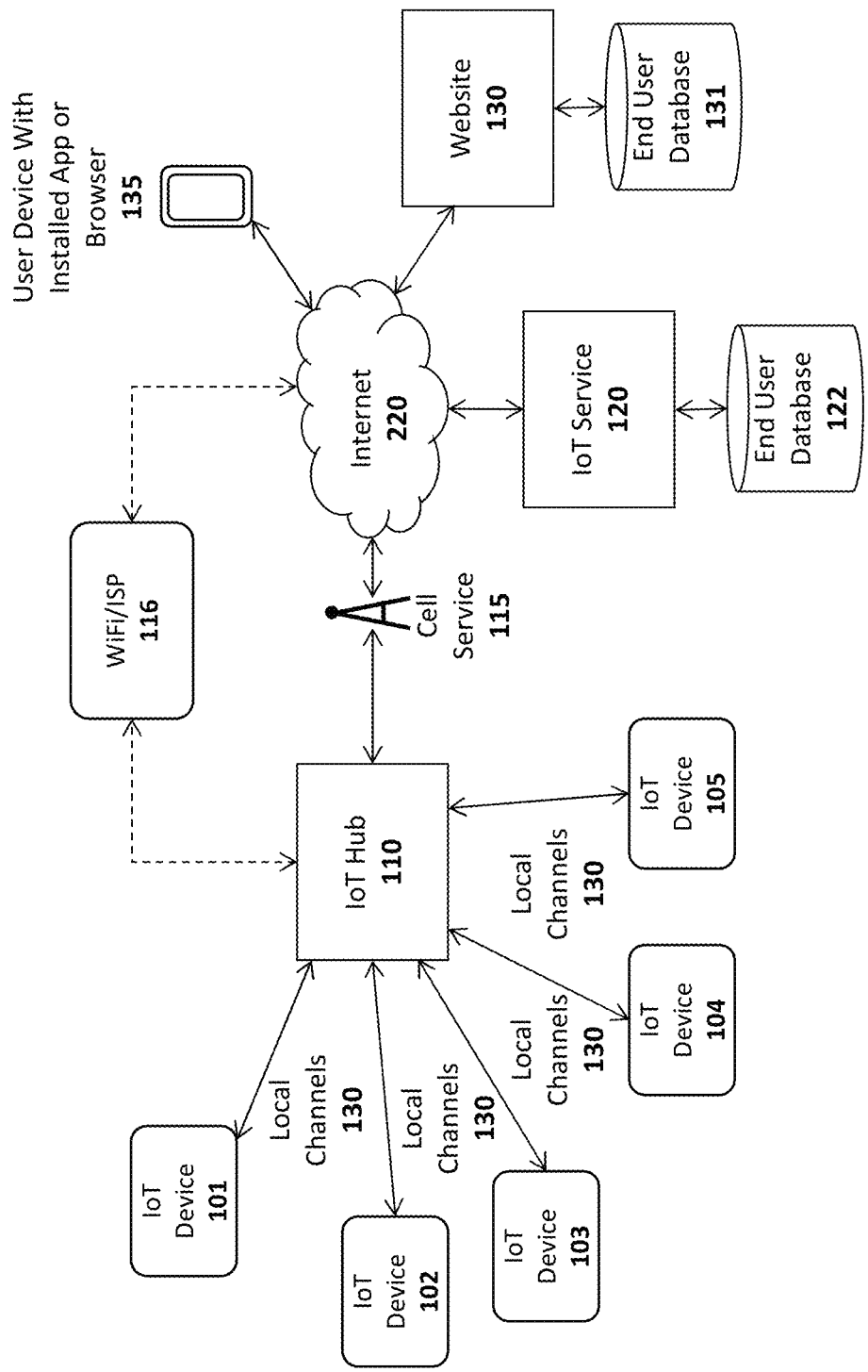
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectore, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
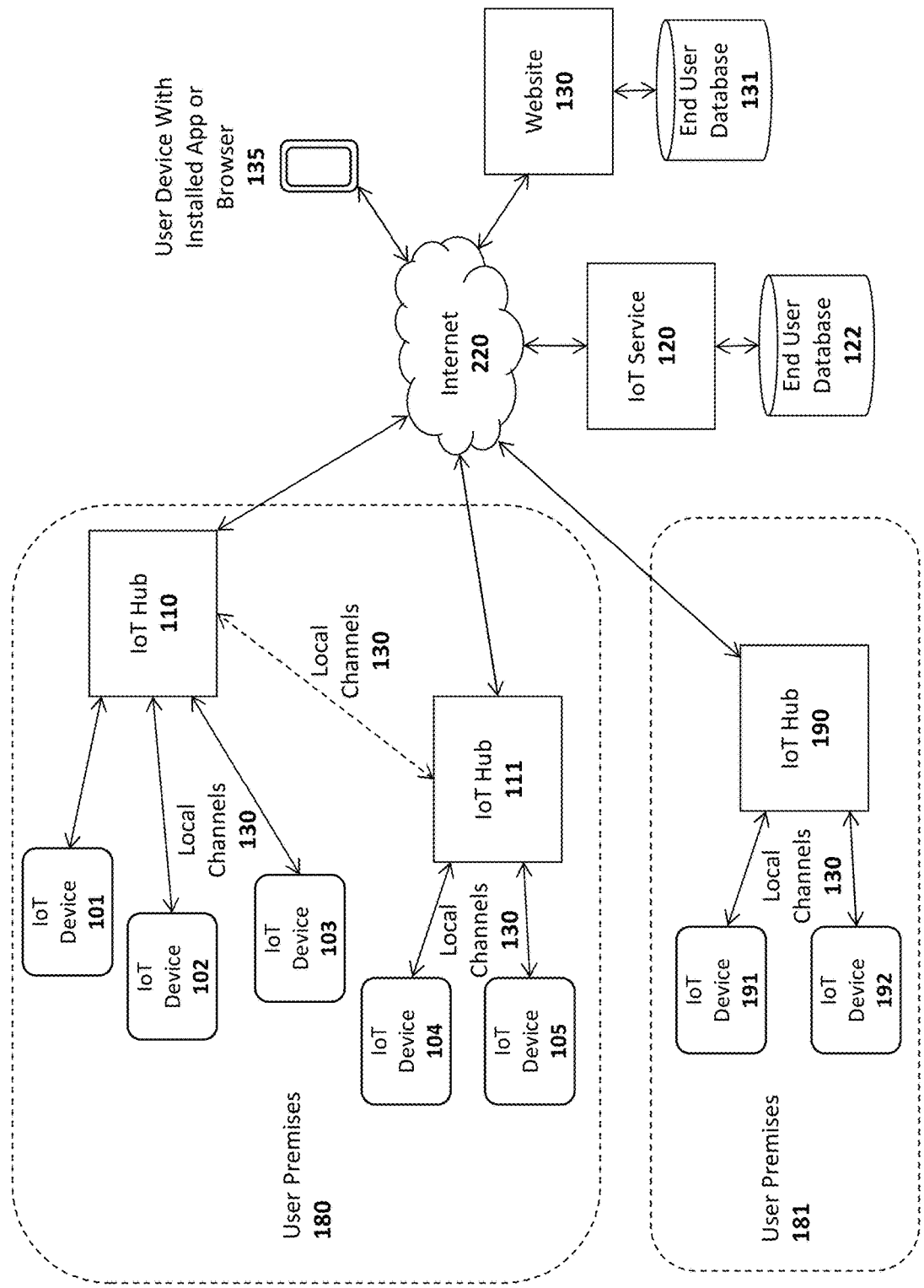

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
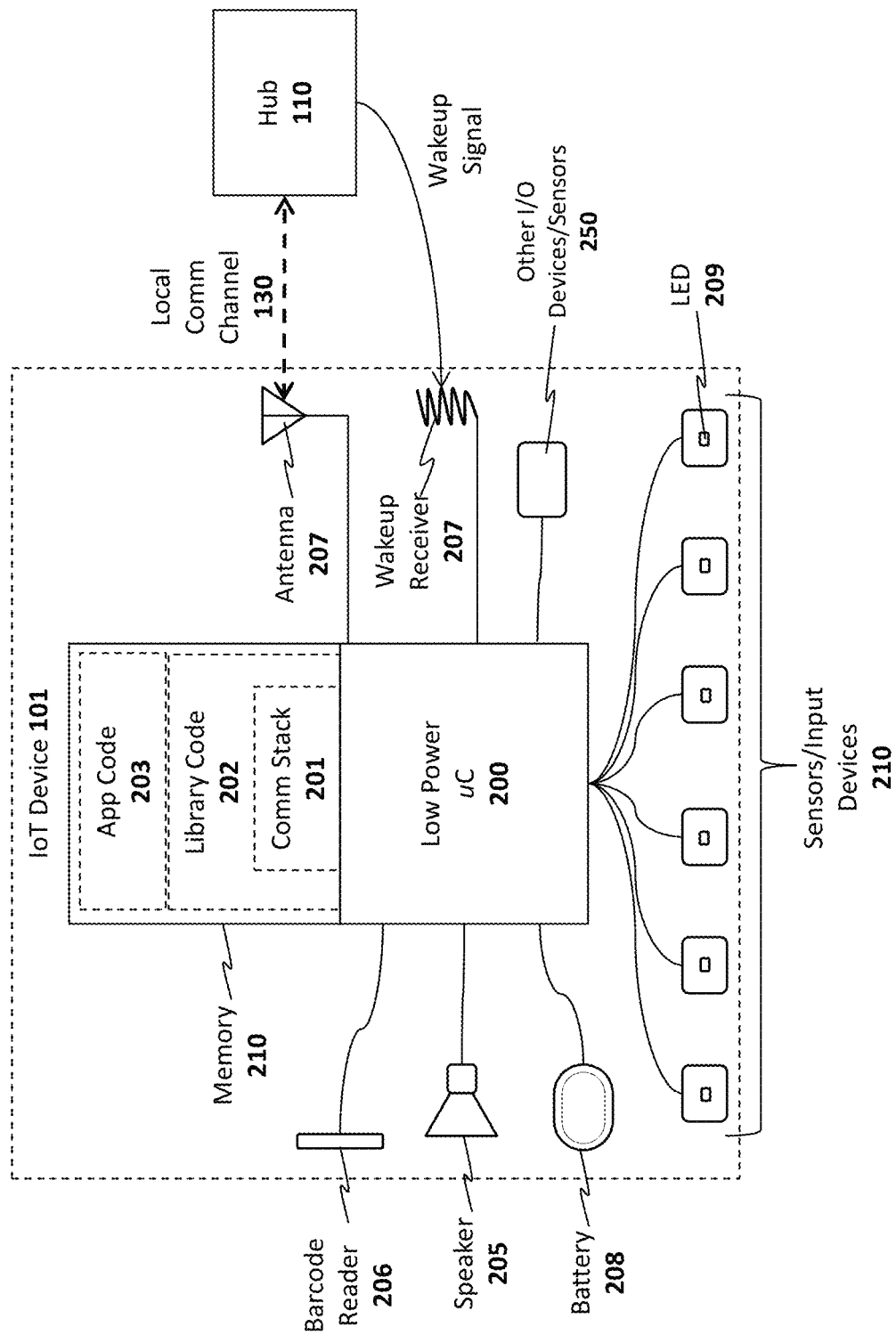
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
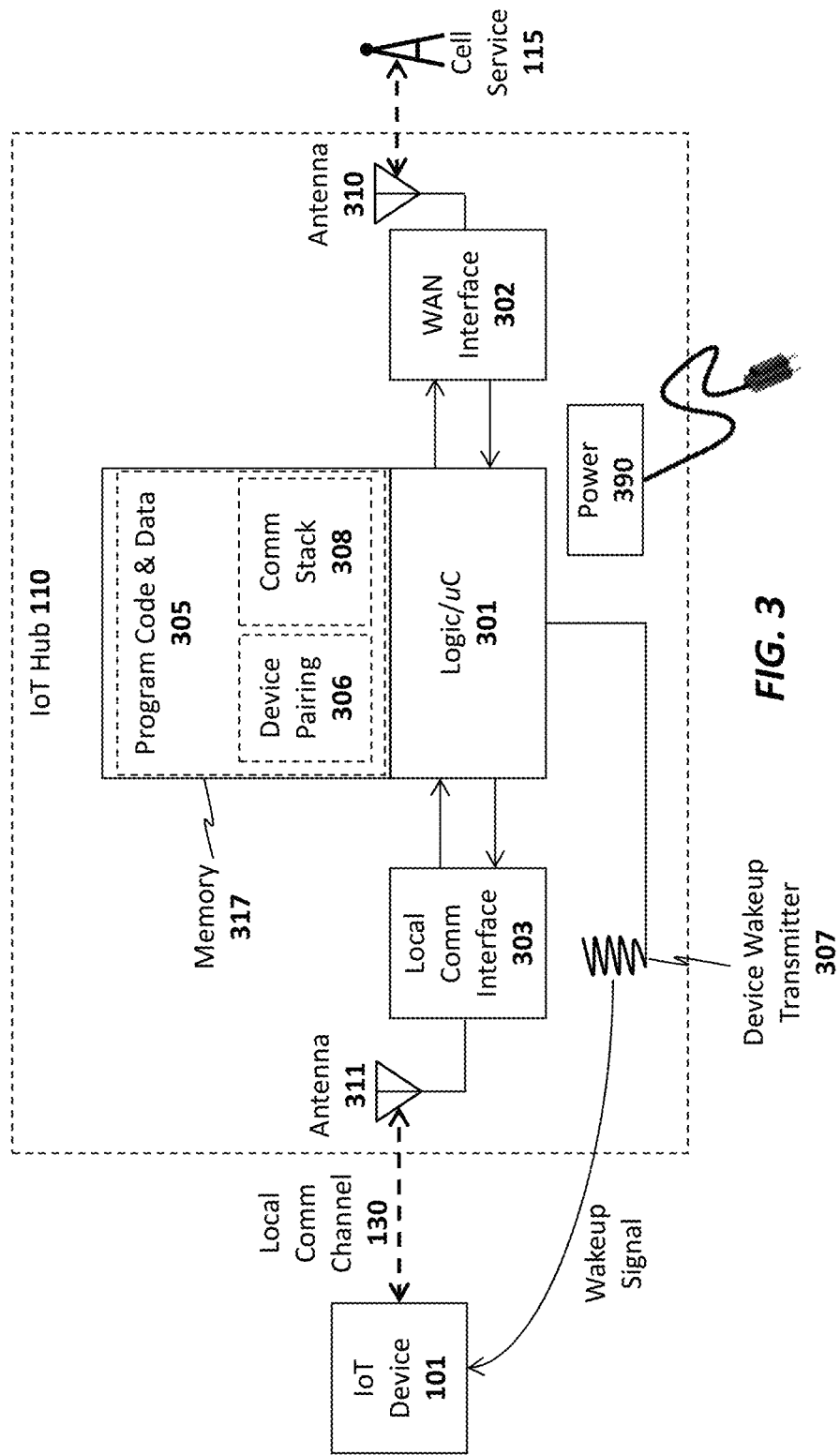
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
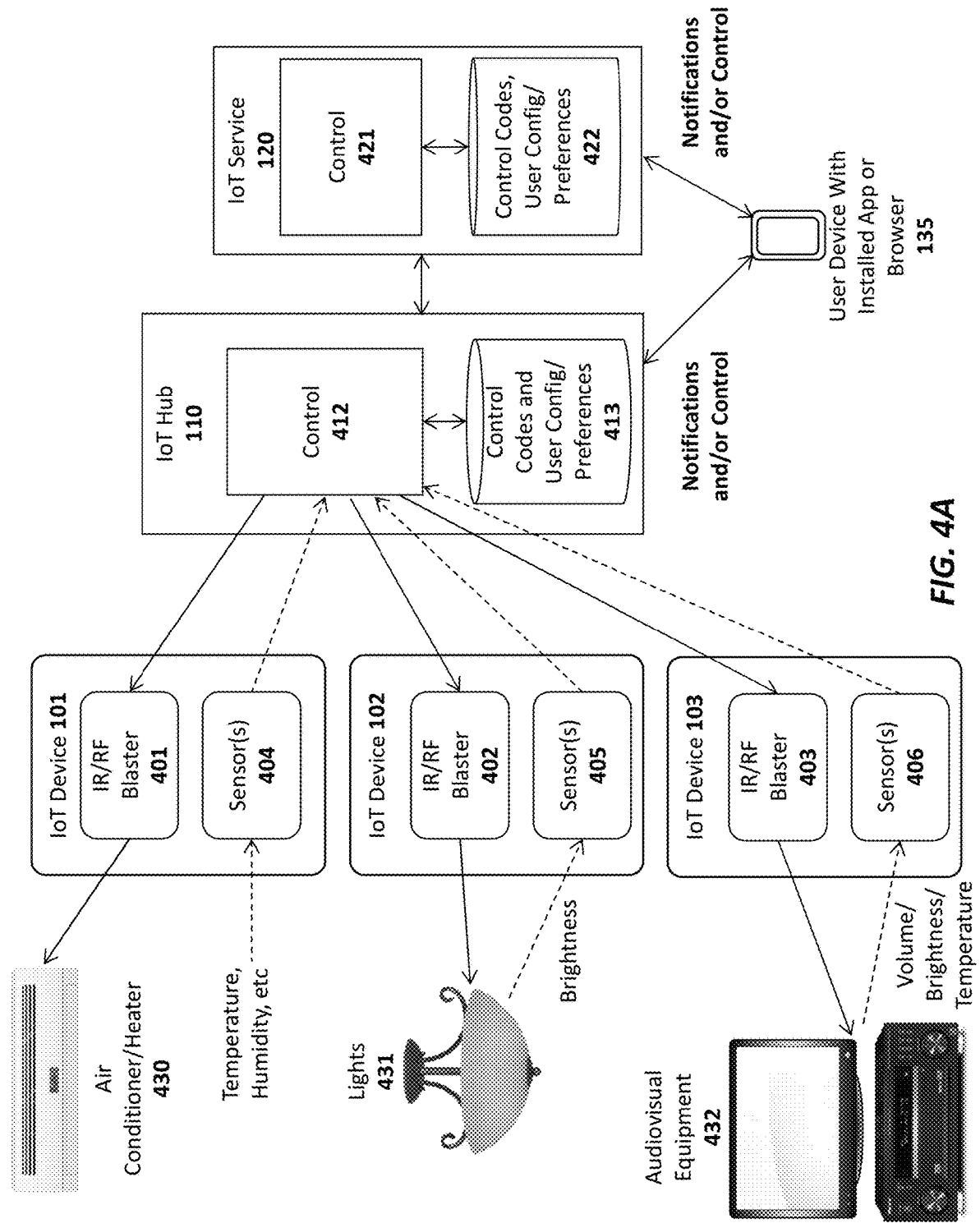
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
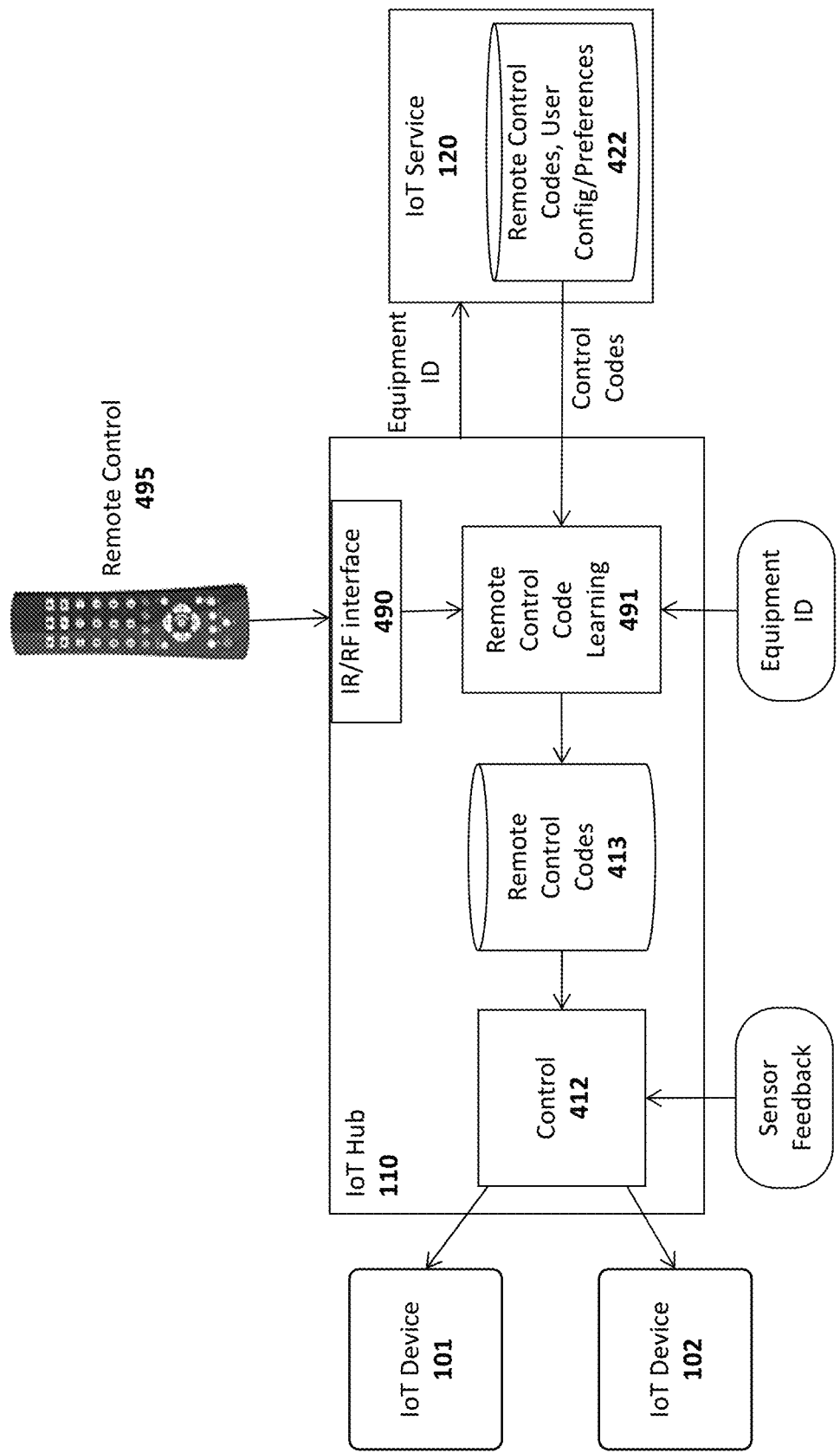

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
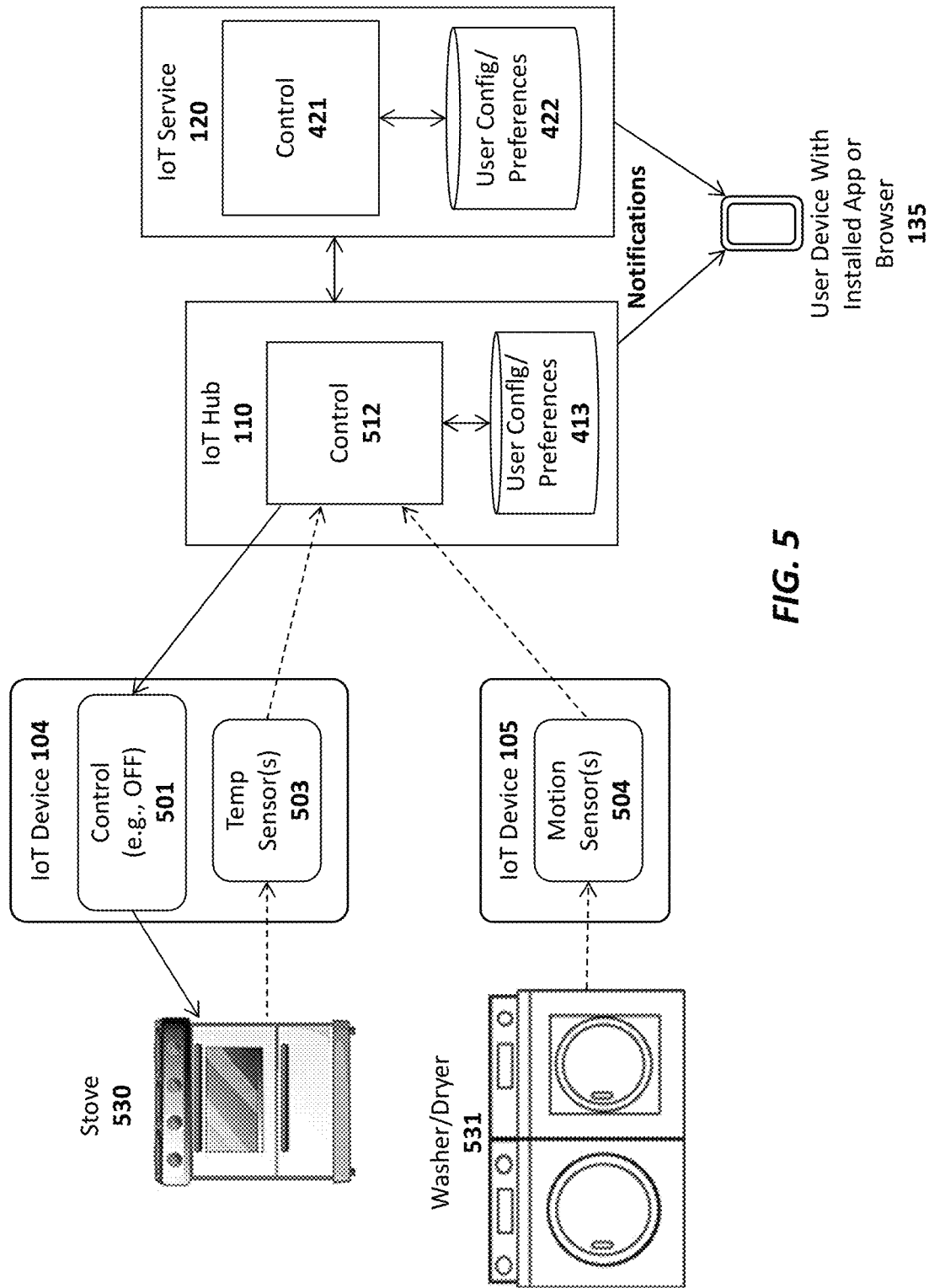
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Apparatus and Method for Communicating Data Through an Intermediary Device

As mentioned above, because the wireless technologies used to interconnect IoT devices such as Bluetooth LE are generally short range technologies, if the hub for an IoT implementation is outside the range of an IoT device, the IoT device will not be able to transmit data to the IoT hub (and vice versa).

To address this deficiency, one embodiment of the invention provides a mechanism for an IoT device which is outside of the wireless range of the IoT hub to periodically connect with one or more mobile devices when the mobile devices are within range. Once connected, the IoT device can transmit any data which needs to be provided to the IoT hub to the mobile device which then forwards the data to the IoT hub.

Figure 6:
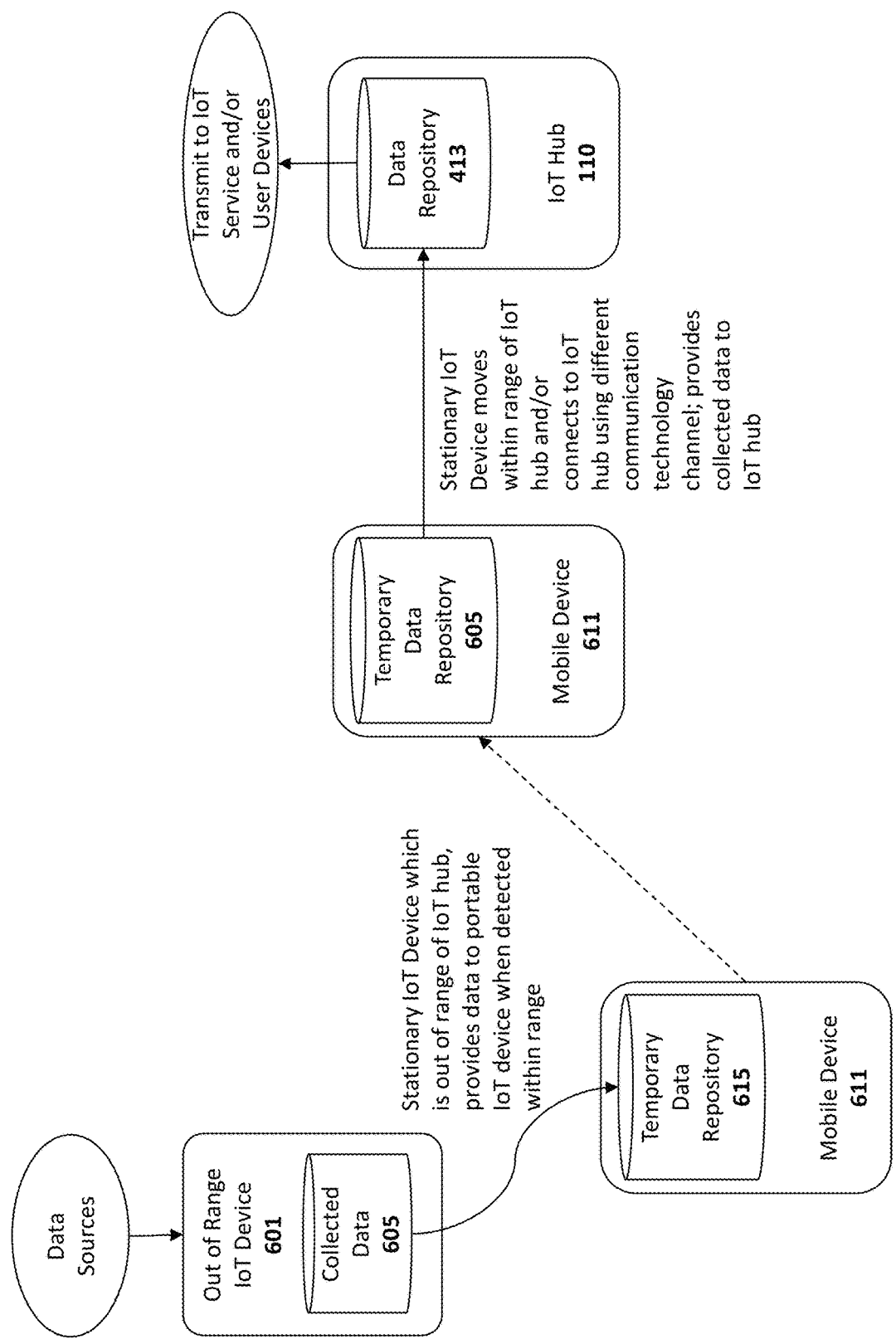
FIG. 6 illustrates one embodiment of a system in which an intermediary mobile device collects data from a stationary IoT device and provides the data to an IoT hub.

As illustrated in FIG. 6 one embodiment includes an IoT hub 110, an IoT device 601 which is out of range of the IoT hub 110 and a mobile device 611. The out of range IoT device 601 may include any form of IoT device capable of collecting and communicating data. For example, the IoT device 601 may comprise a data collection device configured within a refrigerator to monitor the food items available in the refrigerator, the users who consume the food items, and the current temperature. Of course, the underlying principles of the invention are not limited to any particular type of IoT device. The techniques described herein may be implemented using any type of IoT device including those used to collect and transmit data for smart meters, stoves, washers, dryers, lighting systems, HVAC systems, and audiovisual equipment, to name just a few.

Moreover, the mobile device In operation, the IoT device 611 illustrated in FIG. 6 may be any form of mobile device capable of communicating and storing data. For example, in one embodiment, the mobile device 611 is a smartphone with an app installed thereon to facilitate the techniques described herein. In another embodiment, the mobile device 611 comprises a wearable device such as a communication token affixed to a neckless or bracelet, a smartwatch or a fitness device. The wearable token may be particularly useful for elderly users or other users who do not own a smartphone device.

In operation, the out of range IoT device 601 may periodically or continually check for connectivity with a mobile device 611. Upon establishing a connection (e.g., as the result of the user moving within the vicinity of the refrigerator) any collected data 605 on the IoT device 601 is automatically transmitted to a temporary data repository 615 on the mobile device 611. In one embodiment, the IoT device 601 and mobile device 611 establish a local wireless communication channel using a low power wireless standard such as BTLE. In such a case, the mobile device 611 may initially be paired with the IoT device 601 using known pairing techniques.

One the data has been transferred to the temporary data repository, the mobile device 611 will transmit the data once communication is established with the IoT hub 110 (e.g., when the user walks within the range of the IoT hub 110). The IoT hub may then store the data in a central data repository 413 and/or send the data over the Internet to one or more services and/or other user devices. In one embodiment, the mobile device 611 may use a different type of communication channel to provide the data to the IoT hub 110 (potentially a higher power communication channel such as WiFi).

Figure 7:
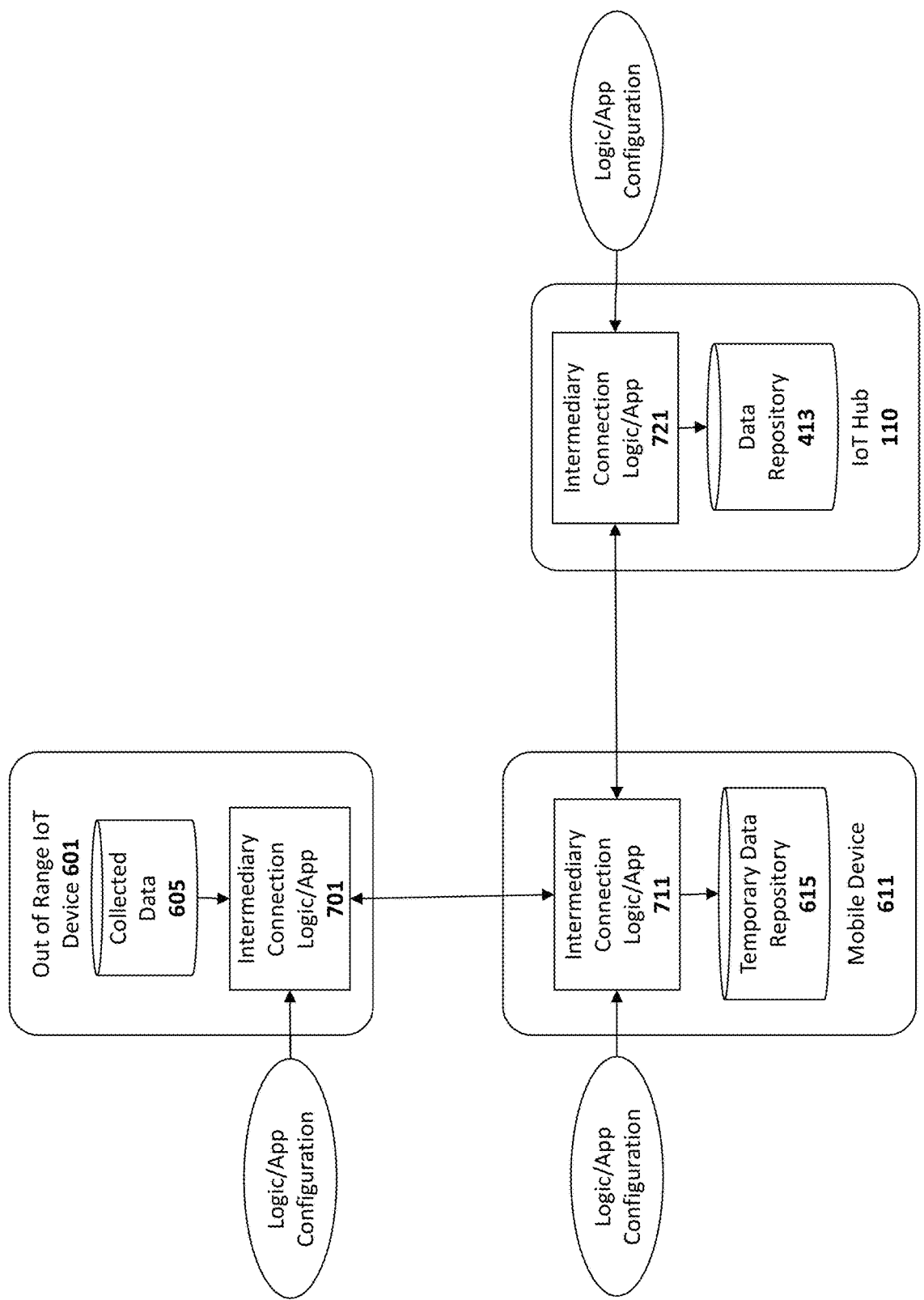
FIG. 7 illustrates intermediary connection logic implemented in one embodiment of the invention.

The out of range IoT device 601, the mobile device 611, and the IoT hub may all be configured with program code and/or logic to implement the techniques described herein. As illustrated in FIG. 7, for example, the IoT device 601 may be configured with intermediary connection logic and/or application, the mobile device 611 may be configured with an intermediary connection logic/application, and the IoT hub 110 may be configured with an intermediary connection logic/application 721 to perform the operations described herein. The intermediary connection logic/application on each device may be implemented in hardware, software, or any combination thereof. In one embodiment, the intermediary connection logic/application 701 of the IoT device 601 searches and establishes a connection with the intermediary connection logic/application 711 on the mobile device (which may be implemented as a device app) to transfer the data to the temporary data repository 615. The intermediary connection logic/application 701 on the mobile device 611 then forwards the data to the intermediary connection logic/application on the IoT hub, which stores the data in the central data repository 413.

As illustrated in FIG. 7, the intermediary connection logic/applications 701, 711, 721, on each device may be configured based on the application at hand. For example, for a refrigerator, the connection logic/application 701 may only need to transmit a few packets on a periodic basis. For other applications (e.g., temperature sensors), the connection logic/application 701 may need to transmit more frequent updates.

Rather than a mobile device 611, in one embodiment, the IoT device 601 may be configured to establish a wireless connection with one or more intermediary IoT devices, which are located within range of the IoT hub 110. In this embodiment, any IoT devices 601 out of range of the IoT hub may be linked to the hub by forming a "chain" using other IoT devices.

In addition, while only a single mobile device 611 is illustrated in FIGS. 6-7 for simplicity, in one embodiment, multiple such mobile devices of different users may be configured to communicate with the IoT device 601. Moreover, the same techniques may be implemented for multiple other IoT devices, thereby forming an intermediary device data collection system across the entire home.

Moreover, in one embodiment, the techniques described herein may be used to collect various different types of pertinent data. For example, in one embodiment, each time the mobile device 611 connects with the IoT device 601, the identity of the user may be included with the collected data 605. In this manner, the IoT system may be used to track the behavior of different users within the home. For example, if used within a refrigerator, the collected data 605 may then include the identify of each user who passes by fridge, each user who opens the fridge, and the specific food items consumed by each user. Different types of data may be collected from other types of IoT devices. Using this data the system is able to determine, for example, which user washes clothes, which user watches TV on a given day, the times at which each user goes to sleep and wakes up, etc. All of this crowd-sourced data may then be compiled within the data repository 413 of the IoT hub and/or forwarded to an external service or user.

Another beneficial application of the techniques described herein is for monitoring elderly users who may need assistance. For this application, the mobile device 611 may be a very small token worn by the elderly user to collect the information in different rooms of the user's home. Each time the user opens the refrigerator, for example, this data will be included with the collected data 605 and transferred to the IoT hub 110 via the token. The IoT hub may then provide the data to one or more external users (e.g., the children or other individuals who care for the elderly user). If data has not been collected for a specified period of time (e.g., 12 hours), then this means that the elderly user has not been moving around the home and/or has not been opening the refrigerator. The IoT hub 110 or an external service connected to the IoT hub may then transmit an alert notification to these other individuals, informing them that they should check on the elderly user. In addition, the collected data 605 may include other pertinent information such as the food being consumed by the user and whether a trip to the grocery store is needed, whether and how frequently the elderly user is watching TV, the frequency with which the elderly user washes clothes, etc.

In another implementation, the if there is a problem with an electronic device such as a washer, refrigerator, HVAC system, etc, the collected data may include an indication of a part that needs to be replaced. In such a case, a notification may be sent to a technician with a request to fix the problem. The technician may then arrive at the home with the needed replacement part.

Figure 8:
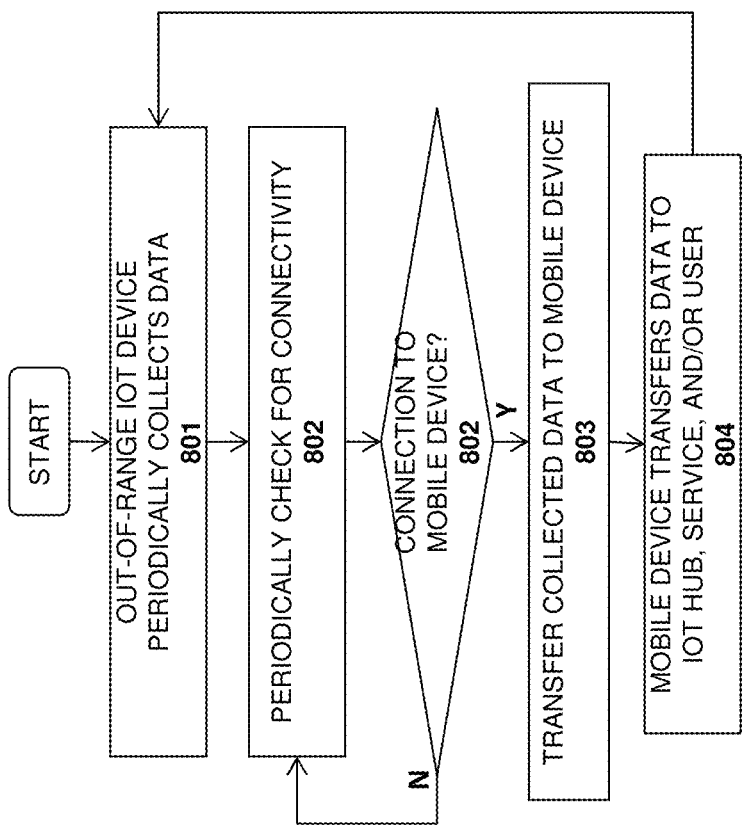
FIG. 8 illustrates a method in accordance with one embodiment of the invention.

A method in accordance with one embodiment of the invention is illustrated in FIG. 8. The method may be implemented within the context of the architectures described above, but is not limited to any particular architecture.

At 801, an IoT device which is out of range of the IoT hub periodically collects data (e.g., opening of the refrigerator door, food items used, etc). At 802 the IoT device periodically or continually checks for connectivity with a mobile device (e.g., using standard local wireless techniques for establishing a connection such as those specified by the BTLE standard). If the connection to the mobile device is established, determined at 802, then at 803, the collected data is transferred to the mobile device at 803. At 804, the mobile device transfers the data to the IoT hub, an external service and/or a user. As mentioned, the mobile device may transmit the data immediately if it is already connected (e.g., via a WiFi link).

Figure 9A:
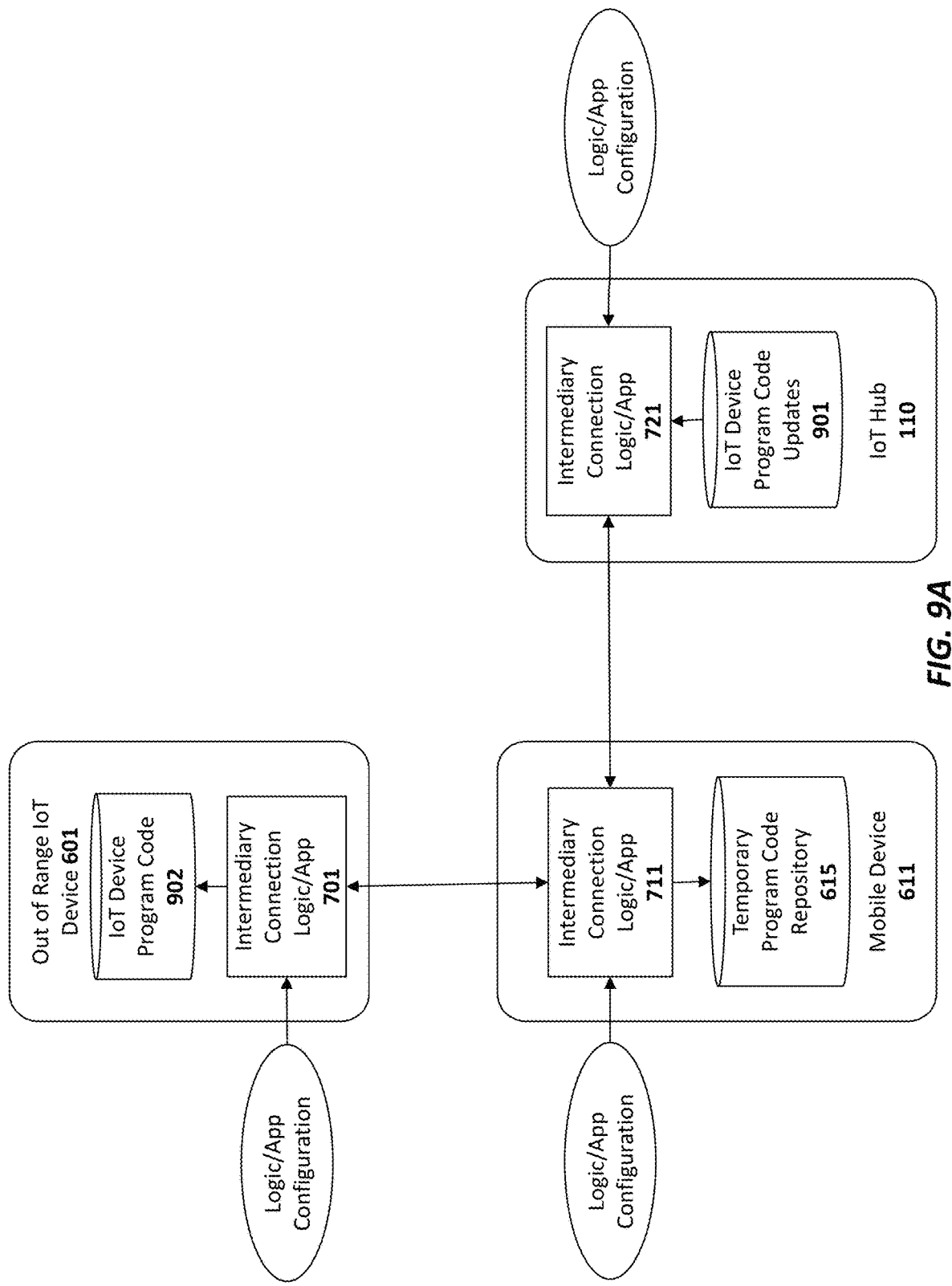
FIG. 9A illustrates an embodiment in which program code and data updates are provided to the IoT device.

In addition to collecting data from IoT devices, in one embodiment, the techniques described herein may be used to update or otherwise provide data to IoT devices. One example is shown in FIG. 9A, which shows an IoT hub 110 with program code updates 901 that need to be installed on an IoT device 601 (or a group of such IoT devices). The program code updates may include system updates, patches, configuration data and any other data needed for the IoT device to operate as desired by the user. In one embodiment, the user may specify configuration options for the IoT device 601 via a mobile device or computer which are then stored on the IoT hub 110 and provided to the IoT device using the techniques described herein. Specifically, in one embodiment, the intermediary connection logic/application 721 on the IoT hub 110 communicates with the intermediary connection logic/application 711 on the mobile device 611 to store the program code updates within a temporary storage 615. When the mobile device 611 enters the range of the IoT device 601, the intermediary connection logic/application 711 on the mobile device 611 connects with the intermediary/connection logic/application 701 on the IoT device 601 to provide the program code updates to the device. In one embodiment, the IoT device 601 may then enter into an automated update process to install the new program code updates and/or data.

Figure 9B:
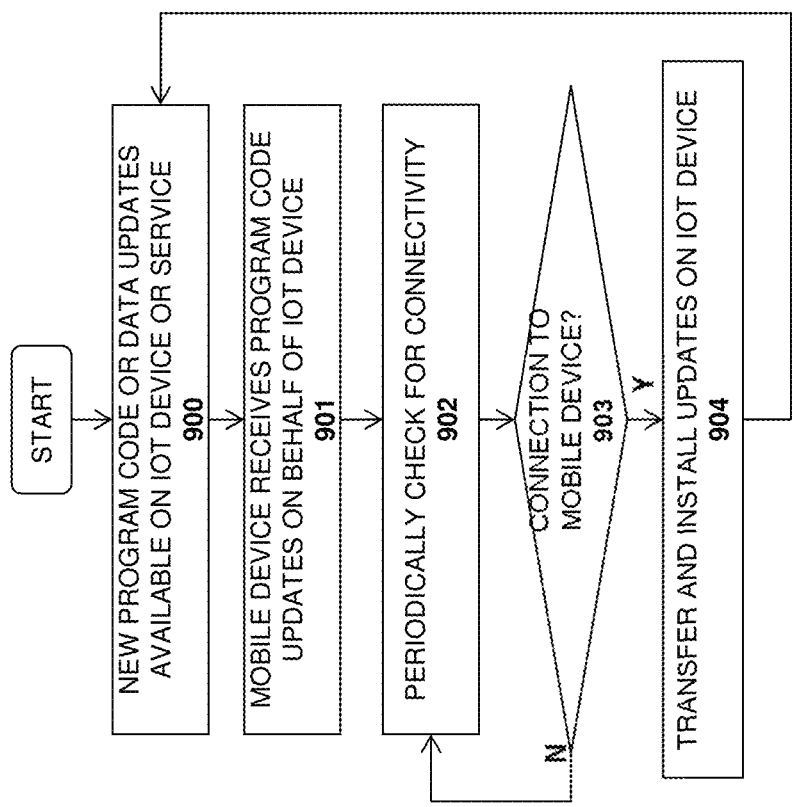
FIG. 9B illustrates an embodiment of a method in which program code and data updates are provided to the IoT device.

A method for updating an IoT device is shown in FIG. 9B. The method may be implemented within the context of the system architectures described above, but is not limited to any particular system architectures.

At 900 new program code or data updates are made available on the IoT hub and/or an external service (e.g., coupled to the mobile device over the Internet). At 901, the mobile device receives and stores the program code or data updates on behalf of the IoT device. The IoT device and/or mobile device periodically check to determine whether a connection has been established at 902. If a connection is established, determined at 903, then at 904 the updates are transferred to the IoT device and installed.

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 10-15 and associated text). Alternatively, the keys may be secured in a subscriber identify module (SIM) as discussed below.

Figure 10:
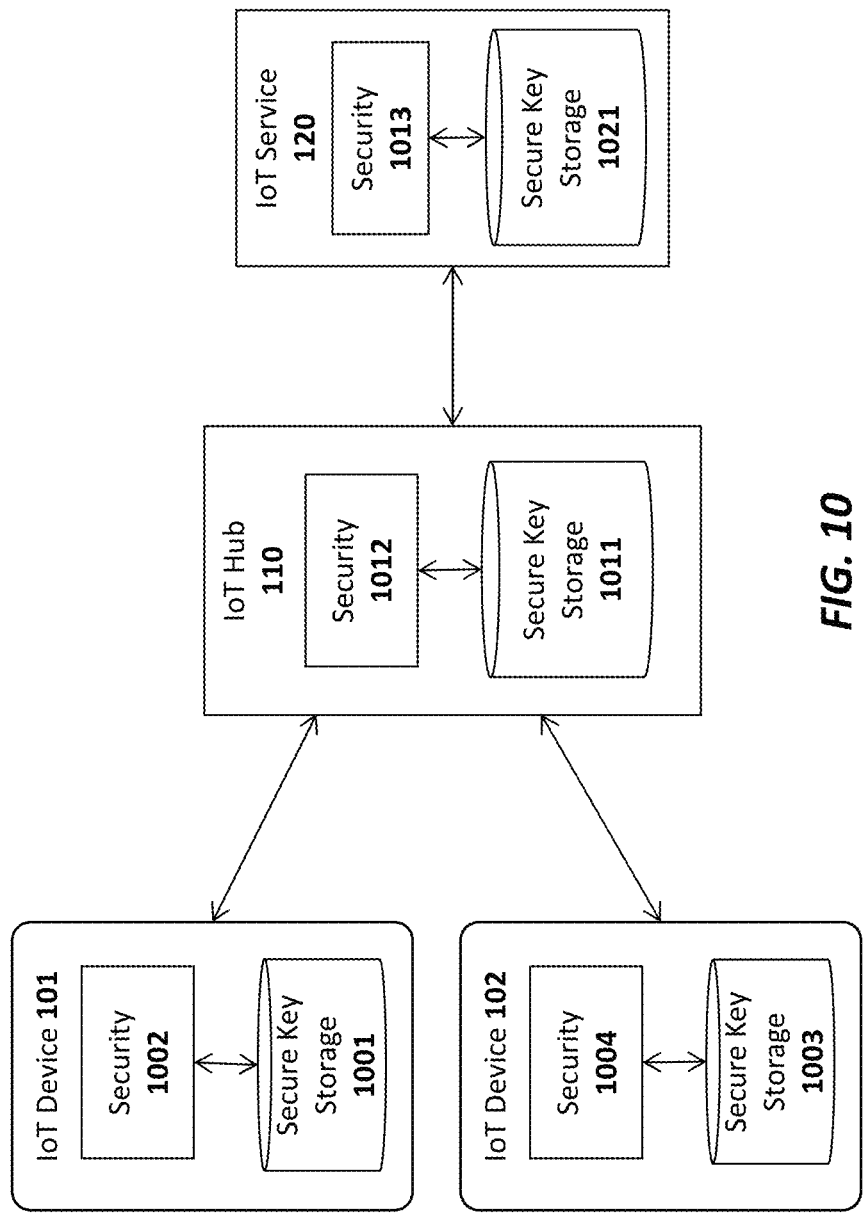
FIG. 10 illustrates a high level view of one embodiment of a security architecture.

FIG. 10 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 1001, 1003, respectively, for security storing each device's private key. Security logic 1002, 1304 then utilizes the securely stored private keys to perform the encryption/decryption operations described herein. Similarly, the IoT hub 110 includes a secure storage 1011 for storing the IoT hub private key and the public keys of the IoT devices 101-102 and the IoT service 120; as well as security logic 1012 for using the keys to perform encryption/decryption operations. Finally, the IoT service 120 may include a secure storage 1021 for security storing its own private key, the public keys of various IoT devices and IoT hubs, and a security logic 1013 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 1011.

By way of example, in one embodiment, when the IoT service 120 needs to transmit a command or data to an IoT device 101 (e.g., a command to unlock a door, a request to read a sensor, data to be processed/displayed by the IoT device, etc) the security logic 1013 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 1012 in the IoT hub is trusted, the service 120 could negotiate a session key with the hub security module 1312 and then the security module 1012 would negotiate a session key with each device 120. Messages from the service 120 would then be decrypted and verified in the hub security module 1012 before being re-encrypted for transmission to the device 101.

In one embodiment, to prevent a compromise on the hub security module 1012 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 1002 on the IoT device 101 uses the public key of the IoT hub 110 to encrypt data packets sent to the IoT hub 110. The security logic 1012 on the IoT hub 110 may then decrypt the data packets using the IoT hub's private key. Similarly, the security logic 1002 on the IoT device 101 and/or the security logic 1012 on the IoT hub 110 may encrypt data packets sent to the IoT service 120 using the public key of the IoT service 120 (which may then be decrypted by the security logic 1013 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 11:
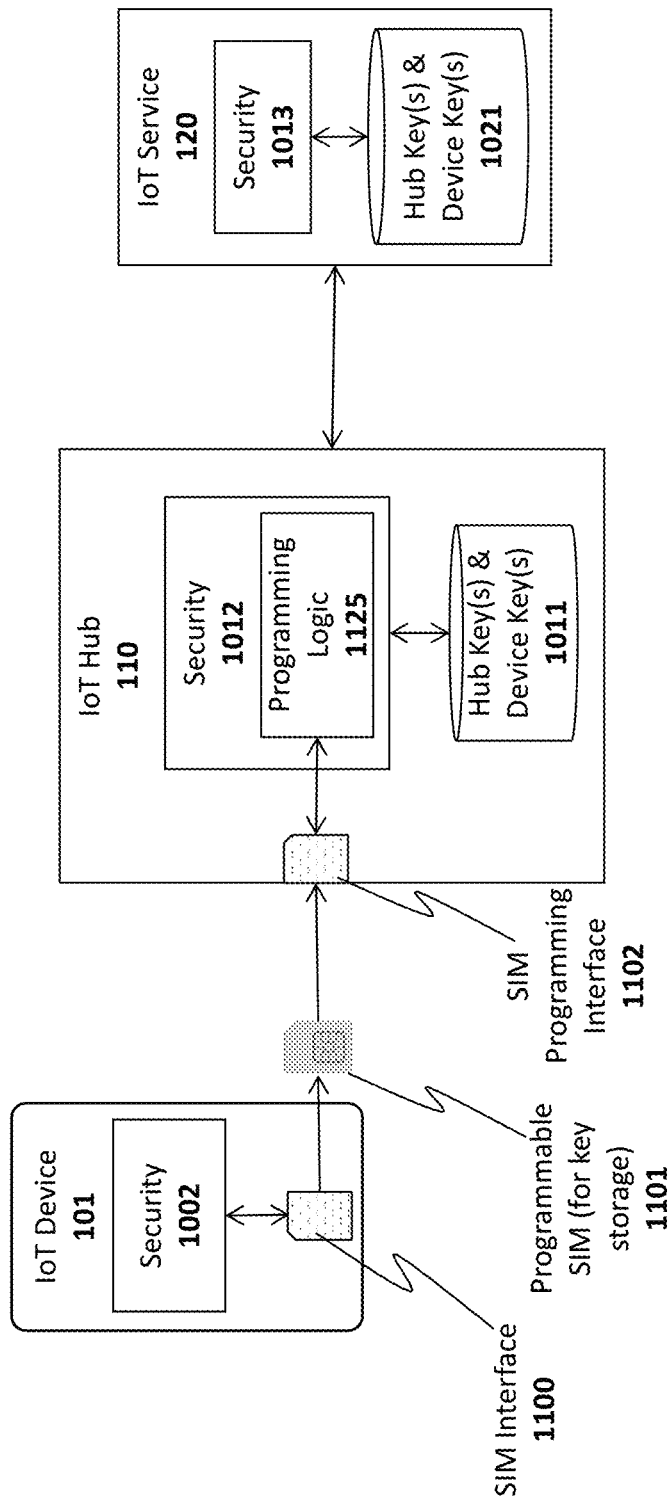
FIG. 11 illustrates one embodiment of an architecture in which a subscriber identity module (SIM) is used to store keys on IoT devices.

As illustrated in FIG. 11, in one embodiment, the secure key storage on each IoT device 101 is implemented using a programmable subscriber identity module (SIM) 1101. In this embodiment, the IoT device 101 may initially be provided to the end user with an un-programmed SIM card 1101 seated within a SIM interface 1100 on the IoT device 101. In order to program the SIM with a set of one or more encryption keys, the user takes the programmable SIM card 1101 out of the SIM interface 500 and inserts it into a SIM programming interface 1102 on the IoT hub 110. Programming logic 1125 on the IoT hub then securely programs the SIM card 1101 to register/pair the IoT device 101 with the IoT hub 110 and IoT service 120. In one embodiment, a public/private key pair may be randomly generated by the programming logic 1125 and the public key of the pair may then be stored in the IoT hub's secure storage device 411 while the private key may be stored within the programmable SIM 1101. In addition, the programming logic 525 may store the public keys of the IoT hub 110, the IoT service 120, and/or any other IoT devices 101 on the SIM card 1401 (to be used by the security logic 1302 on the IoT device 101 to encrypt outgoing data). Once the SIM 1101 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 11 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 1102 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 12A:
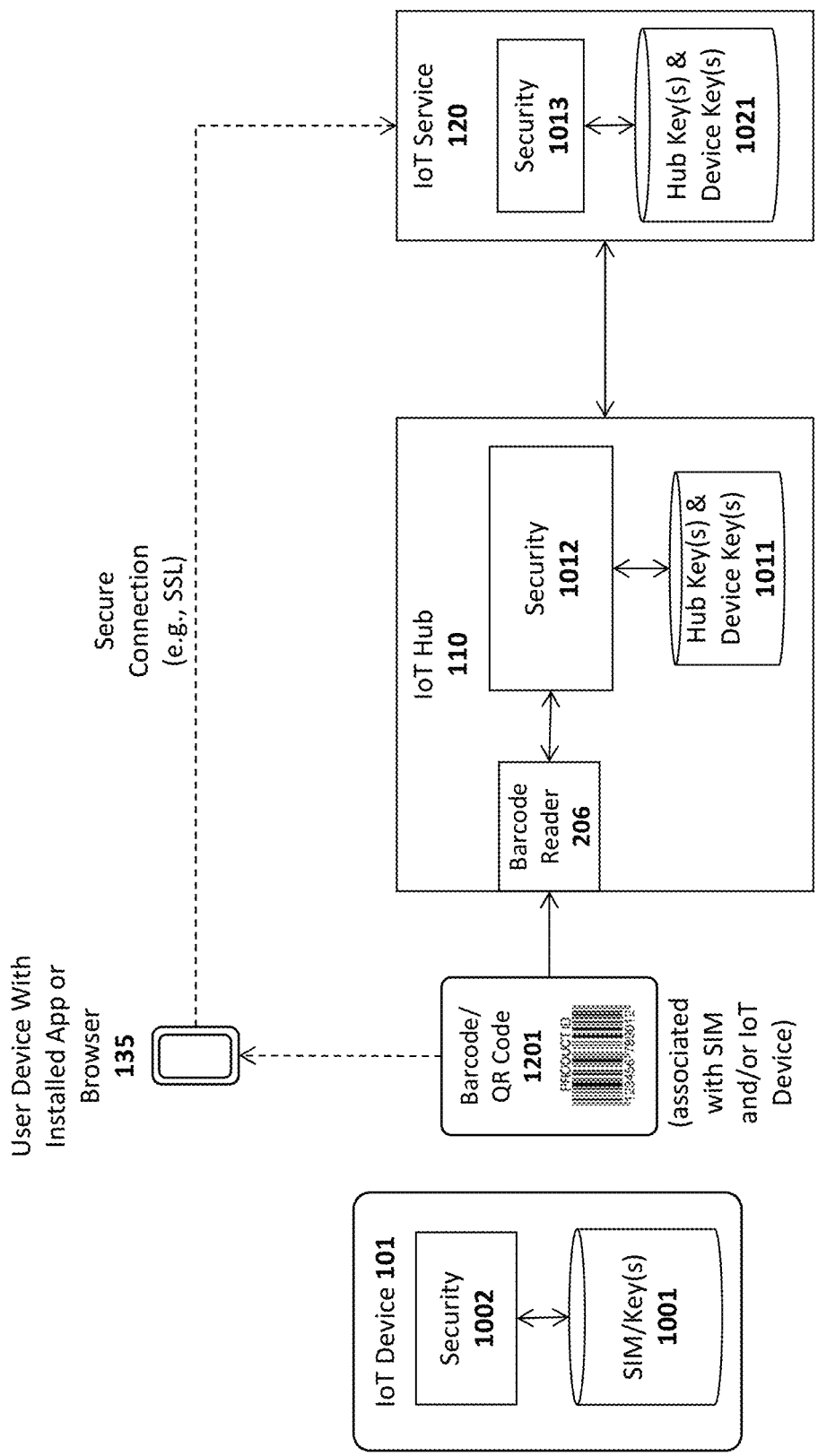
FIG. 12A illustrates one embodiment in which IoT devices are registered using barcodes or QR codes.

For example, as illustrated in FIG. 12A each IoT device 101 or SIM 401 may be packaged with a barcode or QR code 1501 uniquely identifying the IoT device 101 and/or SIM 1001. In one embodiment, the barcode or QR code 1201 comprises an encoded representation of the public key for the IoT device 101 or SIM 1001. Alternatively, the barcode or QR code 1201 may be used by the IoT hub 110 and/or IoT service 120 to identify or generate the public key (e.g., used as a pointer to the public key which is already stored in secure storage). The barcode or QR code 601 may be printed on a separate card (as shown in FIG. 12A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 1201 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 1501 may be used to pair each IoT device 101 with the IoT hub 110. For example, rather than using the standard wireless pairing process currently used to pair Bluetooth LE devices, a pairing code embedded within the barcode or QR code 1501 may be provided to the IoT hub 110 to pair the IoT hub with the corresponding IoT device.

Figure 12B:
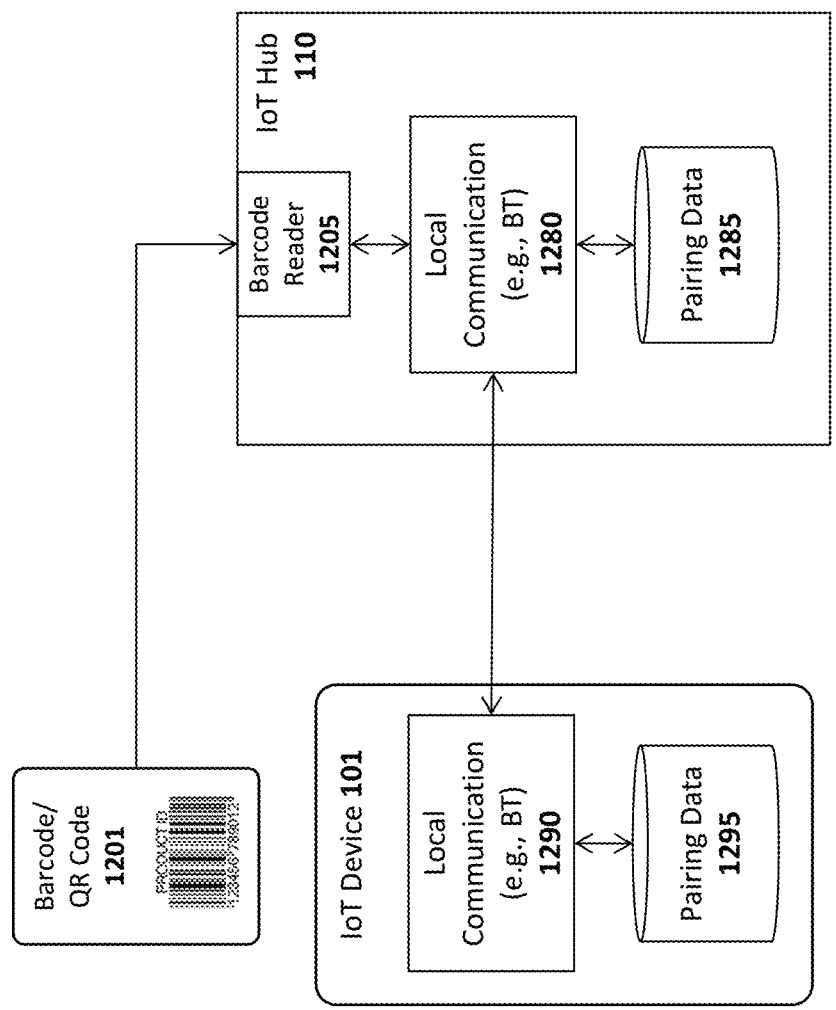
FIG. 12B illustrates one embodiment in which pairing is performed using barcodes or QR codes.

FIG. 12B illustrates one embodiment in which the barcode reader 206 on the IoT hub 110 captures the barcode/QR code 1201 associated with the IoT device 101. As mentioned, the barcode/QR code 1201 may be printed directly on the IoT device 101 or may be printed on a separate card provided with the IoT device 101. In either case, the barcode reader 206 reads the pairing code from the barcode/QR code 1201 and provides the pairing code to the local communication module 1280. In one embodiment, the local communication module 1280 is a Bluetooth LE chip and associated software, although the underlying principles of the invention are not limited to any particular protocol standard. Once the pairing code is received, it is stored in a secure storage containing pairing data 1285 and the IoT device 101 and IoT hub 110 are automatically paired. Each time the IoT hub is paired with a new IoT device in this manner, the pairing data for that pairing is stored within the secure storage 685. In one embodiment, once the local communication module 1280 of the IoT hub 110 receives the pairing code, it may use the code as a key to encrypt communications over the local wireless channel with the IoT device 101.

Similarly, on the IoT device 101 side, the local communication module 1590 stores pairing data within a local secure storage device 1595 indicating the pairing with the IoT hub. The pairing data 1295 may include the pre-programmed pairing code identified in the barcode/QR code 1201. The pairing data 1295 may also include pairing data received from the local communication module 1280 on the IoT hub 110 required for establishing a secure local communication channel (e.g., an additional key to encrypt communication with the IoT hub 110).

Thus, the barcode/QR code 1201 may be used to perform local pairing in a far more secure manner than current wireless pairing protocols because the pairing code is not transmitted over the air. In addition, in one embodiment, the same barcode/QR code 1201 used for pairing may be used to identify encryption keys to build a secure connection from the IoT device 101 to the IoT hub 110 and from the IoT hub 110 to the IoT service 120.

Figure 13:
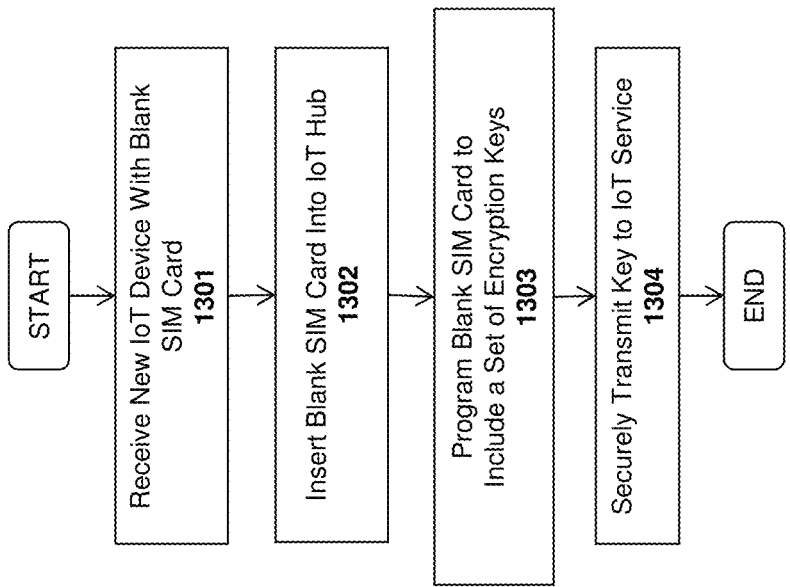
FIG. 13 illustrates one embodiment of a method for programming a SIM using an IoT hub.

A method for programming a SIM card in accordance with one embodiment of the invention is illustrated in FIG. 13. The method may be implemented within the system architecture described above, but is not limited to any particular system architecture.

At 1301, a user receives a new IoT device with a blank SIM card and, at 1602, the user inserts the blank SIM card into an IoT hub. At 1303, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 1304, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 13.

Figure 14:
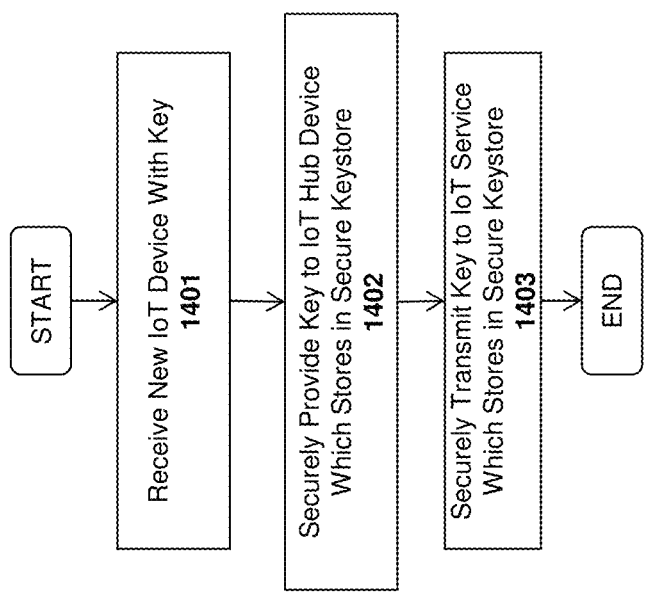
FIG. 14 illustrates one embodiment of a method for registering an IoT device with an IoT hub and IoT service.

A method for integrating a new IoT device into a network is illustrated in FIG. 14. The method may be implemented within the system architecture described above, but is not limited to any particular system architecture.

At 1401, a user receives a new IoT device to which an encryption key has been pre-assigned. At 1402, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or bowser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 803, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 15:
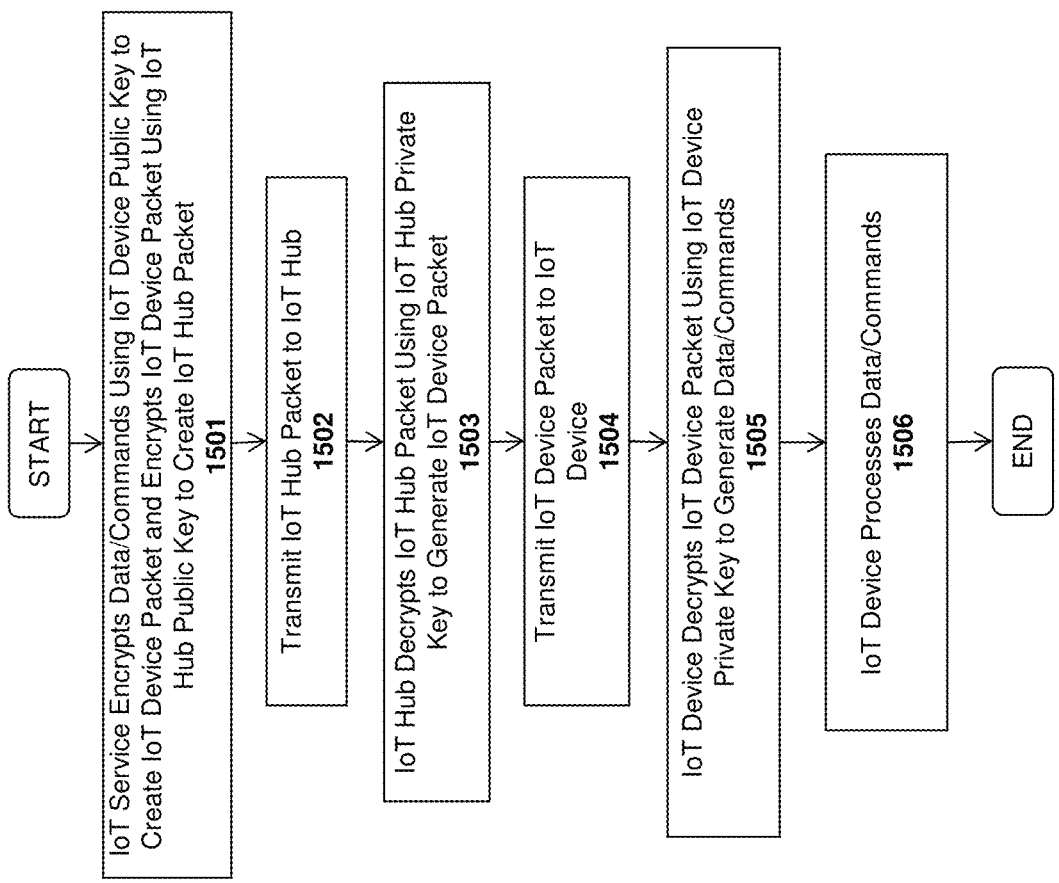
FIG. 15 illustrates one embodiment of a method for encrypting data to be transmitted to an IoT device.

A method for securely communicating commands/data to an IoT device using public/private keys is illustrated in FIG. 15. The method may be implemented within the system architecture described above, but is not limited to any particular system architecture.

At 1501, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1502, the IoT service transmits the IoT hub packet to the IoT hub. At 1503, the IoT hub decrypts the IoT hub packet using the IoT hub's private key to generate the IoT device packet. At 1504 it then transmits the IoT device packet to the IoT device which, at 1505, decrypts the IoT device packet using the IoT device private key to generate the data/commands. At 1506, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Apparatus and Method for Establishing Secure Communication Channels in an Internet of Things (IOT) System In one embodiment of the invention, encryption and decryption of data is performed between the IoT service 120 and each IoT device 101, regardless of the intermediate devices used to support the communication channel (e.g., such as the user's mobile device 611 and/or the IoT hub 110). One embodiment which communicates via an IoT hub 110 is illustrated in FIG. 16A and another embodiment which does not require an IoT hub is illustrated in FIG. 16B.

Figure 16A:
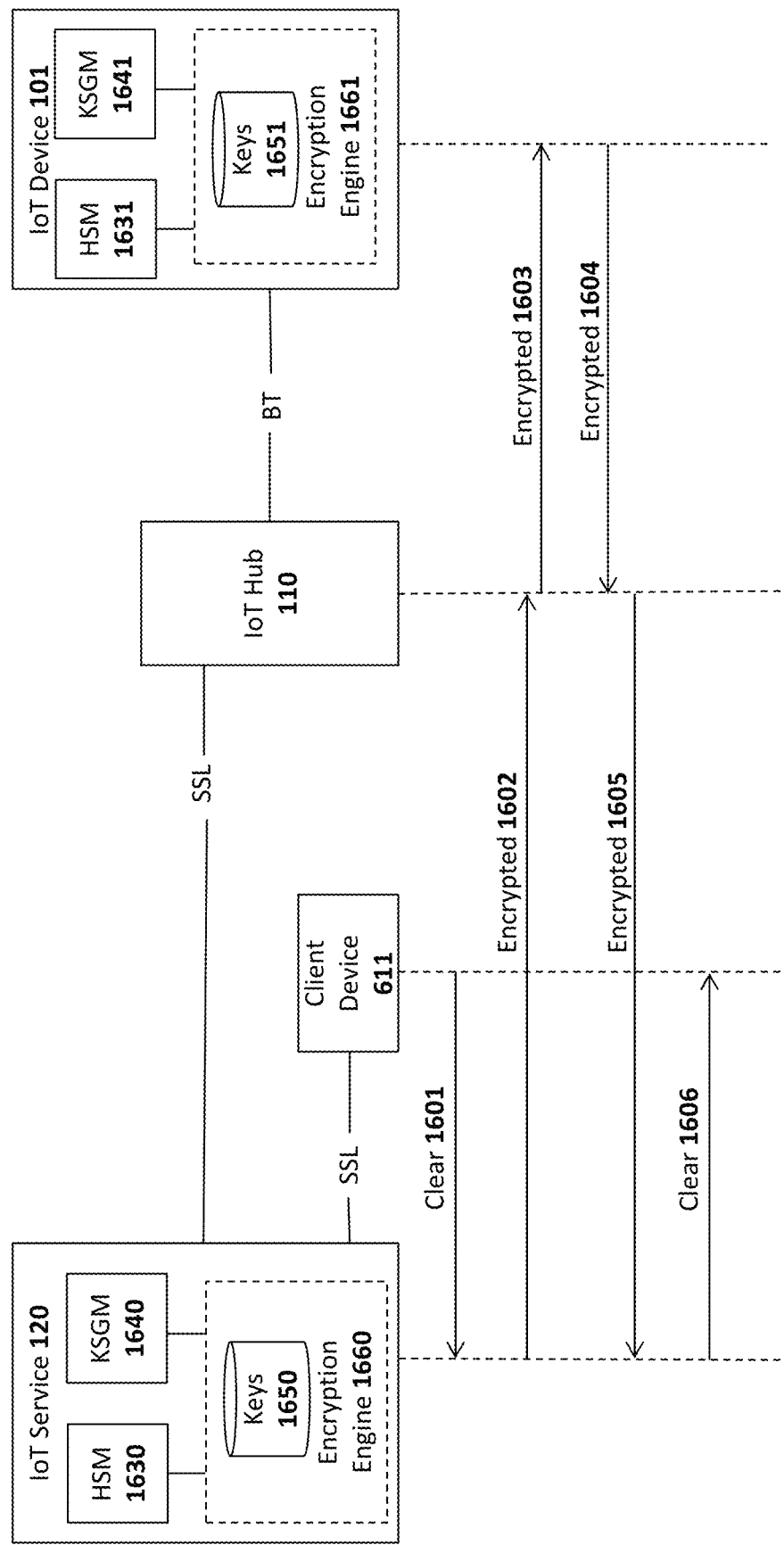
FIGS. 16A-B illustrate different embodiments of the invention for encrypting data between an IoT service and an IoT device.
Figure 16B:
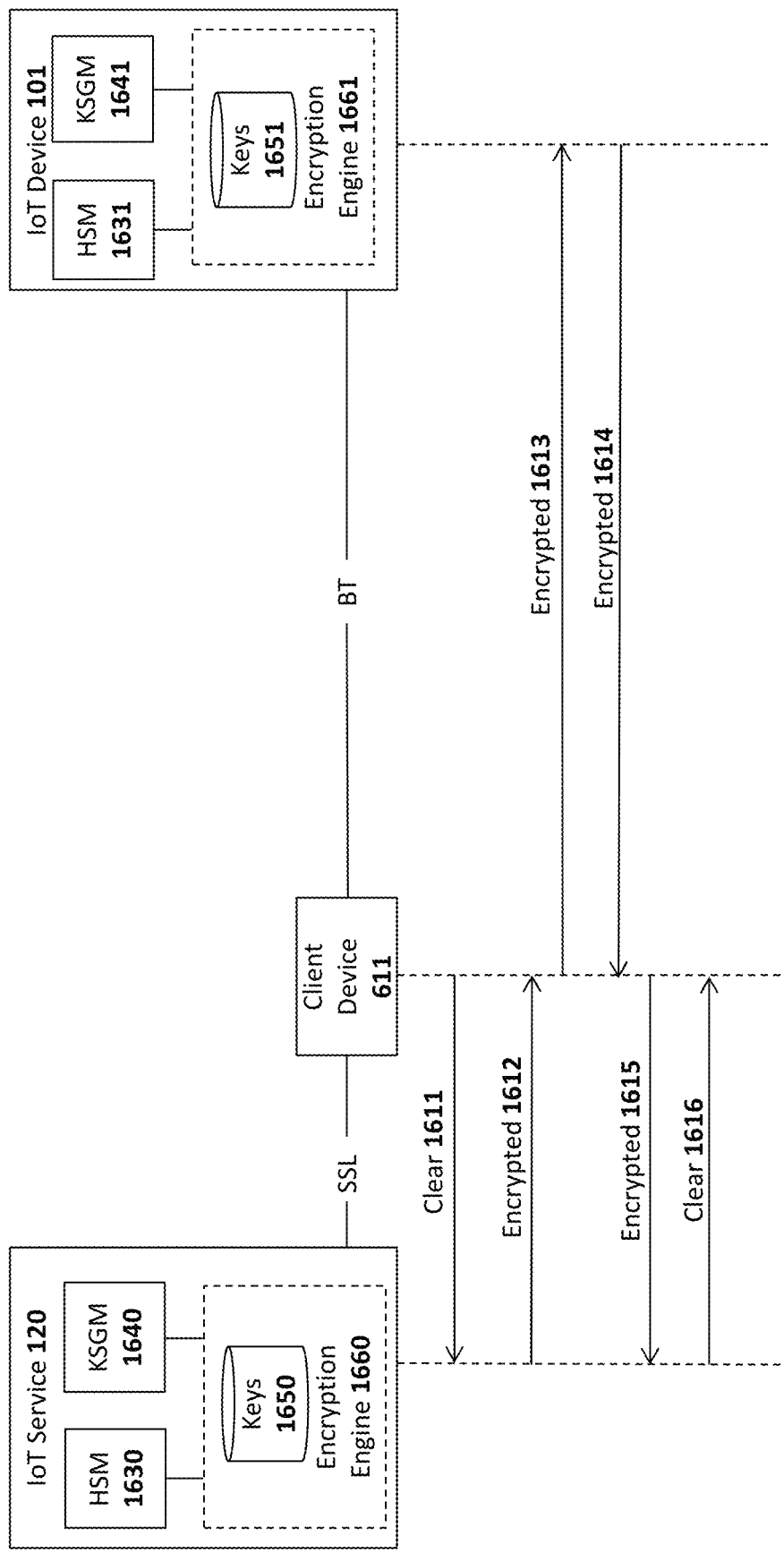

Turning first to FIG. 16A, the IoT service 120 includes an encryption engine 1660 which manages a set of "service session keys" 1650 and each IoT device 101 includes an encryption engine 1661 which manages a set of "device session keys" 1651 for encrypting/decrypting communication between the IoT device 101 and IoT service 120. The encryption engines may rely on different hardware modules when performing the security/encryption techniques described herein including a hardware security module 1630-1631 for (among other things) generating a session public/private key pair and preventing access to the private session key of the pair and a key stream generation module 1640-1641 for generating a key stream using a derived secret. In one embodiment, the service session keys 1650 and the device session keys 1651 comprise related public/private key pairs. For example, in one embodiment, the device session keys 1651 on the IoT device 101 include a public key of the IoT service 120 and a private key of the IoT device 101. As discussed in detail below, in one embodiment, to establish a secure communication session, the public/private session key pairs, 1650 and 1651, are used by each encryption engine, 1660 and 1661, respectively, to generate the same secret which is then used by the SKGMs 1640-1641 to generate a key stream to encrypt and decrypt communication between the IoT service 120 and the IoT device 101. Additional details associated with generation and use of the secret in accordance with one embodiment of the invention are provided below.

In FIG. 16A, once the secret has been generated using the keys 1650-1651, the client will always send messages to the IoT device 101 through the IoT service 120, as indicated by Clear transaction 1611. "Clear" as used herein is meant to indicate that the underlying message is not encrypted using the encryption techniques described herein. However, as illustrated, in one embodiment, a secure sockets layer (SSL) channel or other secure channel (e.g., an Internet Protocol Security (IPSEC) channel) is established between the client device 611 and IoT service 120 to protect the communication. The encryption engine 1660 on the IoT service 120 then encrypts the message using the generated secret and transmits the encrypted message to the IoT hub 110 at 1602. Rather than using the secret to encrypt the message directly, in one embodiment, the secret and a counter value are used to generate a key stream, which is used to encrypt each message packet. Details of this embodiment are described below with respect to FIG. 17.

As illustrated, an SSL connection or other secure channel may be established between the IoT service 120 and the IoT hub 110. The IoT hub 110 (which does not have the ability to decrypt the message in one embodiment) transmits the encrypted message to the IoT device at 1603 (e.g., over a Bluetooth Low Energy (BTLE) communication channel). The encryption engine 1661 on the IoT device 101 may then decrypt the message using the secret and process the message contents. In an embodiment which uses the secret to generate a key stream, the encryption engine 1661 may generate the key stream using the secret and a counter value and then use the key stream for decryption of the message packet.

The message itself may comprise any form of communication between the IoT service 120 and IoT device 101. For example, the message may comprise a command packet instructing the IoT device 101 to perform a particular function such as taking a measurement and reporting the result back to the client device 611 or may include configuration data to configure the operation of the IoT device 101.

If a response is required, the encryption engine 1661 on the IoT device 101 uses the secret or a derived key stream to encrypt the response and transmits the encrypted response to the IoT hub 110 at 1604, which forwards the response to the IoT service 120 at 1605. The encryption engine 1660 on the IoT service 120 then decrypts the response using the secret or a derived key stream and transmits the decrypted response to the client device 611 at 1606 (e.g., over the SSL or other secure communication channel).

FIG. 16B illustrates an embodiment which does not require an IoT hub. Rather, in this embodiment, communication between the IoT device 101 and IoT service 120 occurs through the client device 611 (e.g., as in the embodiments described above with respect to FIGS. 6-9B). In this embodiment, to transmit a message to the IoT device 101 the client device 611 transmits an unencrypted version of the message to the IoT service 120 at 1611. The encryption engine 1660 encrypts the message using the secret or the derived key stream and transmits the encrypted message back to the client device 611 at 1612. The client device 611 then forwards the encrypted message to the IoT device 101 at 1613, and the encryption engine 1661 decrypts the message using the secret or the derived key stream. The IoT device 101 may then process the message as described herein. If a response is required, the encryption engine 1661 encrypts the response using the secret and transmits the encrypted response to the client device 611 at 1614, which forwards the encrypted response to the IoT service 120 at 1615. The encryption engine 1660 then decrypts the response and transmits the decrypted response to the client device 611 at 1616.

Figure 17:
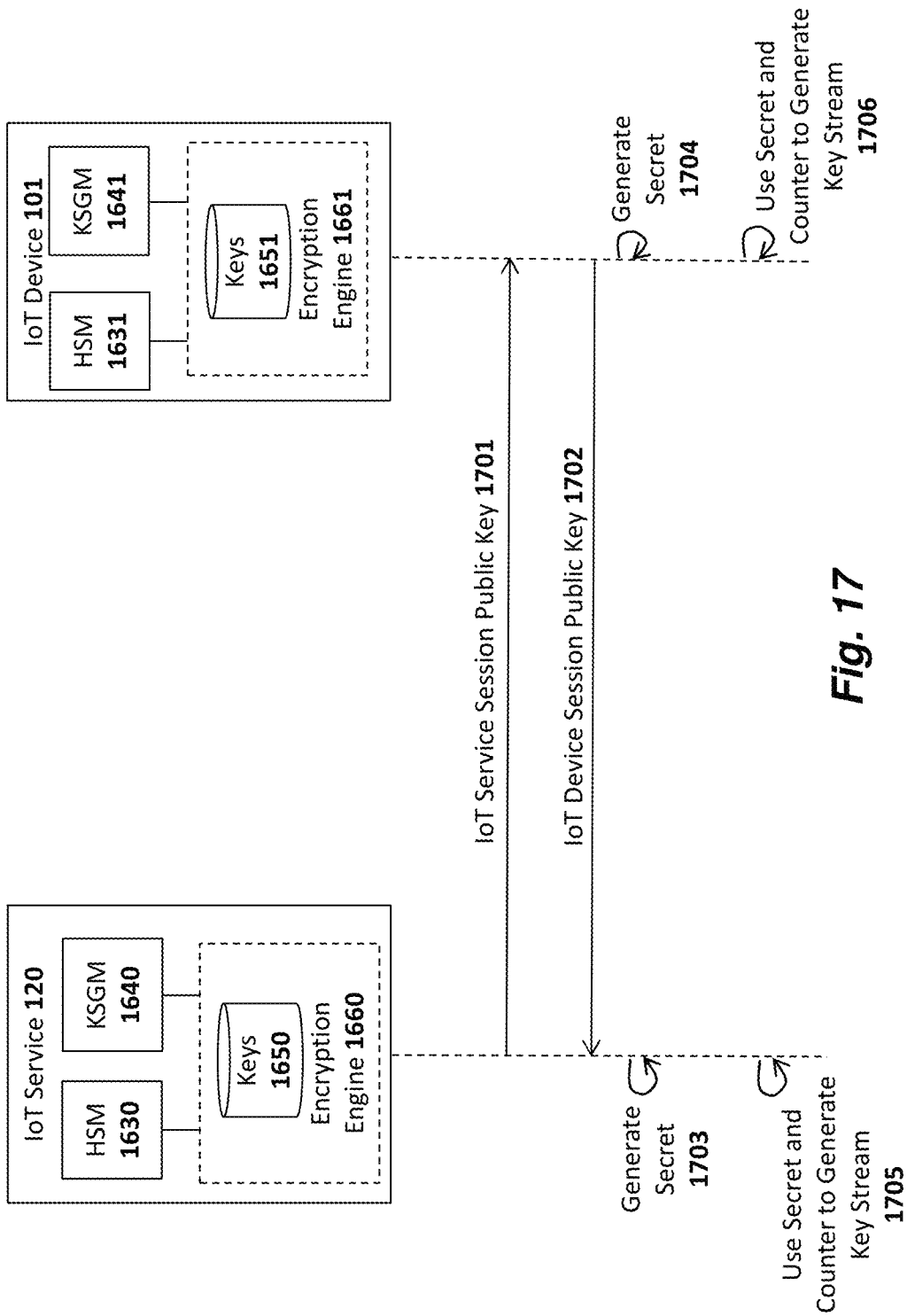
FIG. 17 illustrates embodiments of the invention for performing a secure key exchange, generating a common secret, and using the secret to generate a key stream.

FIG. 17 illustrates a key exchange and key stream generation which may initially be performed between the IoT service 120 and the IoT device 101. In one embodiment, this key exchange may be performed each time the IoT service 120 and IoT device 101 establish a new communication session. Alternatively, the key exchange may be performed and the exchanged session keys may be used for a specified period of time (e.g., a day, a week, etc). While no intermediate devices are shown in FIG. 17 for simplicity, communication may occur through the IoT hub 110 and/or the client device 611.

In one embodiment, the encryption engine 1660 of the IoT service 120 sends a command to the HSM 1630 (e.g., which may be such as a CloudHSM offered by Amazon®) to generate a session public/private key pair. The HSM 1630 may subsequently prevent access to the private session key of the pair. Similarly, the encryption engine on the IoT device 101 may transmit a command to the HSM 1631 (e.g., such as an Atecc508 HSM from Atmel Corporation®) which generates a session public/private key pair and prevents access to the session private key of the pair. Of course, the underlying principles of the invention are not limited to any specific type of encryption engine or manufacturer.

In one embodiment, the IoT service 120 transmits its session public key generated using the HSM 1630 to the IoT device 101 at 1701. The IoT device uses its HSM 1631 to generate its own session public/private key pair and, at 1702, transmits its public key of the pair to the IoT service 120. In one embodiment, the encryption engines 1660-1661 use an Elliptic curve Diffie-Hellman (ECDH) protocol, which is an anonymous key agreement that allows two parties with an elliptic curve public—private key pair, to establish a shared secret. In one embodiment, using these techniques, at 1703, the encryption engine 1660 of the IoT service 120 generates the secret using the IoT device session public key and its own session private key. Similarly, at 1704, the encryption engine 1661 of the IoT device 101 independently generates the same secret using the IoT service 120 session public key and its own session private key. More specifically, in one embodiment, the encryption engine 1660 on the IoT service 120 generates the secret according to the formula secret=IoT device session pub key*IoT service session private key, where '*' means that the IoT device session public key is point-multiplied by the IoT service session private key. The encryption engine 1661 on the IoT device 101 generates the secret according to the formula secret=IoT service session pub key*IoT device session private key, where the IoT service session public key is point multiplied by the IoT device session private key. In the end, the IoT service 120 and IoT device 101 have both generated the same secret to be used to encrypt communication as described below. In one embodiment, the encryption engines 1660-1661 rely on a hardware module such as the KSGMs 1640-1641 respectively to perform the above operations for generating the secret.

Once the secret has been determined, it may be used by the encryption engines 1660 and 1661 to encrypt and decrypt data directly. Alternatively, in one embodiment, the encryption engines 1660-1661 send commands to the KSGMs 1640-1641 to generate a new key stream using the secret to encrypt/decrypt each data packet (i.e., a new key stream data structure is generated for each packet). In particular, one embodiment of the key stream generation module 1640-1641 implements a Galois/Counter Mode (GCM) in which a counter value is incremented for each data packet and is used in combination with the secret to generate the key stream. Thus, to transmit a data packet to the IoT service 120, the encryption engine 1661 of the IoT device 101 uses the secret and the current counter value to cause the KSGMs 1640-1641 to generate a new key stream and increment the counter value for generating the next key stream. The newly-generated key stream is then used to encrypt the data packet prior to transmission to the IoT service 120. In one embodiment, the key stream is XORed with the data to generate the encrypted data packet. In one embodiment, the IoT device 101 transmits the counter value with the encrypted data packet to the IoT service 120. The encryption engine 1660 on the IoT service then communicates with the KSGM 1640 which uses the received counter value and the secret to generate the key stream (which should be the same key stream because the same secret and counter value are used) and uses the generated key stream to decrypt the data packet.

In one embodiment, data packets transmitted from the IoT service 120 to the IoT device 101 are encrypted in the same manner. Specifically, a counter is incremented for each data packet and used along with the secret to generate a new key stream. The key stream is then used to encrypt the data (e.g., performing an XOR of the data and the key stream) and the encrypted data packet is transmitted with the counter value to the IoT device 101. The encryption engine 1661 on the IoT device 101 then communicates with the KSGM 1641 which uses the counter value and the secret to generate the same key stream which is used to decrypt the data packet. Thus, in this embodiment, the encryption engines 1660-1661 use their own counter values to generate a key stream to encrypt data and use the counter values received with the encrypted data packets to generate a key stream to decrypt the data.

In one embodiment, each encryption engine 1660-1661 keeps track of the last counter value it received from the other and includes sequencing logic to detect whether a counter value is received out of sequence or if the same counter value is received more than once. If a counter value is received out of sequence, or if the same counter value is received more than once, this may indicate that a replay attack is being attempted. In response, the encryption engines 1660-1661 may disconnect from the communication channel and/or may generate a security alert.

Figure 18:
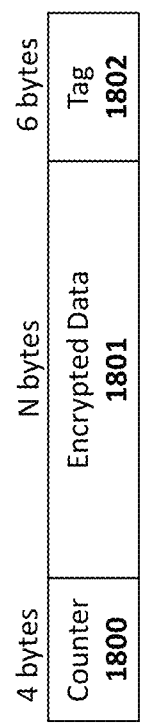
FIG. 18 illustrates a packet structure in accordance with one embodiment of the invention.

FIG. 18 illustrates an exemplary encrypted data packet employed in one embodiment of the invention comprising a 4-byte counter value 1800, a variable-sized encrypted data field 1801, and a 6-byte tag 1802. In one embodiment, the tag 1802 comprises a checksum value to validate the decrypted data (once it has been decrypted).

As mentioned, in one embodiment, the session public/private key pairs 1650-1651 exchanged between the IoT service 120 and IoT device 101 may be generated periodically and/or in response to the initiation of each new communication session.

One embodiment of the invention implements additional techniques for authenticating sessions between the IoT service 120 and IoT device 101. In particular, in one embodiment, hierarchy of public/private key pairs is used including a master key pair, a set of factory key pairs, and a set of IoT service key pairs, and a set of IoT device key pairs. In one embodiment, the master key pair comprises a root of trust for all of the other key pairs and is maintained in a single, highly secure location (e.g., under the control of the organization implementing the IoT systems described herein). The master private key may be used to generate signatures over (and thereby authenticate) various other key pairs such as the factory key pairs. The signatures may then be verified using the master public key. In one embodiment, each factory which manufactures IoT devices is assigned its own factory key pair which may then be used to authenticate IoT service keys and IoT device keys. For example, in one embodiment, a factory private key is used to generate a signature over IoT service public keys and IoT device public keys. These signature may then be verified using the corresponding factory public key. Note that these IoT service/device public keys are not the same as the "session" public/private keys described above with respect to FIGS. 16A-B. The session public/private keys described above are temporary (i.e., generated for a service/device session) while the IoT service/device key pairs are permanent (i.e., generated at the factory).

With the foregoing relationships between master keys, factory keys, service/device keys in mind, one embodiment of the invention performs the following operations to provide additional layers of authentication and security between the IoT service 120 and IoT device 101:

A. In one embodiment, the IoT service 120 initially generates a message containing the following:
1. The IoT service's unique ID:
   The IoT service's serial number;
   a Timestamp;
   The ID of the factory key used to sign this unique ID;
   a Class of the unique ID (i.e., a service);
   IoT service's public key
   The signature over the unique ID.
2. The Factory Certificate including:
   A timestamp
   The ID of the master key used to sign the certificate
   The factory public key
   The signature of the Factory Certificate
3. IoT service session public key (as described above with respect to FIGS. 16A-B)
4. IoT service session public key signature (e.g., signed with the IoT service's private key)

B. In one embodiment, the message is sent to the IoT device on the negotiation channel (described below). The IoT device parses the message and:
1. Verifies the signature of the factory certificate (only if present in the message payload)
2. Verifies the signature of the unique ID using the key identified by the unique ID
3. Verifies the IoT service session public key signature using the IoT service's public key from the unique ID
4. Saves the IoT service's public key as well as the IoT service's session public key 5. Generates the IoT device session key pair C. The IoT device then generates a message containing the following:
  1. IoT device's unique ID
     IoT device serial number
     Timestamp
     ID of factory key used to sign this unique ID
     Class of unique ID (i.e., IoT device)
     IoT device's public key
     Signature of unique ID
  2. IoT device's session public key
  3. Signature of (IoT device session public key+IoT service session public key) signed with IoT device's key D. This message is sent back to the IoT service. The IoT service parses the message and:
  1. Verifies the signature of the unique ID using the factory public key
  2. Verifies the signature of the session public keys using the IoT device's public key
  3. Saves the IoT device's session public key E. The IoT service then generates a message containing a signature of (IoT device session public key+IoT service session public key) signed with the IoT service's key.

F. The IoT device parses the message and:
  1. Verifies the signature of the session public keys using the IoT service's public key
  2. Generates the key stream from the IoT device session private key and the IoT service's session public key
  3. The IoT device then sends a "messaging available" message.

G. The IoT service then does the following:
  1. Generates the key stream from the IoT service session private key and the IoT device's session public key
  2. Creates a new message on the messaging channel which contains the following:
     Generates and stores a random 2 byte value
     Set attribute message with the boomerang attribute Id (discussed below) and the random value H. The IoT device receives the message and:
  1. Attempts to decrypt the message
  2. Emits an Update with the same value on the indicated attribute Id I. The IoT service recognizes the message payload contains a boomerang attribute update and:
  1. Sets its paired state to true
  2. Sends a pairing complete message on the negotiator channel J. IoT device receives the message and sets his paired state to true While the above techniques are described with respect to an "IoT service" and an "IoT device," the underlying principles of the invention may be implemented to establish a secure communication channel between any two devices including user client devices, servers, and Internet services.

The above techniques are highly secure because the private keys are never shared over the air (in contrast to current Bluetooth pairing techniques in which a secret is transmitted from one party to the other). An attacker listening to the entire conversation will only have the public keys, which are insufficient to generate the shared secret. These techniques also prevent a man-in-the-middle attack by exchanging signed public keys. In addition, because GCM and separate counters are used on each device, any kind of "replay attack" (where a man in the middle captures the data and sends it again) is prevented. Some embodiments also prevent replay attacks by using asymmetrical counters.

Techniques for Exchanging Data and Commands Without Formally Pairing Devices

GATT is an acronym for the Generic Attribute Profile, and it defines the way that two Bluetooth Low Energy (BTLE) devices transfer data back and forth. It makes use of a generic data protocol called the Attribute Protocol (ATT), which is used to store Services, Characteristics and related data in a simple lookup table using 16-bit Characteristic IDs for each entry in the table. Note that while the "characteristics" are sometimes referred to as "attributes."

On Bluetooth devices, the most commonly used characteristic is the devices "name" (having characteristic ID 10752 (0×2A00)). For example, a Bluetooth device may identify other Bluetooth devices within its vicinity by reading the "Name" characteristic published by those other Bluetooth devices using GATT. Thus, Bluetooth device have the inherent ability to exchange data without formally pairing/bonding the devices (note that "paring" and "bonding" are sometimes used interchangeably; the remainder of this discussion will use the term "pairing").

One embodiment of the invention takes advantage of this capability to communicate with BTLE-enabled IoT devices without formally pairing with these devices. Pairing with each individual IoT device would extremely inefficient because of the amount of time required to pair with each device and because only one paired connection may be established at a time.

Figure 19:
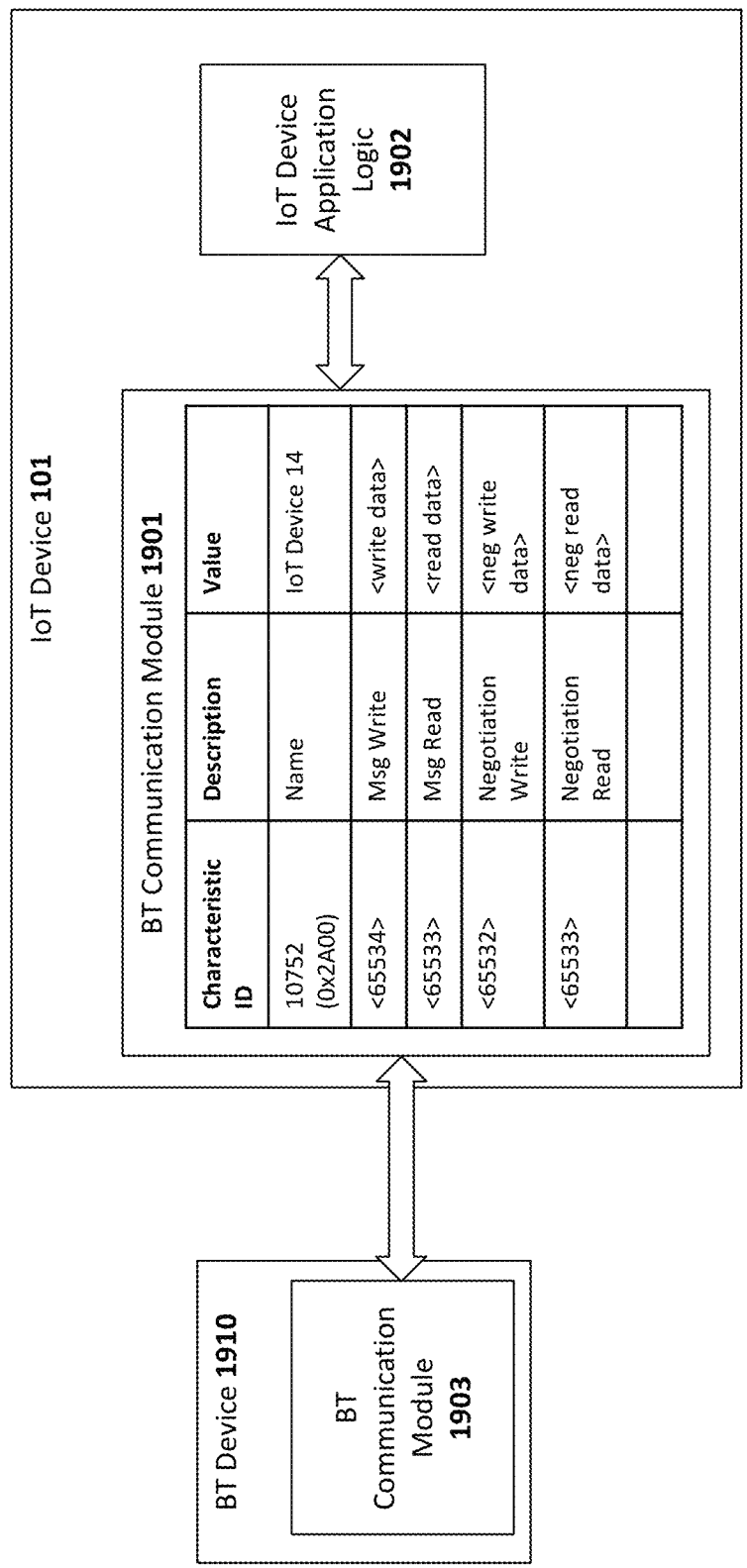
FIG. 19 illustrates techniques employed in one embodiment for writing and reading data to/from an IoT device without formally pairing with the IoT device.

FIG. 19 illustrates one particular embodiment in which a Bluetooth (BT) device 1910 establishes a network socket abstraction with a BT communication module 1901 of an IoT device 101 without formally establishing a paired BT connection. The BT device 1910 may be included in an IoT hub 110 and/or a client device 611 such as shown in FIG. 16A. As illustrated, the BT communication module 1901 maintains a data structure containing a list of characteristic IDs, names associated with those characteristic IDs and values for those characteristic IDs. The value for each characteristic may be stored within a 20-byte buffer identified by the characteristic ID in accordance with the current BT standard. However, the underlying principles of the invention are not limited to any particular buffer size.

In the example in FIG. 19, the "Name" characteristic is a BT-defined characteristic which is assigned a specific value of "IoT Device 14." One embodiment of the invention specifies a first set of additional characteristics to be used for negotiating a secure communication channel with the BT device 1910 and a second set of additional characteristics to be used for encrypted communication with the BT device 1910. In particular, a "negotiation write" characteristic, identified by characteristic ID <65532> in the illustrated example, may be used to transmit outgoing negotiation messages and the "negotiation read" characteristic, identified by characteristic ID <65533> may be used to receive incoming negotiation messages. The "negotiation messages" may include messages used by the BT device 1910 and the BT communication module 1901 to establish a secure communication channel as described herein. By way of example, in FIG. 17, the IoT device 101 may receive the IoT service session public key 1701 via the "negotiation read" characteristic <65533>. The key 1701 may be transmitted from the IoT service 120 to a BTLE-enabled IoT hub 110 or client device 611 which may then use GATT to write the key 1701 to the negotiation read value buffer identified by characteristic ID <65533>. IoT device application logic 1902 may then read the key 1701 from the value buffer identified by characteristic ID <65533> and process it as described above (e.g., using it to generate a secret and using the secret to generate a key stream, etc).

If the key 1701 is greater than 20 bytes (the maximum buffer size in some current implementations), then it may be written in 20-byte portions. For example, the first 20 bytes may be written by the BT communication module 1903 to characteristic ID <65533> and read by the IoT device application logic 1902, which may then write an acknowledgement message to the negotiation write value buffer identified by characteristic ID <65532>. Using GATT, the BT communication module 1903 may read this acknowledgement from characteristic ID <65532> and responsively write the next 20 bytes of the key 1701 to the negotiation read value buffer identified by characteristic ID <65533>. In this manner, a network socket abstraction defined by characteristic IDs <65532> and <65533> is established for exchanging negotiation messages used to establish a secure communication channel.

In one embodiment, once the secure communication channel is established, a second network socket abstraction is established using characteristic ID <65534> (for transmitting encrypted data packets from IoT device 101) and characteristic ID <65533> (for receiving encrypted data packets by IoT device). That is, when BT communication module 1903 has an encrypted data packet to transmit (e.g., such as encrypted message 1603 in FIG. 16A), it starts writing the encrypted data packet, 20 bytes at a time, using the message read value buffer identified by characteristic ID <65533>. The IoT device application logic 1902 will then read the encrypted data packet, 20 bytes at a time, from the read value buffer, sending acknowledgement messages to the BT communication module 1903 as needed via the write value buffer identified by characteristic ID <65532>.

In one embodiment, the commands of GET, SET, and UPDATE described below are used to exchange data and commands between the two BT communication modules 1901 and 1903. For example, the BT communication module 1903 may send a packet identifying characteristic ID <65533> and containing the SET command to write into the value field/buffer identified by characteristic ID <65533> which may then be read by the IoT device application logic 1902. To retrieve data from the IoT device 101, the BT communication module 1903 may transmit a GET command directed to the value field/buffer identified by characteristic ID <65534>. In response to the GET command, the BT communication module 1901 may transmit an UPDATE packet to the BT communication module 1903 containing the data from the value field/buffer identified by characteristic ID <65534>. In addition, UPDATE packets may be transmitted automatically, in response to changes in a particular attribute on the IoT device 101. For example, if the IoT device is associated with a lighting system and the user turns on the lights, then an UPDATE packet may be sent to reflect the change to the on/off attribute associated with the lighting application.

Figure 20:
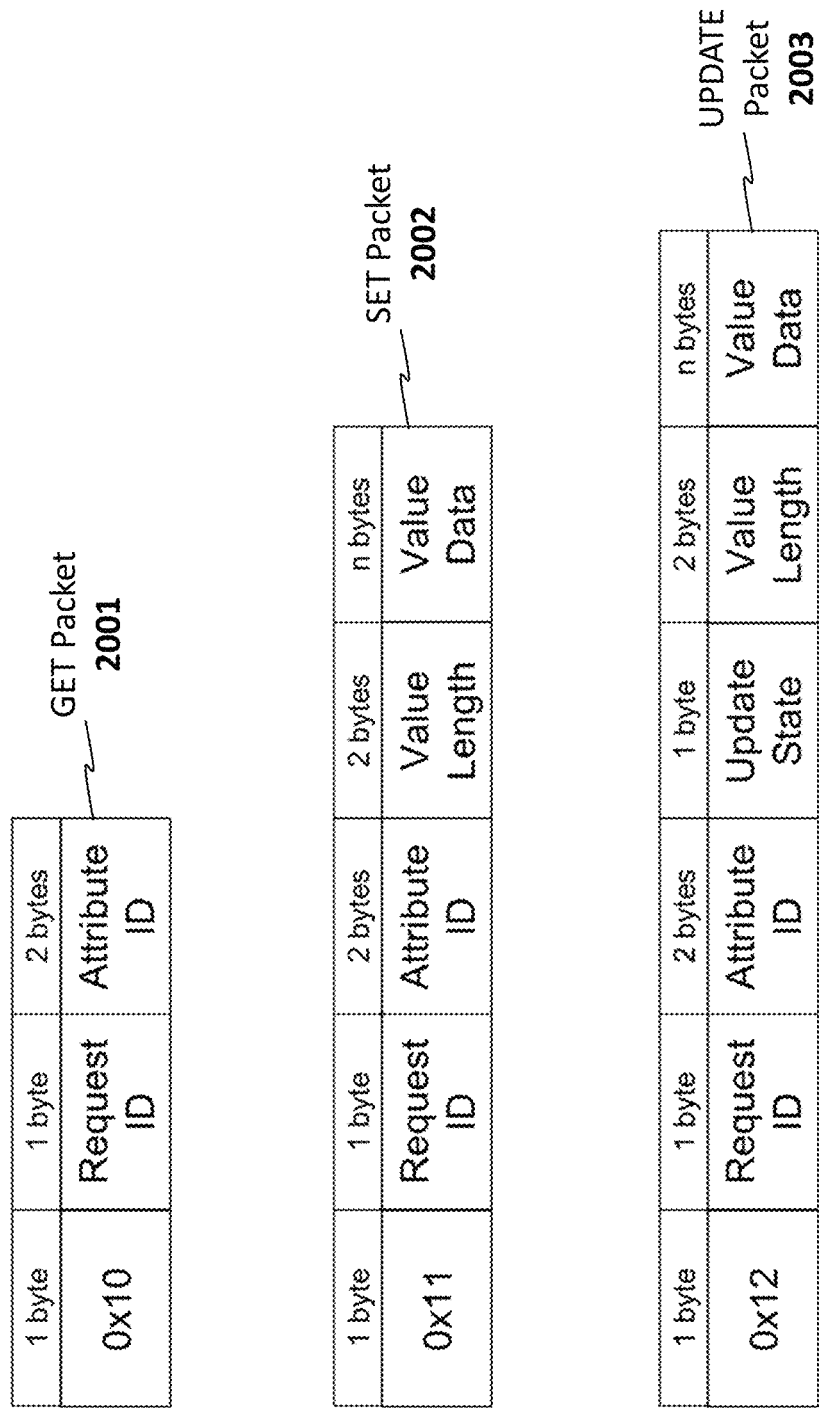
FIG. 20 illustrates an exemplary set of command packets employed in one embodiment of the invention.

FIG. 20 illustrates exemplary packet formats used for GET, SET, and UPDATE in accordance with one embodiment of the invention. In one embodiment, these packets are transmitted over the message write <65534> and message read <65533> channels following negotiation. In the GET packet 2001, a first 1-byte field includes a value (0x10) which identifies the packet as a GET packet. A second 1-byte field includes a request ID, which uniquely identifies the current GET command (i.e., identifies the current transaction with which the GET command is associated). For example, each instance of a GET command transmitted from a service or device may be assigned a different request ID. This may be done, for example, by incrementing a counter and using the counter value as the request ID. However, the underlying principles of the invention are not limited to any particular manner for setting the request ID.

A 2-byte attribute ID identifies the application-specific attribute to which the packet is directed. For example, if the GET command is being sent to IoT device 101 illustrated in FIG. 19, the attribute ID may be used to identify the particular application-specific value being requested. Returning to the above example, the GET command may be directed to an application-specific attribute ID such as power status of a lighting system, which comprises a value identifying whether the lights are powered on or off (e.g., 1=on, 0=off). If the IoT device 101 is a security apparatus associated with a door, then the value field may identify the current status of the door (e.g., 1=opened, 0=closed). In response to the GET command, a response may be transmitting containing the current value identified by the attribute ID.

The SET packet 2002 and UPDATE packet 2003 illustrated in FIG. 20 also include a first 1-byte field identifying the type of packet (i.e., SET and UPDATE), a second 1-byte field containing a request ID, and a 2-byte attribute ID field identifying an application-defined attribute. In addition, the SET packet includes a 2-byte length value identifying the length of data contained in an n-byte value data field. The value data field may include a command to be executed on the IoT device and/or configuration data to configure the operation of the IoT device in some manner (e.g., to set a desired parameter, to power down the IoT device, etc). For example, if the IoT device 101 controls the speed of a fan, the value field may reflect the current fan speed.

The UPDATE packet 2003 may be transmitted to provide an update of the results of the SET command. The UPDATE packet 2003 includes a 2-byte length value field to identify the length of the n-byte value data field which may include data related to the results of the SET command. In addition, a 1-byte update state field may identify the current state of the variable being updated. For example, if the SET command attempted to turn off a light controlled by the IoT device, the update state field may indicate whether the light was successfully turned off.

Figure 21:
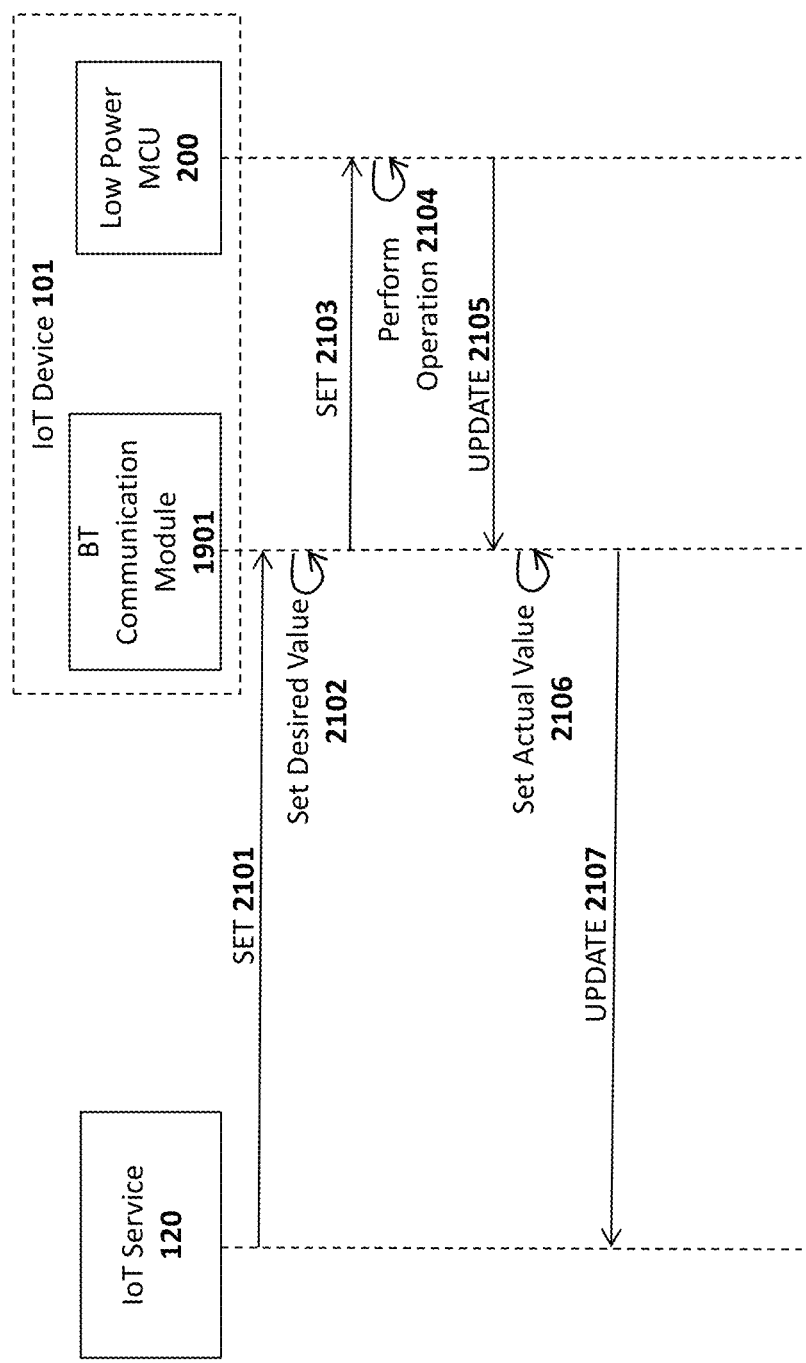
FIG. 21 illustrates an exemplary sequence of transactions using command packets.

FIG. 21 illustrates an exemplary sequence of transactions between the IoT service 120 and an IoT device 101 involving the SET and UPDATE commands. Intermediary devices such as the IoT hub and the user's mobile device are not shown to avoid obscuring the underlying principles of the invention. At 2101, the SET command 2101 is transmitted form the IoT service to the IoT device 101 and received by the BT communication module 1901 which responsively updates the GATT value buffer identified by the characteristic ID at 2102. The SET command is read from the value buffer by the low power microcontroller (MCU) 200 at 2103 (or by program code being executed on the low power MCU such as IoT device application logic 1902 shown in FIG. 19). At 2104, the MCU 200 or program code performs an operation in response to the SET command. For example, the SET command may include an attribute ID specifying a new configuration parameter such as a new temperature or may include a state value such as on/off (to cause the IoT device to enter into an "on" or a low power state). Thus, at 2104, the new value is set in the IoT device and an UPDATE command is returned at 2105 and the actual value is updated in a GATT value field at 2106. In some cases, the actual value will be equal to the desired value. In other cases, the updated value may be different (i.e., because it may take time for the IoT device 101 to update certain types of values). Finally, at 2107, the UPDATE command is transmitted back to the IoT service 120 containing the actual value from the GATT value field.

Figure 22:
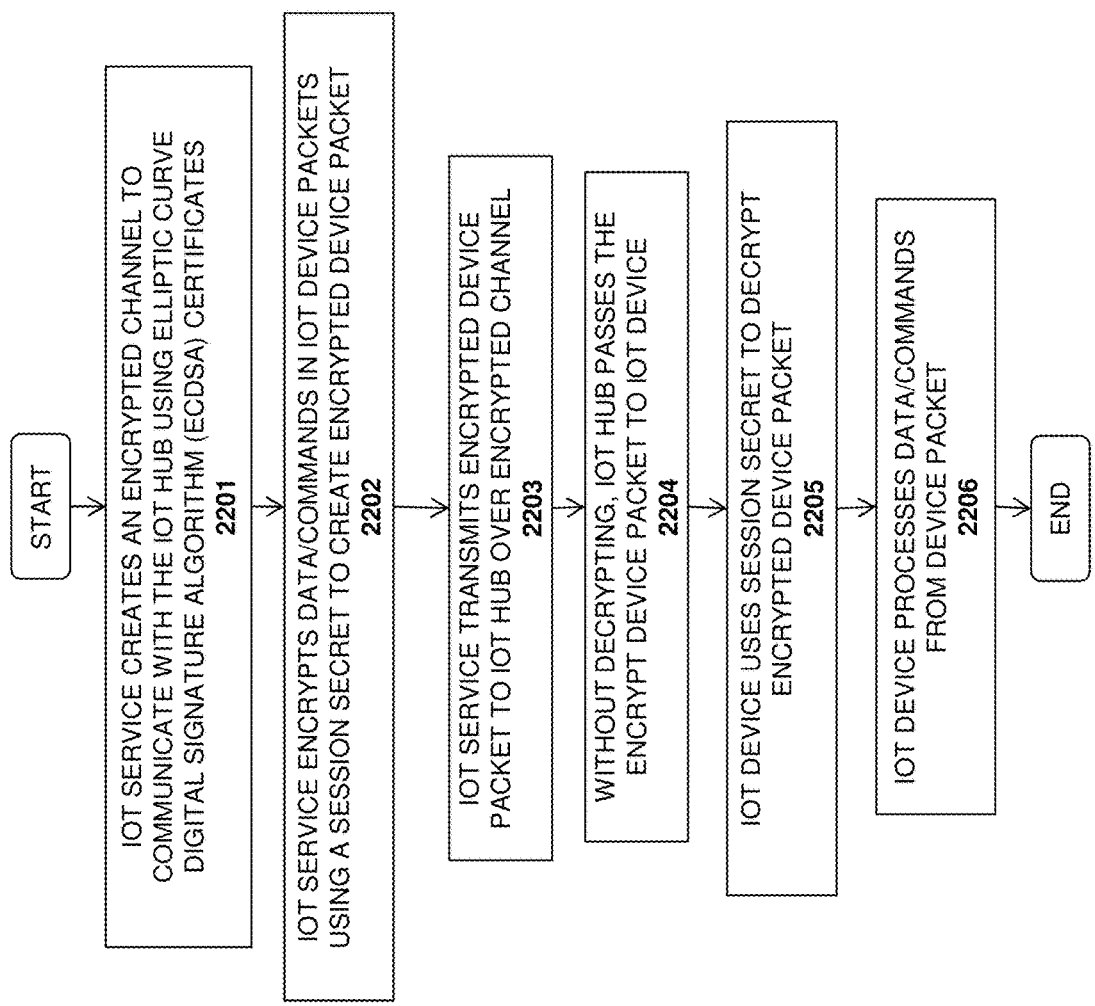
FIG. 22 illustrates a method in accordance with one embodiment of the invention.

FIG. 22 illustrates a method for implementing a secure communication channel between an IoT service and an IoT device in accordance with one embodiment of the invention. The method may be implemented within the context of the network architectures described above but is not limited to any specific architecture.

At 2201, the IoT service creates an encrypted channel to communicate with the IoT hub using elliptic curve digital signature algorithm (ECDSA) certificates. At 2202, the IoT service encrypts data/commands in IoT device packets using the a session secret to create an encrypted device packet. As mentioned above, the session secret may be independently generated by the IoT device and the IoT service. At 2203, the IoT service transmits the encrypted device packet to the IoT hub over the encrypted channel. At 2204, without decrypting, the IoT hub passes the encrypted devic packet to the IoT device. At 22-5, the IoT device uses the session secret to decrypt the encrypted device packet. As mentioned, in one embodiment this may be accomplished by using the secret and a counter value (provided with the encrypted device packet) to generate a key stream and then using the key stream to decrypt the packet. At 2206, the IoT device then extracts and processes the data and/or commands contained within the device packet.

Thus, using the above techniques, bi-directional, secure network socket abstractions may be established between two BT-enabled devices without formally pairing the BT devices using standard pairing techniques. While these techniques are described above with respect to an IoT device 101 communicating with an IoT service 120, the underlying principles of the invention may be implemented to negotiate and establish a secure communication channel between any two BT-enabled devices.

Figure 23A:
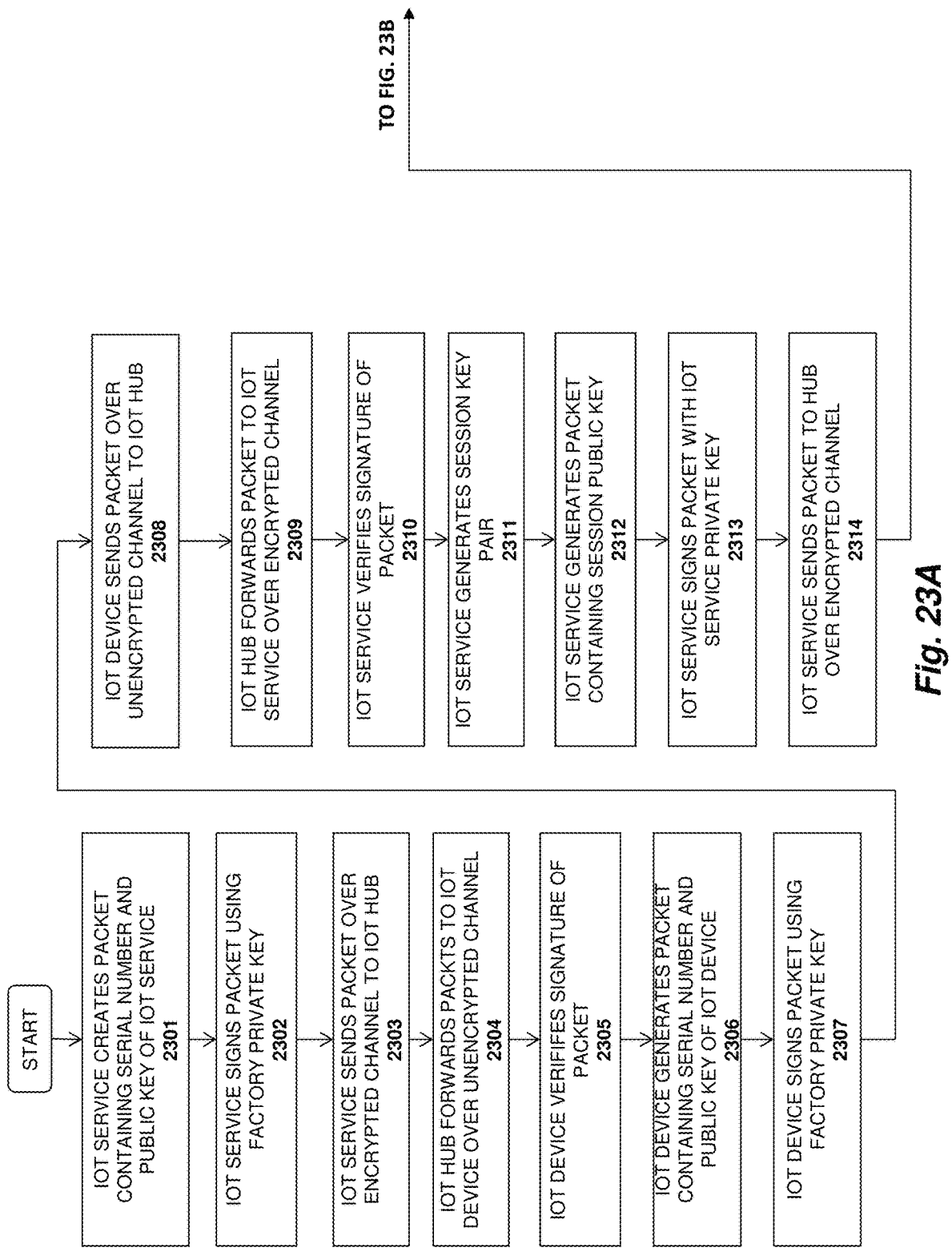
Figure 23B:
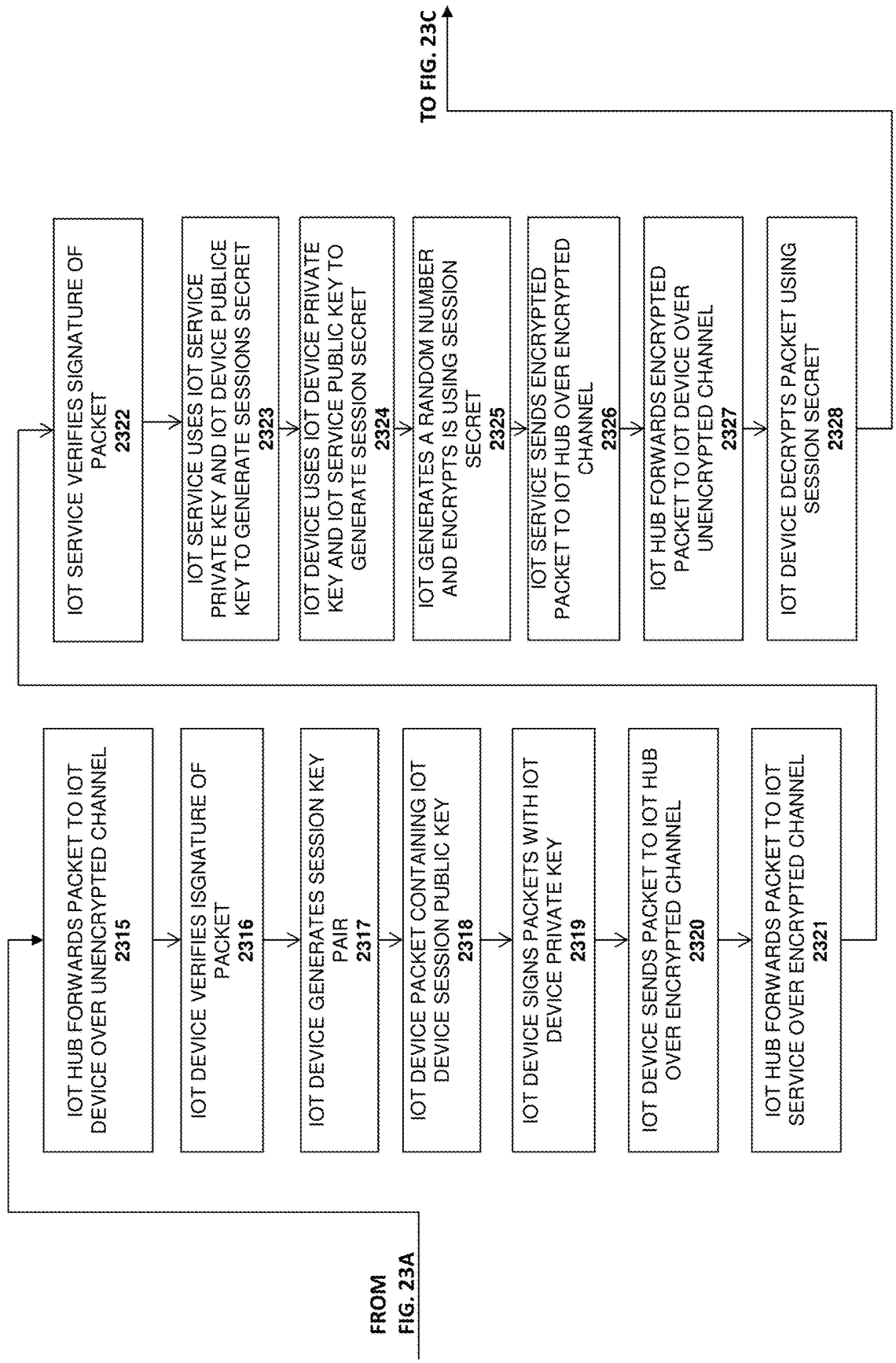

FIGS. 23A-C illustrate a detailed method for pairing devices in accordance with one embodiment of the invention. The method may be implemented within the context of the system architectures described above, but is not limited to any specific system architectures.

At 2301, the IoT Service creates a packet containing serial number and public key of the IoT Service. At 2302, the IoT Service signs the packet using the factory private key. At 2303, the IoT Service sends the packet over an encrypted channel to the IoT hub and at 2304 the IoT hub forwards the packet to IoT device over an unencrypted channel. At 2305, the IoT device verifies the signature of packet and, at 2306, the IoT device generates a packet containing the serial number and public key of the IoT Device. At 2307, the IoT device signs the packet using the factory private key and at 2308, the IoT device sends the packet over the unencrypted channel to the IoT hub.

At 2309, the IoT hub forwards the packet to the IoT service over an encrypted channel and at 2310, the IoT Service verifies the signature of the packet. At 2311, the IoT Service generates a session key pair, and at 2312 the IoT Service generates a packet containing the session public key. The IoT Service then signs the packet with IoT Service private key at 2313 and, at 2314, the IoT Service sends the packet to the IoT hub over the encrypted channel.

Turning to FIG. 23B, the IoT hub forwards the packet to the IoT device over the unencrypted channel at 2315 and, at 2316, the IoT device verifies the signature of packet. At 2317 the IoT device generates session key pair (e.g., using the techniques described above), and, at 2318, an IoT device packet is generated containing the IoT device session public key. At 2319, the IoT device signs the IoT device packet with IoT device private key. At 2320, the IoT device sends the packet to the IoT hub over the unencrypted channel and, at 2321, the IoT hub forwards the packet to the IoT service over an encrypted channel.

At 2322, the IoT service verifies the signature of the packet (e.g., using the IoT device public key) and, at 2323, the IoT service uses the IoT service private key and the IoT device public key to generate the session secret (as described in detail above). At 2324, the IoT device uses the IoT device private key and IoT service public key to generate the session secret (again, as described above) and, at 2325, the IoT device generates a random number and encrypts it using the session secret. At 2326, the IoT service sends the encrypted packet to IoT hub over the encrypted channel. At 2327, the IoT hub forwards the encrypted packet to the IoT device over the unencrypted channel. At 2328, the IoT device decrypts the packet using the session secret.

Turning to FIG. 23C, the IoT device re-encrypts the packet using the session secret at 2329 and, at 2330, the IoT device sends the encrypted packet to the IoT hub over the unencrypted channel. At 2331, the IoT hub forwards the encrypted packet to the IoT service over the encrypted channel. The IoT service decrypts the packet using the session secret at 2332. At 2333 the IoT service verifies that the random number matches the random number it sent. The IoT service then sends a packet indicating that pairing is complete at 2334 and all subsequent messages are encrypted using the session secret at 2335.

Apparatus and Method for Modifying Packet Interval Timing to Identify a Data Transfer Condition Bluetooth Low Energy (BTLE) devices send advertising packets separated by an "advertising interval" to establish connections between devices. A BTLE peripheral device broadcasts advertising packets to every device around it using the advertising interval. A receiving BTLE device can then act on this information or connect to receive more information.

The 2.4 GHz spectrum for BTLE extends from 2402 MHz to 2480 MHz and uses 40 1 MHz wide channels, numbered 0 to 39. Each channel is separated by 2 MHz. Channels 37, 38, and 39 are used only for sending advertisement packets. The rest are used for data exchange during a connection. During a BTLE advertisement, a BTLE peripheral device transmits packets on the 3 advertising channels one after the other. A central device scanning for devices or beacons will listen to those channels for the advertising packets, which helps it discover devices nearby. Channels 37, 38 and 39 are intentionally spread across the 2.4 GHz spectrum (i.e., channels 37 and 39 are the first and last channels in the band and channel 38 is in the middle). If any single advertising channel is blocked, the other channels are likely to be free since they are separated by several MHz of bandwidth.

When an IoT device has data to be transmitted, it would normally include a flag as part of its advertisement packets to indicate that data is ready to be sent. In one embodiment of the invention, rather than using this flag, an IoT device adjusts the advertising interval to indicate that it has pending data. For example, if T is the time between advertisement packets when no data is pending, a different advertising interval such as 0.75 T, 0.5 T, or 1.25 T may be selected to indicate that data is pending. In one embodiment, the two different intervals are programmable based on the specific requirements of the application and to make it harder to determine which interval means which state.

Figure 24:
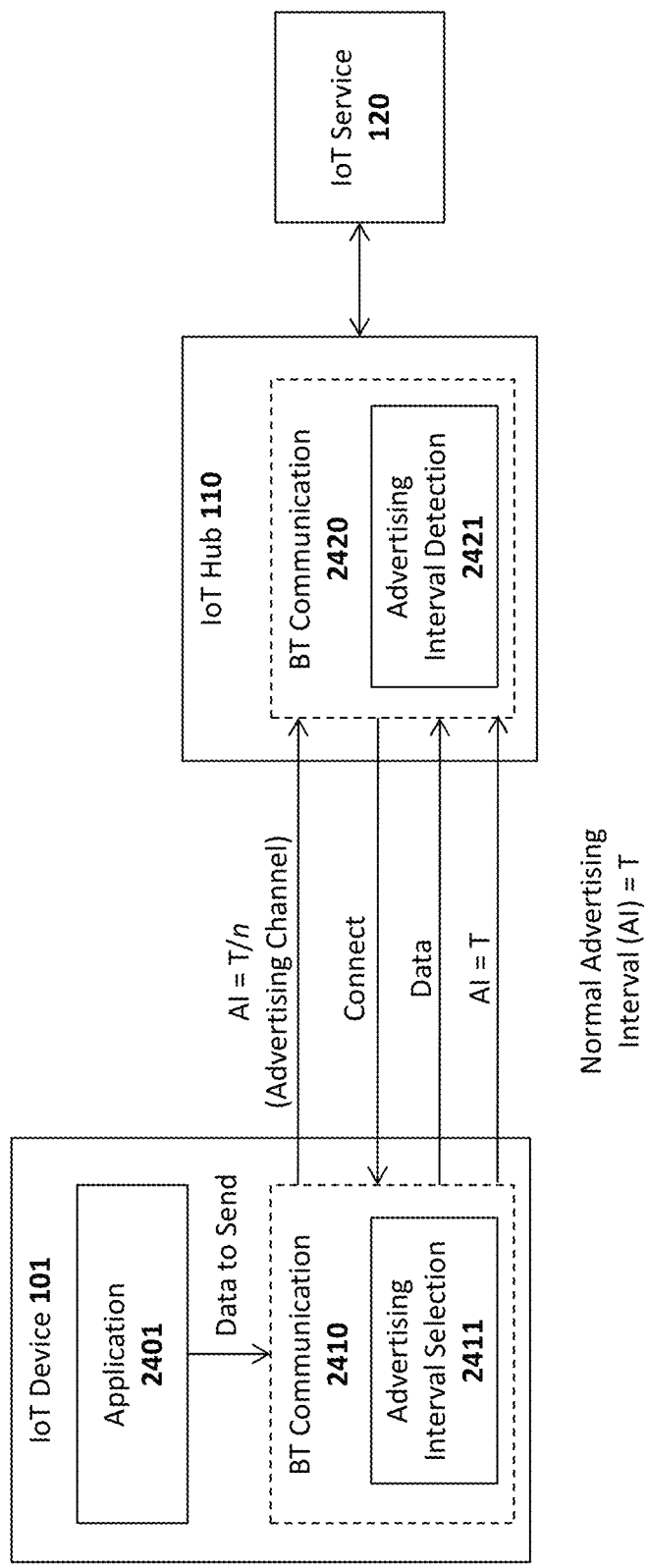
FIG. 24 illustrates one embodiment of the invention for adjusting an advertising interval to identify a data transmission condition.

FIG. 24 illustrates one embodiment of an IoT device 101 in which the BTLE communication interface 2410 includes advertising interval selection logic 2411 which adjusts the advertising interval when data is ready to be transmitted. In addition, the BTLE communication interface 2420 on the IoT hub 110 includes advertising interval detection logic 2421 to detect the change in the advertising interval, provide an acknowledgement, and receive the data.

In particular, in the illustrated embodiment, an application 2401 on the IoT device 101 indicates that it has data to be sent. In response, the advertising interval selection logic 2411 modifies the advertising interval to notify the IoT hub 110 that data is to be transmitted (e.g., changing the interval to 0.75 T or some other value). When the advertising interval detection logic 2421 detects the change, the BTLE communication interface 2420 connects to the BTLE communication interface 2410 of the IoT device 101, indicating that it is ready to receive the data. The BTLE communication interface 2410 of the IoT device 101 then transmits the data to the BTLE communication interface 2420 of the IoT hub. The IoT hub may then pass the data through to the IoT service 120 and/or to the user's client device (not shown). After the data has been transmitted, the advertising interval selection logic 2411 may then revert back to the normal advertising interval (e.g., AI=T).

In one embodiment of the invention, a secure communication channel is established between the IoT device 101 and the IoT service 120 using one or more of the security/encryption techniques described above (see, e.g., FIGS. 16A-23C and associated text). For example, in one embodiment, the IoT service 120 performs a key exchange with the IoT device 101 as described above to encrypt all communication between the IoT device 101 and the IoT service 120.

Figure 25:
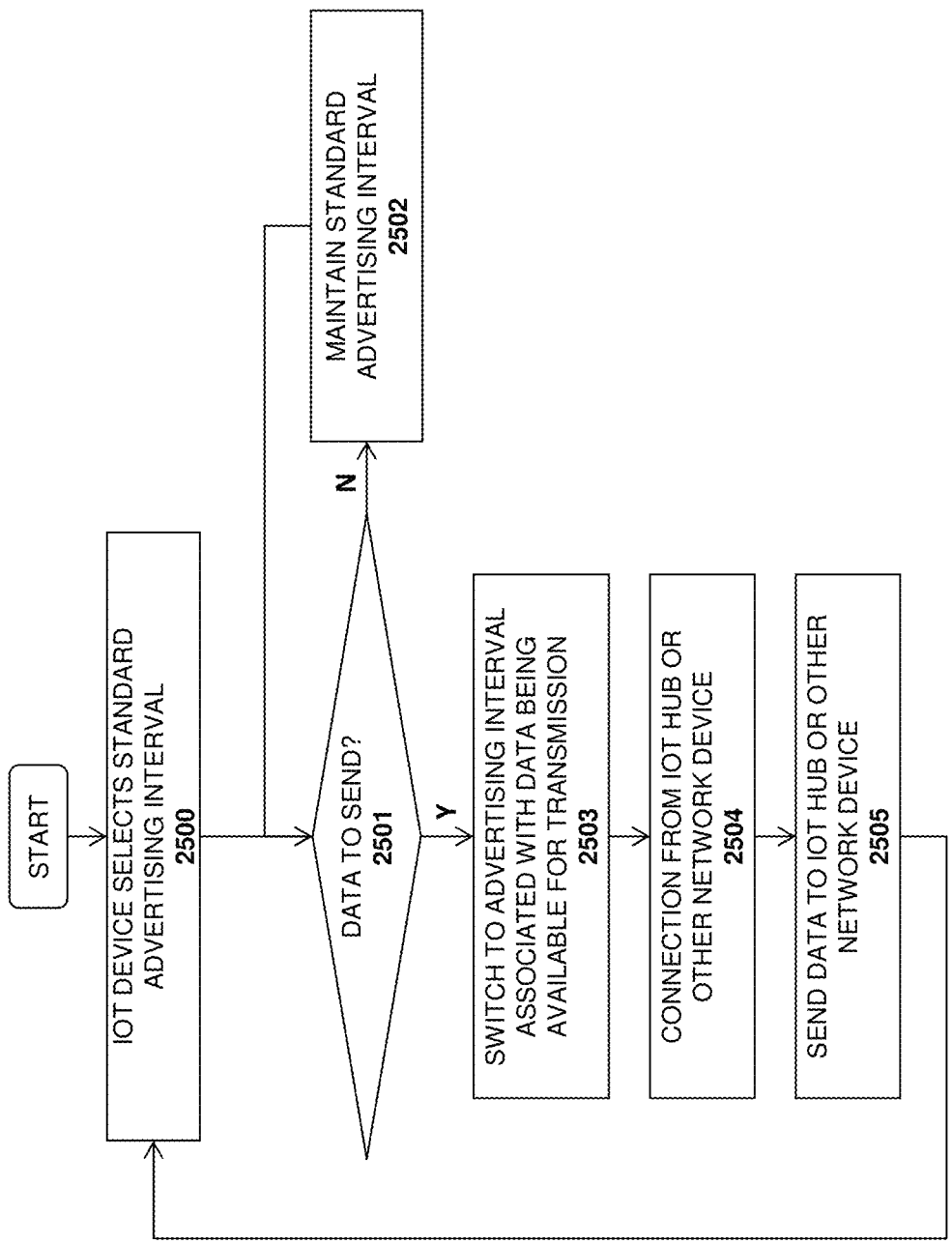
FIG. 25 illustrates a method in accordance with one embodiment of the invention.

A method in accordance with one embodiment of the invention is illustrated in FIG. 25. The method may be implemented within the context of the system architectures described above, but is not limited to any particular system architectures.

At 2500, the IoT device uses the standard advertising interval when generating advertising packets (e.g., separated by time T). The IoT device maintains the standard advertising interval at 2502 until it has data to send, determined at 2501. Then, at 2503, the IoT device switches the advertising interval to indicate that it has data to transmit. At 2504, the IoT hub or other network device establishes a connection with the IoT device, thereby allowing the IoT device to transmit its data. Finally, at 2505, the IoT device transmits its pending data to the IoT hub.

It should be noted that while the advertising interval techniques are described herein within the context of the BTLE protocol, the underlying principles of the invention are not limited to BTLE. In fact, the underlying principles of the invention may be implemented on any system which selects an advertising interval for establishing wireless communication between devices.

In addition, while a dedicated IoT hub 110 is illustrated in many embodiments above, a dedicated IoT hub hardware platform is not required for complying with the underlying principles of the invention. For example, the various IoT hubs described above may be implemented as software executed within various other networking devices such as iPhones® and Android® devices. In fact, the IoT hubs discussed above may be implemented on any device capable of communicating with IoT devices (e.g., using BTLE or other local wireless protocol) and establishing a connection over the Internet (e.g., to an IoT service using a WiFi or cellular data connection).

System and Method for Reducing Wireless Traffic when Connecting an IoT Hub to an IoT Device When multiple IoT hubs are configured in a particular location, a single IoT device may have the ability to connect with each IoT hub within range. As mentioned, an IoT device may use an advertising channel to notify any IoT hubs within range that it is "connectable" so that an IoT hub may connect to it to transmit commands and/or data. When multiple IoT hubs are within range of an IoT device, the IoT service may attempt to transmit commands/data addressed to the IoT device through each of these IoT hubs, thereby wasting wireless bandwidth and reducing performance (e.g., due to interference resulting from the multiple transmissions).

To address this issue, one embodiment of the invention implements techniques to ensure that once a particular IoT hub has successfully connected to the IoT device, the other IoT hubs will be notified to stop attempting to transmit the commands/data. This embodiment will be described with respect to FIGS. 26A-C which shows an exemplary set of IoT hubs 110-112 all of which are within range of an IoT device 101. As a result, the secure wireless communication module 2610 of the IoT device 101 is capable of seeing and connecting to the secure wireless communication modules 2650-2652 of each of the IoT hubs 110-112. In one embodiment, the secure wireless communication modules comprise the secure BTLE modules described above. However, the underlying principles of the invention are not limited to any particular wireless standard.

Figure 26A:
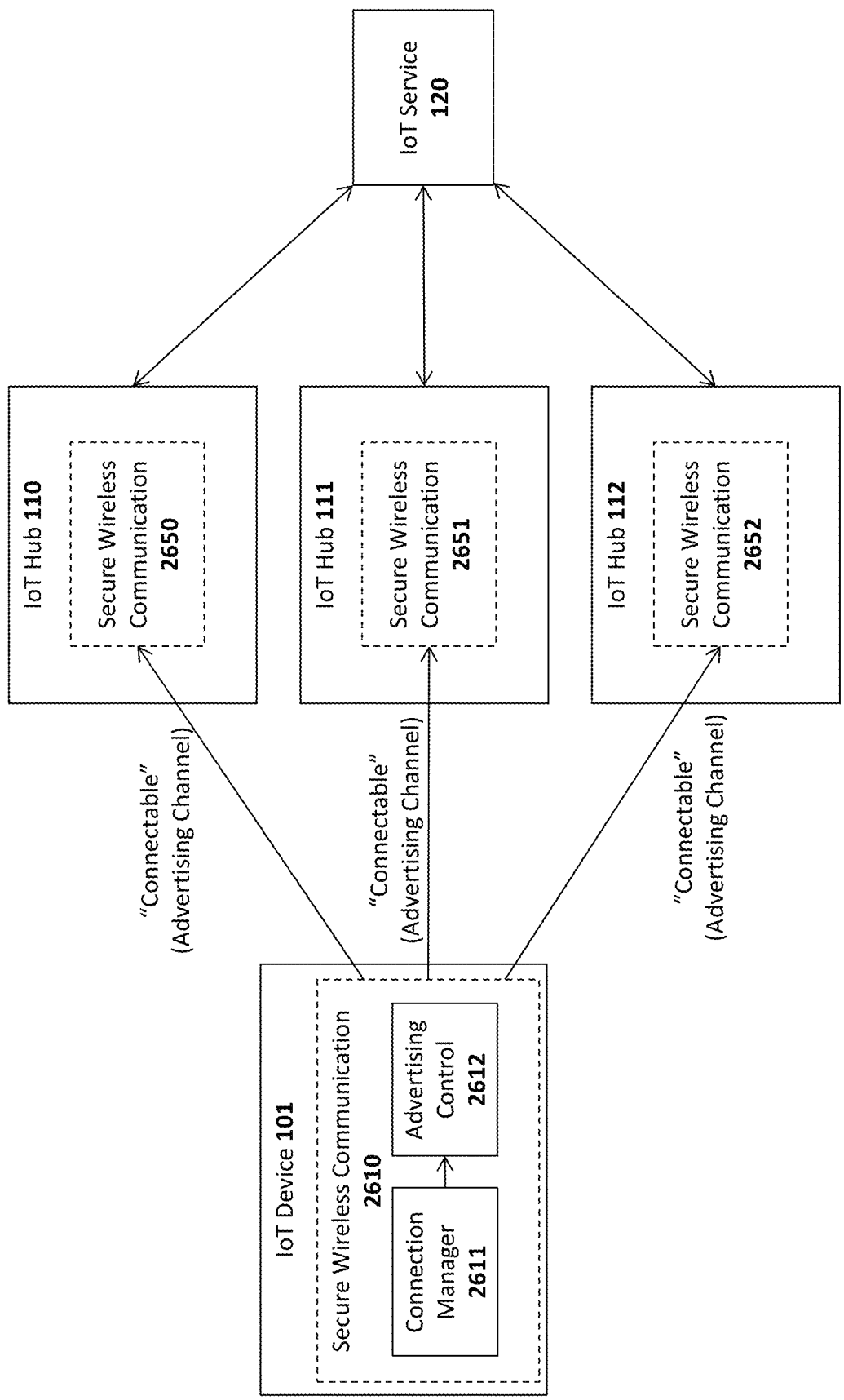
FIGS. 26A-C illustrate the operation of one embodiment in which multiple IoT hubs attempt to transmit data/commands to an IoT device.

As illustrated in FIG. 26A, in one embodiment, the secure wireless communication module 2610 of the IoT device 101 includes advertising control logic 2610 to periodically transmit an advertising beacon to nearby wireless communication devices indicating that it is "connectable" (i.e., may be connected to by any devices within range). Any IoT hubs 110-112 which receive the advertising beacon are then aware of the IoT device 101 and the secure wireless communication modules 2650-2652 may connect to the secure wireless communication module 2610 of the IoT device 101 when commands/data have been addressed to the IoT device 101 by the IoT service.

Figure 26B:
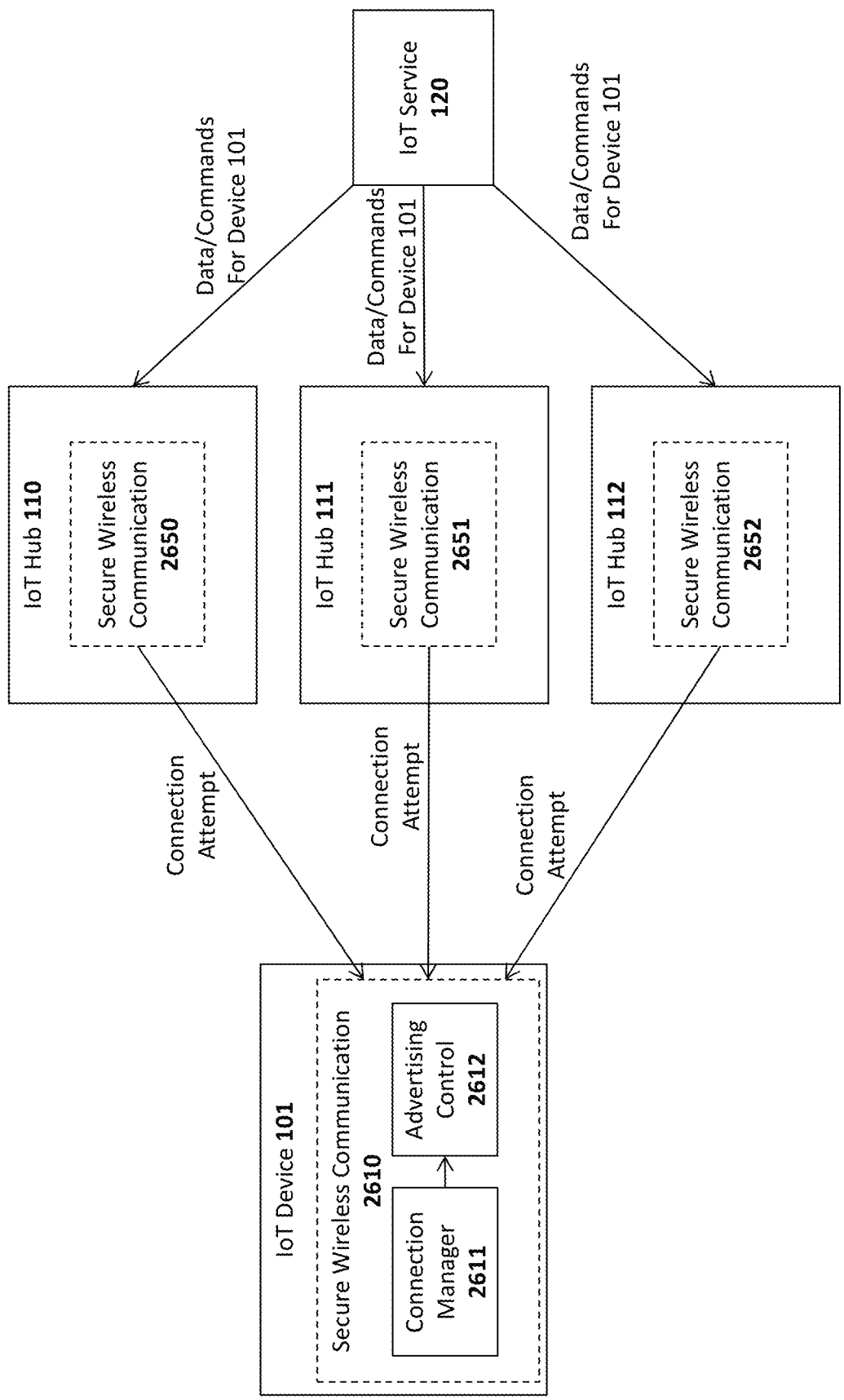

As illustrated in FIG. 26B, in one embodiment, when the IoT service has data/commands for the IoT device 101 it may transmit the data/commands to all of the IoT hubs 110-112 within the particular location (e.g., all IoT hubs associated with the user's account and/or within range of the IoT device 101). As illustrated, each of the IoT hubs 110-112 may then attempt to connect with the IoT device 101 to provide the commands/data.

Figure 26C:
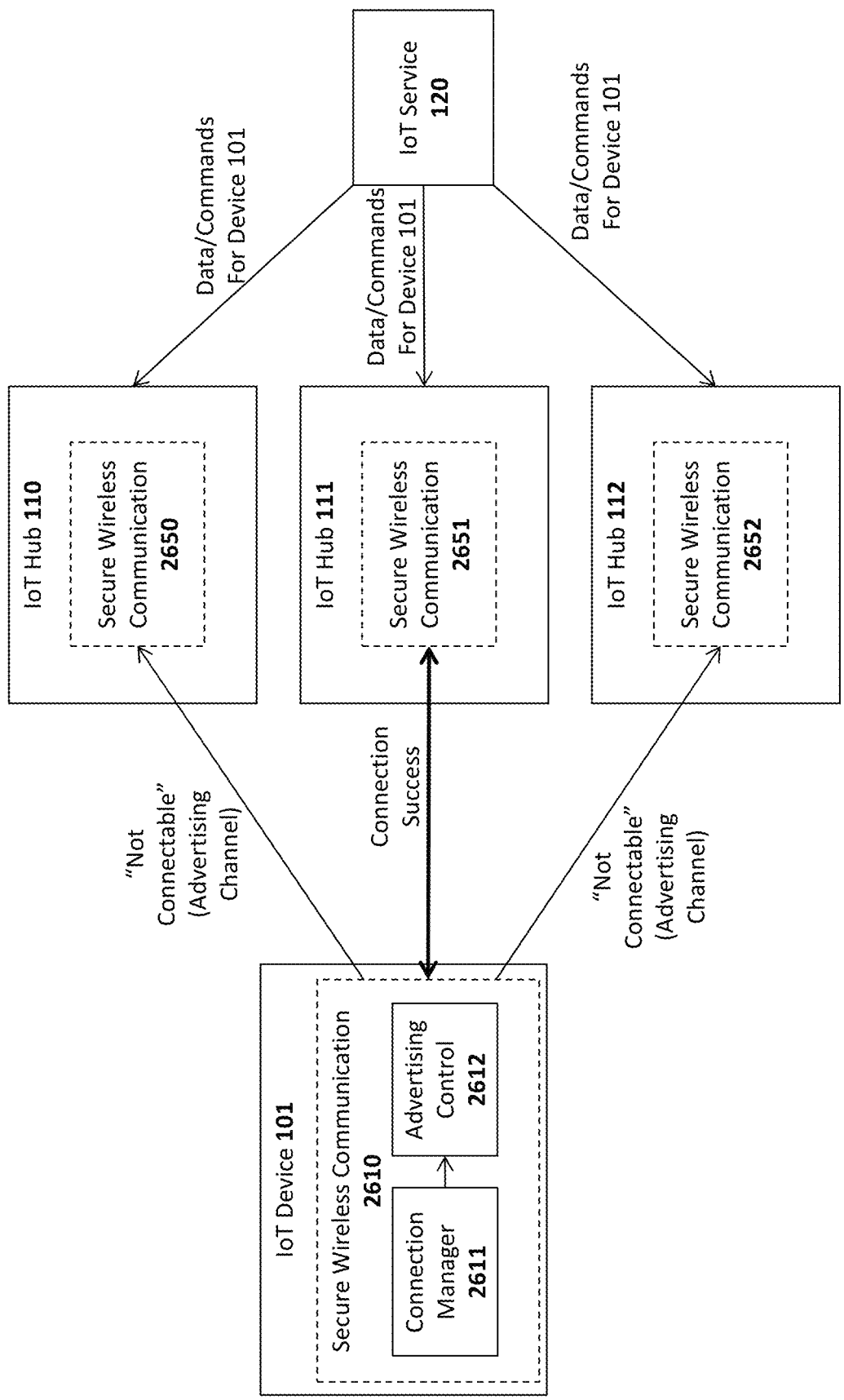

As illustrated in FIG. 26C, in one embodiment, only a single IoT hub 111 will successfully connect to the IoT device 101 and provide the commands/data for processing by the IoT device 101. With certain wireless communication protocols such as BTLE, once a connection has been made, the secure wireless communication module 2610 will stop transmitting advertising beacons. As such, the other IoT hubs 110, 112 will not have any way of knowing that the IoT device 101 has successfully received the data from IoT hub 111 and will continue to attempt to transmit the commands/data, thereby consuming wireless bandwidth and creating interference.

To address this limitation, one embodiment of the secure wireless communication module 2610 includes a connection manager 2611 which, upon detecting a successful connection with the secure wireless communication module 2651 of the IoT hub 111, causes the advertising control module 2612 to continue transmitting advertising beacons. However, instead of indicating that the IoT device 101 is "connectable," the new advertising beacons indicate that the IoT device 101 is "not connectable." In one embodiment, in response to the "not connectable" indication, the secure wireless communication modules 2650, 2652 of the IoT hubs 110, 112 will stop attempting to transmit the commands/data to the IoT device, thereby reducing unnecessary wireless traffic.

The above techniques provide an elegant solution to undesirable wireless traffic using techniques which may be readily implemented on top of existing wireless protocols. For example, in one embodiment, the "connectable" and "not connectable" indications are implemented within the context of the BTLE standard. However, as mentioned, the underlying principles of the invention may be implemented using a variety of different wireless network protocols.

Figure 27:
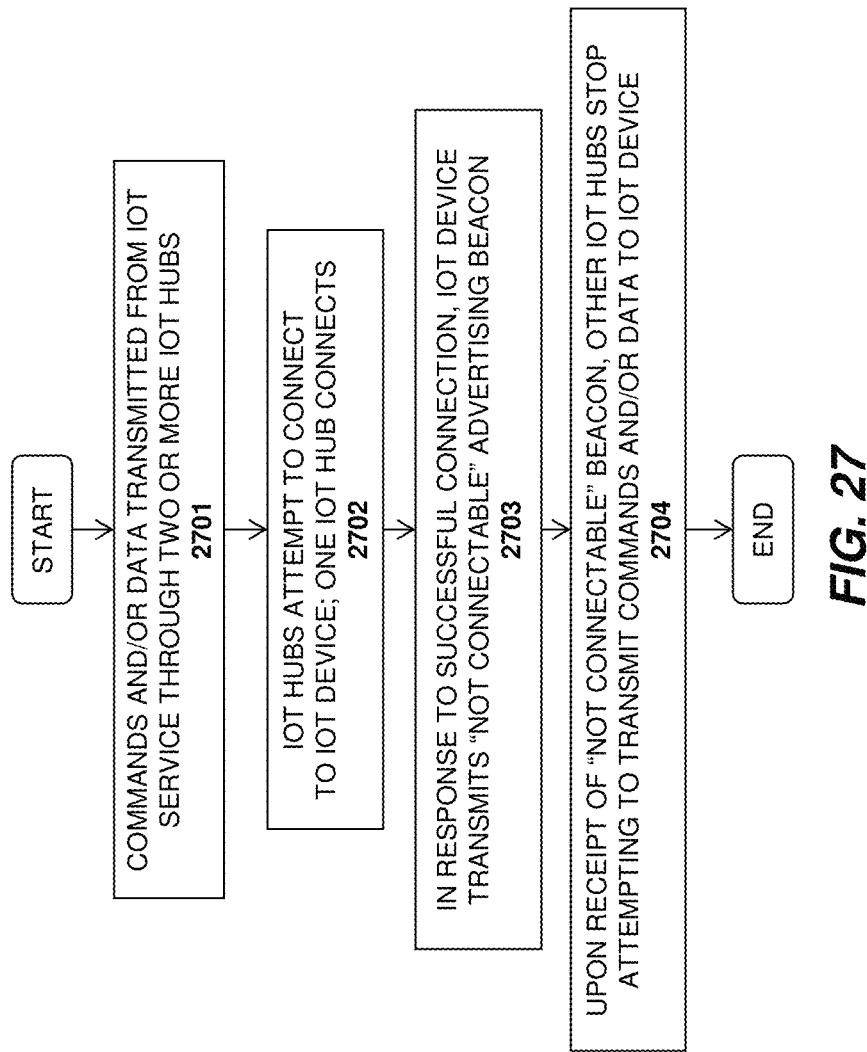
FIG. 27 illustrates a method in accordance with one embodiment of the invention.

A method in accordance with one embodiment of the invention is illustrated in FIG. 27. The method may be implemented within the context of the system architectures described above, but is not limited to any particular system architecture.

At 2701, commands and/or data are transmitted from the IoT service through two or more IoT hubs. For example, the user may be attempting to control an IoT device via an app on the user's mobile device, which is connected to the IoT service. At 2702, the IoT hubs attempt to connect to the IoT device and one of the IoT hubs successfully connects and provides the commands/data to the IoT device. As mentioned, the IoT hubs may be aware of the IoT device as a result of the IoT device transmitting a "connectable" indication in an advertising beacon.

At 2703, in response to a successful connection, the IoT device begins transmitting a "not connectable" advertising beacon, thereby informing any IoT hubs within range that the IoT device is no longer connectable. At 2704, upon receipt of the "not connectable" beacon, the other IoT hubs stop attempting to transmit the commands/data to the IoT device.

System and Method for Secure Internet of Things (IoT) Device Provisioning

As mentioned above, in one embodiment, when device advertises to an IoT hub, it uses an 8-byte "device ID" which the hub and the IoT service uses to uniquely identify the IoT device. The device ID may be included within the unique barcode or QR code printed on the IoT device which is read and transmitted to the IoT service to provision/register the IoT device in the system. Once provisioned/registered, the device ID is used to address the IoT device in the system.

One security concern with this implementation is that because the barcode/QR code data may be transmitted without encryption, it may be possible to sniff the wireless transmission of the device ID to compromise the system, thereby allowing another user to associate the device ID with his/her account.

Figure 28:
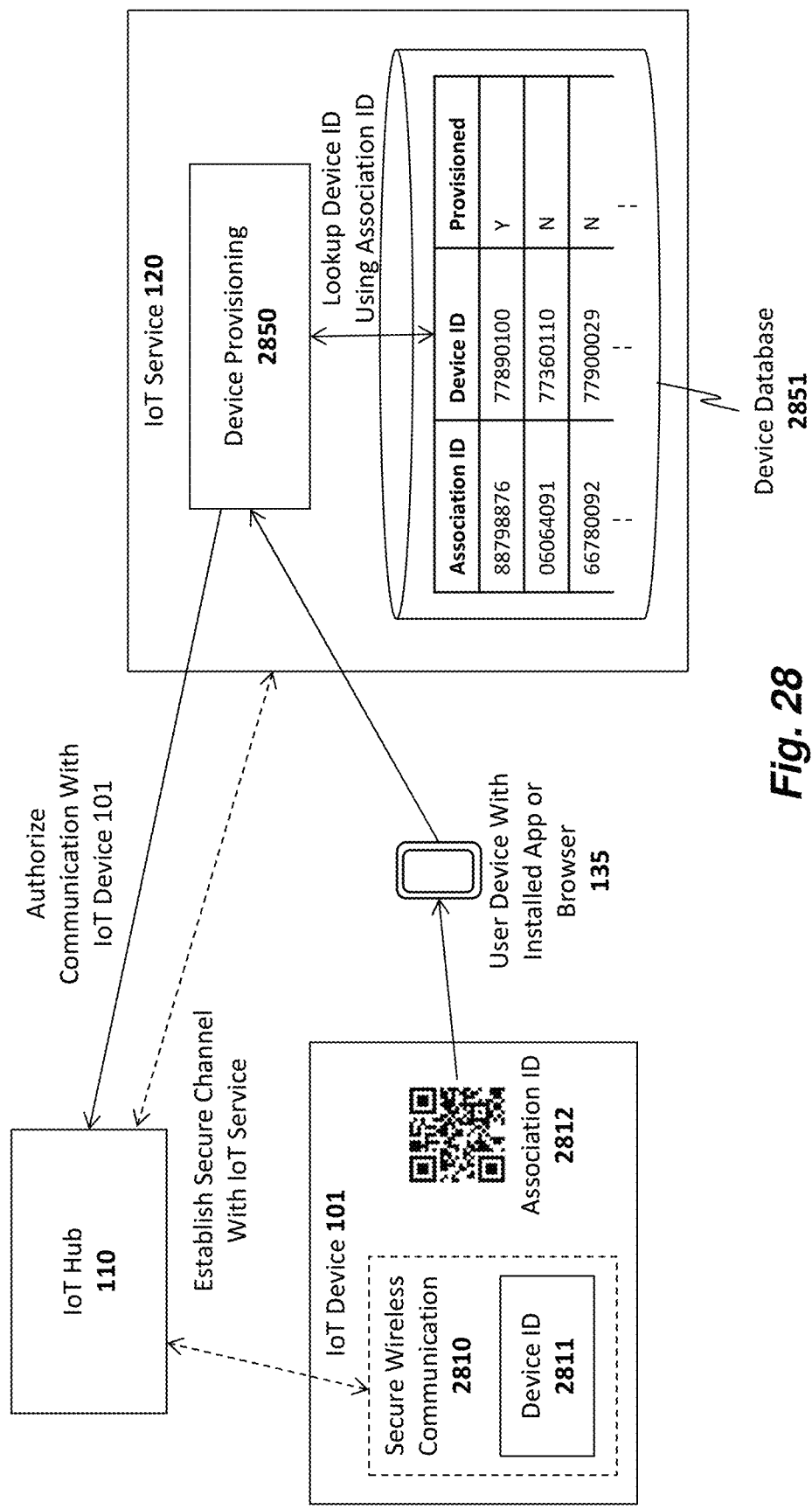
FIG. 28 illustrates one embodiment of a system for secure IoT device provisioning.

In one embodiment, to address this concern, an "association ID" is associated with each device ID and used during the provisioning process to ensure that the device ID is never transmitted in the clear. As illustrated in FIG. 28, in this embodiment, the association ID 2812 is included in the barcode/QR code printed on the IoT device 101 while the device ID 2811 is maintained securely within the secure wireless communication module 2810 which implements the techniques described above to ensure secure communication with the IoT service 120. In one embodiment, the association ID 2812 is an 8 byte ID like the device ID and is unique per IoT device. When a new IoT device 101 is provisioned in the system, the user scans the barcode/QR code containing the association ID 2812 with a user device 135 having an IoT app or application installed thereon. Alternatively, or in addition, the IoT hub 110 may be used to capture the barcode/QR code including the association ID.

In either case, the association ID is transmitted to a device provisioning module 2850 on the IoT service 120 which performs a lookup in a device database 2851 which includes an association between each association ID and each device ID. The device provisioning module 2850 uses the association ID 2812 to identify the device ID 2811 and then uses the device ID to provision the new IoT device 101 in the system. In particular, once the device ID has been determined from the device database 2851, the device provisioning module 2850 transmits a command to the IoT hubs 110 (which may include the user device 135) authorizing the IoT hubs 110 to communicate with the IoT device 101 using the device ID 2811.

In one embodiment, the association ID 2812 is generated at a factory when the IoT device 101 is manufactured (i.e., when the secure wireless communication module 2810 is provisioned). Both the device ID 2811 and the association ID 2812 may then be provided to the IoT service and stored within the device database 2851. As illustrated, the device database 2851 may include an indication specifying whether each device has been provisioned. By way of example, this may be a binary value with a first value (e.g., 1) indicating that the IoT device 101 is provisioned and a second value (e.g., 0) indicating that the IoT device is not provisioned. Once the system has provisioned/registered the IoT device 101, the device ID may be used because the communication between the IoT service 120 and IoT device 101 is protected using the security techniques described above.

In one embodiment, when a user sells an IoT device, the user may release the device ID by logging in to the IoT service 120 and releasing the IoT device from the user's account. The new user may then provision the IoT device and associate the IoT device with his/her account using the device provisioning techniques described herein.

Figure 29:
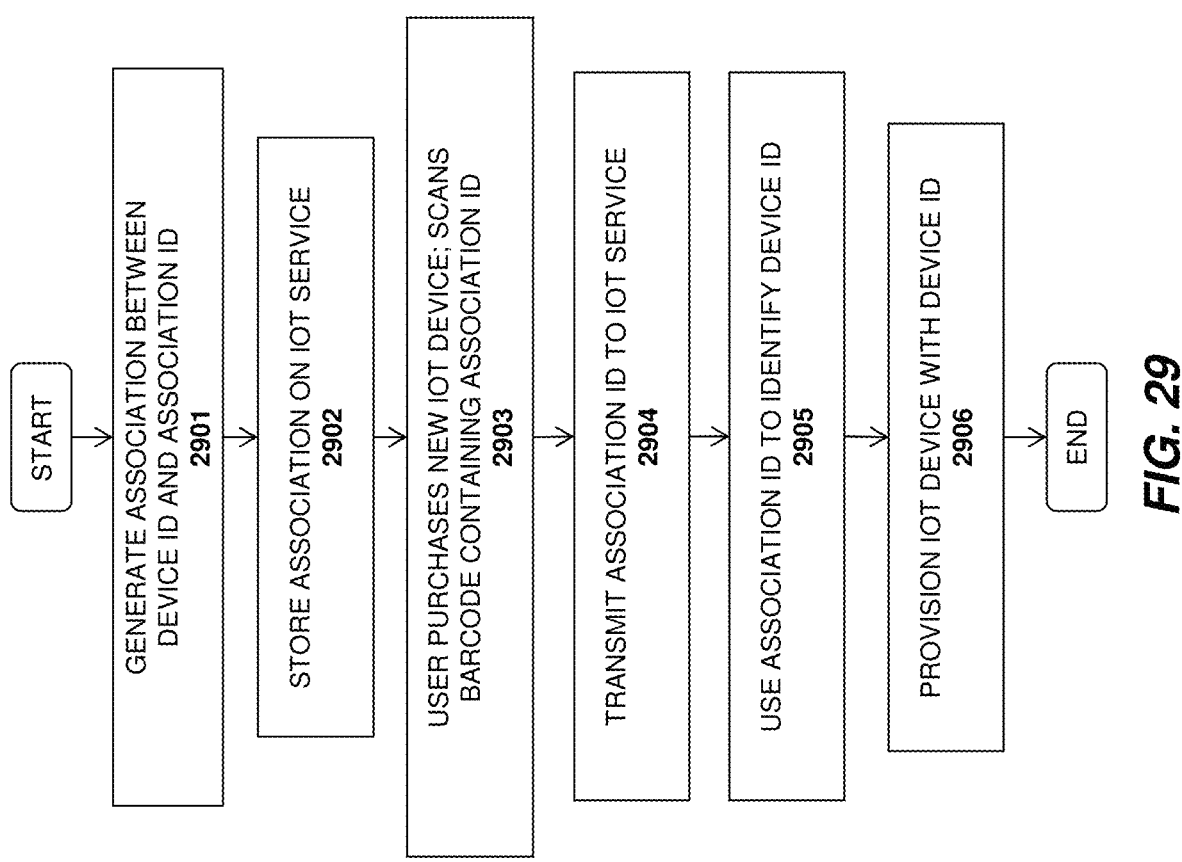
FIG. 29 illustrates a method in accordance with one embodiment of the invention.

A method in accordance with one embodiment of the invention is illustrated in FIG. 29. The method may be implemented within the context of the system architectures described above, but is not limited to any particular system architecture.

At 2901, an association is generated between a device ID and an association ID of an IoT device (e.g., at the factory at which the IoT device is manufactured). The association ID may be embedded within a barcode/QR code which is stamped on the IoT device. At 2902, the association between the device ID and association ID is stored on the IoT service. At 2903, the user purchases the new IoT device and scans the barcode/QR code containing the association ID (e.g., via the user's mobile device with an app or application installed thereon or via an IoT hub with a barcode reader).

At 2904, the association ID is transmitted to the IoT service and, at 2905, the association ID is used to identify the device ID. At 2906, the IoT device is provisioned using the device ID. For example, the IoT device database may be updated to indicate that this particular device ID has been provisioned and the IoT service may communicate the device ID to IoT hubs, instructing the IoT hubs to communicate with the new IoT device.

System and Method for Performing Flow Control in an Internet Off Things (Iot) System Local wireless network traffic will increase based on the number of IoT devices within a given location. Moreover, in some instances, an IoT device may be transmitting more data than is reasonable given the function being performed by the IoT device. For example, software/hardware on the IoT device may malfunction, or the IoT device may be hacked, causing the IoT device to continually transmit unneeded data to the IoT service.

One embodiment of the invention addresses these issues by performing flow control at the IoT hubs, effectively ignoring data traffic when specified data thresholds have been reached by a particular IoT device. In one embodiment, each IoT device is configured with a specified set of flow control parameters indicating the amount of data over a period of time which the IoT device is permitted to transmit. The flow control parameters may be based on the type of IoT device. For example, certain IoT devices such as door locks and thermostats should typically only transmit short packets of data periodically whereas other IoT device such as video cameras may transmit a significantly greater amount of data, potentially in a non-periodic manner. Thus, the flow control parameters may be set to provide a sufficient amount of bandwidth based on the expected operation of the IoT device in question. In one embodiment, each IoT device is assigned to a particular flow control "class" based on the data requirements of that IoT device.

Figure 30:
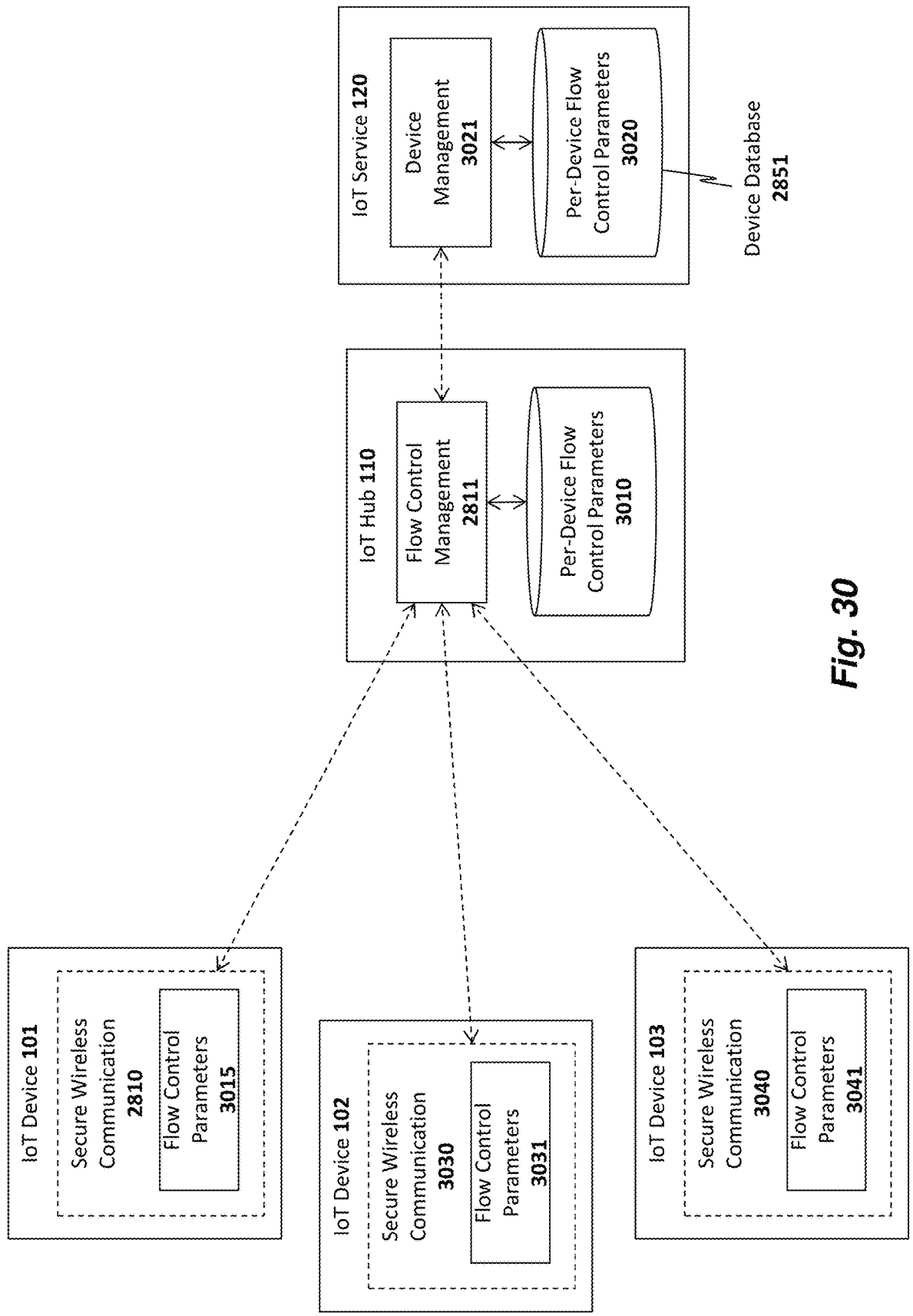
FIG. 30 one embodiment of a system for performing flow control for a plurality of IoT devices.

Once such embodiment is illustrated in FIG. 30, which shows a plurality of IoT device 101-103 with secure wireless communication modules 2810, 3030, 3040 configured with different sets of flow control parameters 3015, 3031, 3041, respectively. In one embodiment, the flow control parameters specify the frequency and/or amount of data which each IoT device is expected to transmit over a specified period of time (e.g., 0.25 Mbytes/hour, 50 Mbytes/hour, 100 Mbytes/day, 10 communication attempts/day, etc). In one embodiment, the flow control parameters 3015, 3031, 3041, may be specified by the IoT service 120 which, as illustrated, includes device management module 3021 to manage a set of per-device flow control parameters 3020 within an IoT device database 2851. For example, once the data transmission requirements for each IoT device are determined, the per-flow control parameters 3020 may be updated to reflect these requirements.

As mentioned, in one embodiment, the device database 2851 includes data transmission requirements for a plurality of different flow control "classes" (e.g., audiovisual device, temperature device, control device, security device, etc). When a new IoT device is introduced in the system, it is then associated with a particular flow control class based on the requirements of the IoT device and/or the type of IoT device.

The per-device flow control parameters 3020 may be distributed to IoT hubs 110 which include flow control management logic 2811 to store a copy of the per-device flow control parameters 3010 within a local database. In one embodiment, the flow control management 2811 may monitor the amount of data traffic received from and/or transmitted to each IoT device 101-103. If the amount of data traffic reaches a specified threshold (as indicated by the per-device flow control parameters 3010) then the IoT hub 110 may instruct the IoT device to stop transmitting for a period of time and/or may simply block traffic from the IoT device.

If a particular IoT device is transmitting/receiving at a level above the specified threshold, then this may indicate that the IoT device is malfunctioning. As such, in one embodiment, the IoT service 120 may transmit a command to reset the IoT device. If the device is still communicating at a level above the threshold, then the IoT service 120 may transmit a software update such as a patch to the IoT device. Once the software updated is installed, the IoT device is reset and initialized with the new software. In addition, a notification may be sent from the IoT service to the user device to inform the user that the IoT device is malfunctioning.

In one embodiment, the IoT hub 110 may allow certain types of data traffic notwithstanding the fact that data communication thresholds have been reached. For example, in one embodiment, the IoT hub 110 will permit certain types of "high priority" notifications even if an IoT device has reached its thresholds. By way of example, if the IoT device is a door lock or door entry detector, then under certain conditions (e.g., when the house is being monitored), the IoT hub 110 may pass through data indicating that someone has opened the door in which the IoT device is being used. Similarly, if the IoT device is a heat and/or smoke detector, then the IoT hub 110 may pass through data indicating an alarm condition (e.g., because the temperature has reached a threshold value). Various other types of "high priority" notifications (e.g., such as those representing a potentially hazardous condition) may be passed through by the IoT hub 110 regardless of the current flow control status. In one embodiment, these "high priority" notifications are identified using different attributes as described below.

Figure 31:
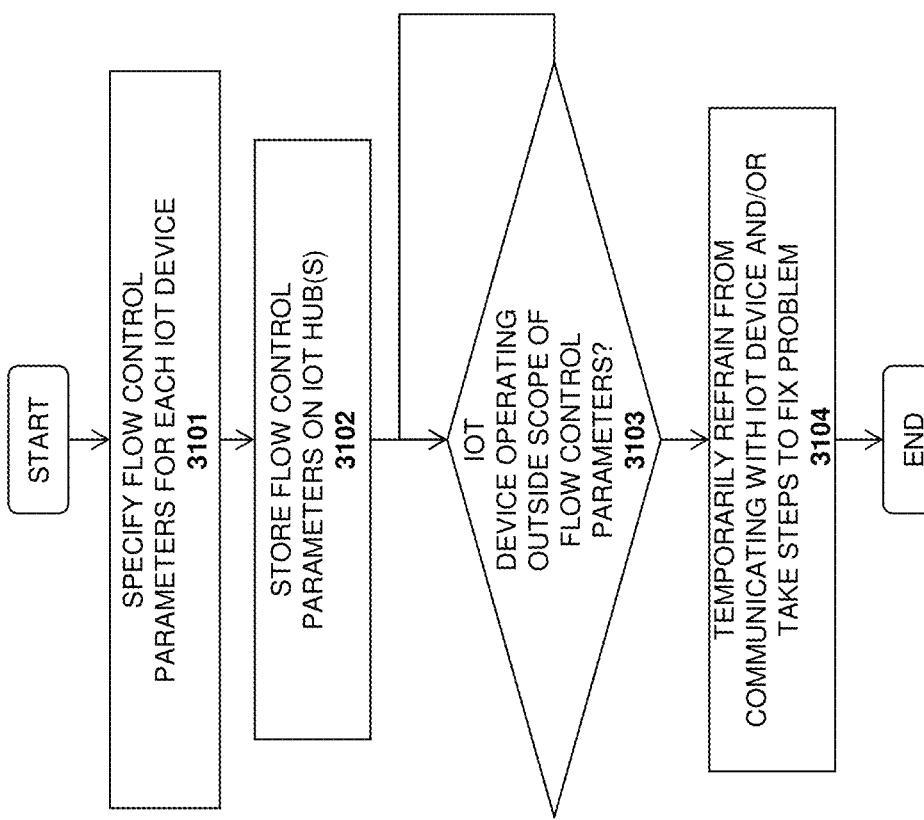
FIG. 31 illustrates a method in accordance with one embodiment of the invention.

A method in accordance with one embodiment of the invention is illustrated in FIG. 31. The method may be implemented within the context of the system architectures described above, but is not limited to any particular system architecture.

At 3101, flow control parameters are specified for each IoT device. In one embodiment, and IoT device may be assigned to a particular IoT device "class" which has a specified set of flow control parameters associated therewith. At 3102, the flow control parameters are stored on IoT hubs within the IoT system. In one embodiment, each hub may store a subset of all of the IoT device parameters (e.g., only those parameters for IoT devices that have been provisioned locally).

If an IoT hub detects that a particular IoT device is operating outside of the specified flow control parameters, determined at 3103, then AT 3104 the IoT hub will temporarily refrain from further communication with the IoT device (e.g., blocking communication between the IoT device and the IoT service). In addition, as mentioned, the IoT service and/or IoT hub may take steps to remedy the problem by rebooting the IoT device and/or installing a software update on the IoT device.

System and Method for Managing Internet of Things (IoT) Devices and Traffic Using Attribute Classes Different IoT devices may be used to perform different functions in a given location. For example, certain IoT devices may be used to collect data such as temperature and status (e.g., on/off status) and report this data back to the IoT service, where it may be accessed by an end user and/or used to generate various types of alert conditions. To enable this implementation, one embodiment of the invention manages collected data, system data, and other forms of data using different types of attribute classes.

Figure 32:
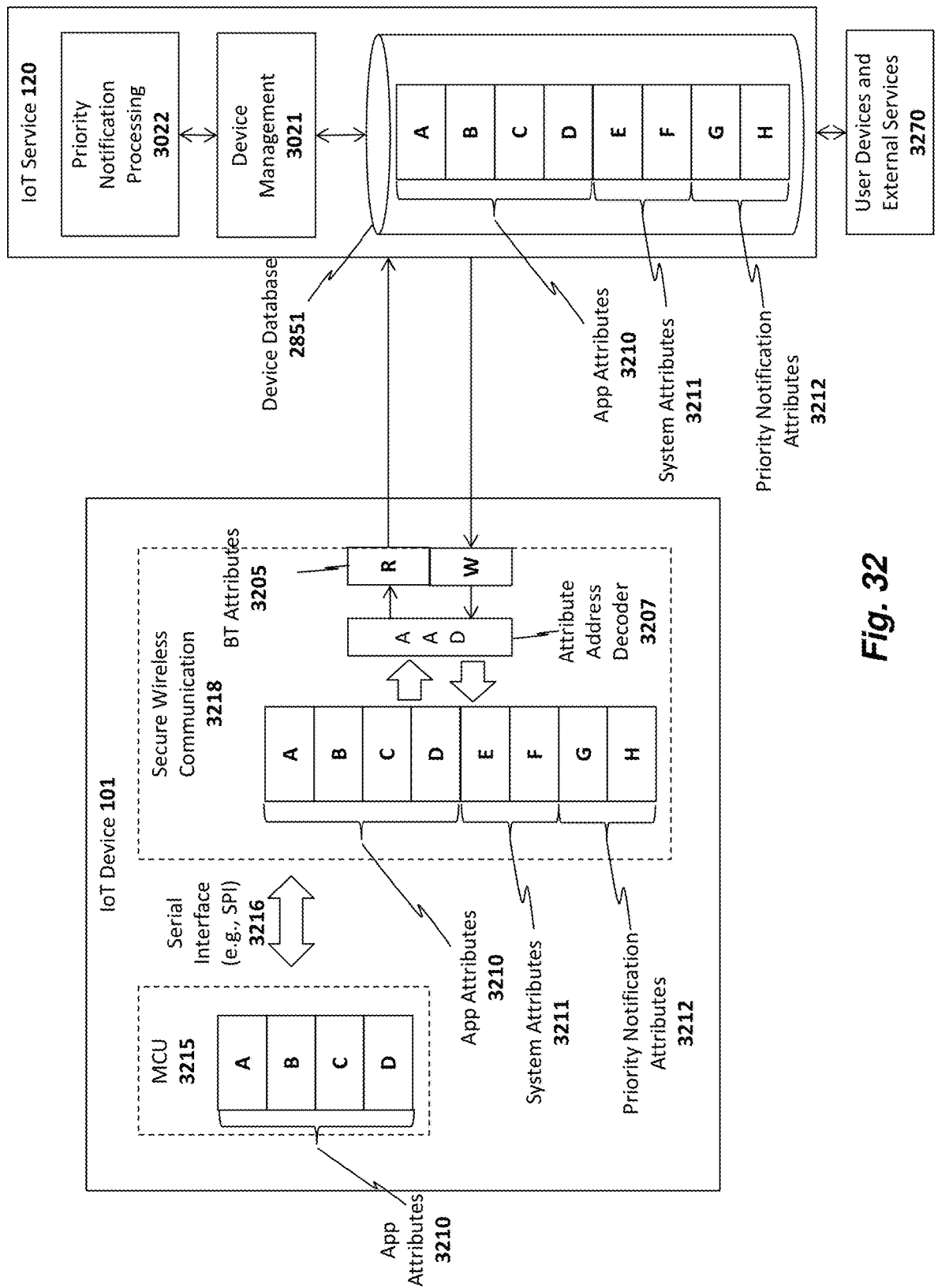
FIG. 32 illustrates one embodiment of a system for managing application attributes, system attributes, and priority notification attributes.

FIG. 32 illustrates one embodiment of an IoT device which includes a secure wireless communication module 3218 which communicates with a microcontroller unit (MCU) 3215 over a serial interface 3216 such as an Serial Peripheral Interface (SPI) bus. The secure wireless communication module 3218 manages the secure communication with the IoT service 120 using the techniques described above and the MCU 3215 executes program code to perform an application-specific function of the IoT device 101.

In one embodiment, various different classes of attributes are used to manage the data collected by the IoT device and the system configuration related to the IoT device. In particular, in the example shown in FIG. 32, the attributes include application attributes 3210, system attributes 3211, and priority notification attributes 3212. In one embodiment, the application attributes 3210 comprise attributes related to the application-specific function performed by the IoT device 101. For example, if the IoT device comprises a security sensor, then the application attributes 3210 may include a binary value indicating whether a door or window has been opened. If the IoT device comprises a temperature sensor, then the application attributes 3210 may include a value indicating a current temperature. A virtually unlimited number of other application-specific attributes may be defined. In one embodiment, the MCU 3215 executes application-specific program code and is only provided with access to the application-specific attributes 3210. For example, an application developer may purchase the IoT device 101 with the secure wireless communication module 3218 and design application program code to be executed by the MCU 3215. Consequently, the application developer will need to have access to application attributes but will not need to have access to the other types of attributes described below.

In one embodiment, the system attributes 3211 are used for defining operational and configuration attributes for the IoT device 101 and the IoT system. For example, the system attributes may include network configuration settings (e.g., such as the flow control parameters discussed above), the device ID, software versions, advertising interval selection, security implementation features (as described above) and various other low level variables required to allow the IoT device 101 to securely communicate with the IoT service.

In one embodiment, a set of priority notification attributes 3212 are defined based on a level of importance or severity associated with those attributes. For example, if a particular attribute is associated with a hazardous condition such as a temperature value reaching a threshold (e.g., when the user accidentally leaves the stove on or when a heat sensor in the user's home triggers) then this attribute may be assigned to a priority notification attribute class. As mentioned above, priority notification attributes may be treated differently than other attributes. For example, when a particular priority notification attribute reaches a threshold, the IoT hub may pass the value of the attribute to the IoT service, regardless of the current flow control mechanisms being implemented by the IoT hub. In one embodiment, the priority notification attributes may also trigger the IoT service to generate notifications to the user and/or alarm conditions within the user's home or business (e.g., to alert the user of a potentially hazardous condition).

As illustrated in FIG. 32, in one embodiment, the current state of the application attributes 3210, system attributes 3211 and priority notification attributes 3212 are duplicated/ mirrored within the device database 2851 on the IoT service 120. For example, when a change in one of the attributes is updated on the IoT device 101, the secure wireless communication module 3218 communicates the change to the device management logic 3021 on the IoT service 120, which responsively updates the value of the attribute within the device database 2851. In addition, when a user updates one of the attributes on the IoT service (e.g., adjusting a current state or condition such as a desired temperature), the attribute change will be transmitted from the device management logic 3021 to the secure wireless communication module 3218 which will then update its local copy of the attribute. In this way, the attributes are maintained in a consistent manner between the IoT device 101 and the IoT service 120. The attributes may also be accessed from the IoT service 120 via a user device with an IoT app or application installed and/or by one or more external services 3270. As mentioned, the IoT service 120 may expose an application programming interface (API) to provide access to the various different classes of attributes.

In addition, in one embodiment, priority notification processing logic 3022 may perform rule-based operations in response to receipt of a notification related to a priority notification attribute 3212. For example, if a priority notification attribute indicates a hazardous condition (e.g., such as an iron or stove being left on by the user), then the priority notification processing logic 3022 may implement a set of rules to attempt to turn off the hazardous device (e.g., sending an "off" command to the device if possible). In one embodiment, the priority notification processing logic 3022 may utilize other related data such as the current location of the user to determine whether to turn off the hazardous device (e.g., if the user is detected leaving the home when the hazardous device in an "on" state). In addition, the priority notification processing logic 3022 may transmit an alert condition to the user's client device to notify the user of the condition. Various other types of rule sets may be implemented by the priority notification processing logic 3022 to attempt to address a potentially hazardous or otherwise undesirable condition.

Also shown in FIG. 32 is a set of BTLE attributes 3205 and an attribute address decoder 3207. In one embodiment, the BTLE attributes 3205 may be used to establish the read and write ports as described above with respect to FIGS. 19-20. The attribute address decoder 3207 reads a unique ID code associated with each attribute to determine which attribute is being received/transmitted and process the attribute accordingly (e.g., identify where the attribute is stored within the secure wireless communication module 3218).

Apparatus and Method for Anonymous IoT Device Accounts and IoT Device Transferring and Loaning User account creation is a significant barrier to acquiring new subscribers of IoT systems. For example, a potential subscriber may choose to delay or refrain from signing up with an online IoT service if a significant amount of personal and/or financial information is required (e.g., phone numbers, credit card data, Paypal account information, etc).

One embodiment of the invention addresses this limitation by automating account creation. In particular, one embodiment implements an architecture and process in which an anonymous user account is created at the time an IoT device is initially provisioned with the IoT service. The anonymous user account may be created automatically, the first time the user scans the QR code associated with the IoT device. The IoT service may subsequently request additional information from the user to establish a non-anonymous user account in a non-invasive manner after the user has had the opportunity to try out the IoT implementation.

Thus, in one embodiment, the automatic account creation allows users to test an IoT device within seconds of scanning the QR code without any information tied to the user. The IoT device is loosely coupled with an authenticated, secure session that the IoT service creates for the account (e.g., using the security/encryption techniques described above). In one embodiment, if the user closes the IoT app on the client device or the session expires before any linking to a user is made, the account is orphaned. An IoT device associated with an orphaned account may be linked to a new account when the IoT device is associated again through the IoT app on the client device. An IoT device transfer to a new user may clear any changes to provide each new user with a new device experience.

Figure 33:
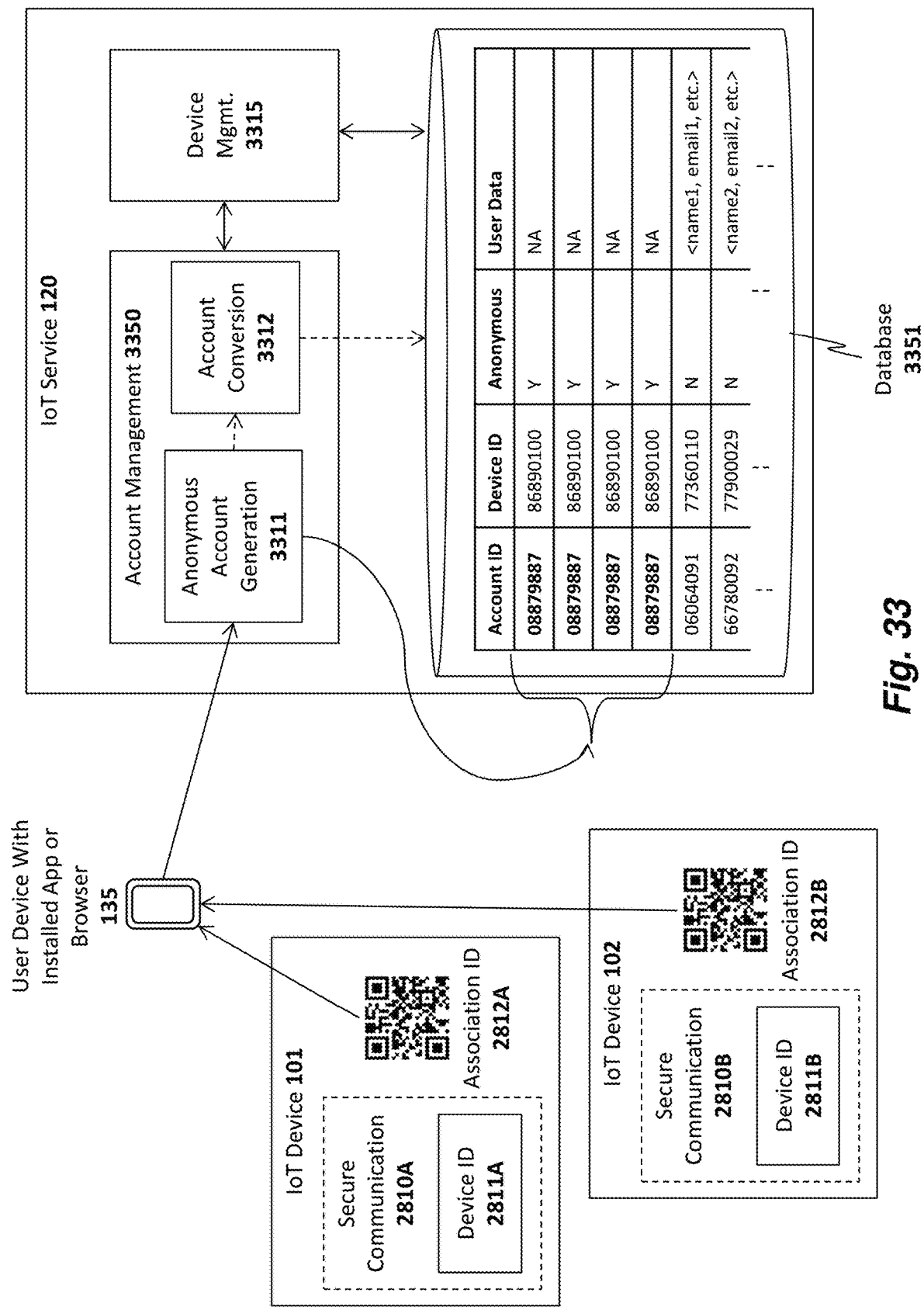
FIGS. 33-34 illustrate embodiments of the invention for creating and converting anonymous accounts.

FIG. 33 illustrates an architecture on which embodiments of the invention may be implemented. In operation, a user of mobile device 135 opens the IoT app (or browser-executable code) which provides a camera interface for using the camera of the mobile device 135 to capture the association IDs 2812A-B of one or more IoT devices 101-102. As mentioned, the association IDs 2812A-B may be encoded as QR codes, barcodes, or any other form of optical coding displayed on the IoT devices 101-102. Alternatively, in one embodiment, the association IDs may be communicated via a wireless protocol such as Near Field Communication (NFC) or BTLE. As previously described with respect to FIG. 28, the association ID 2812 may be transmitted to a device provisioning module 2850 on the IoT service 120 which performs a lookup in a device database 2851 containing a link between each association ID and a device ID. The device provisioning module 2850 uses the association ID 2812 to identify the device ID 2811 and then uses the device ID to provision the new IoT device 101 in the system and establish a secure connection with the IoT service 120. For additional detail, see the description of FIGS. 28-29 above.

Returning to FIG. 33, one embodiment of the invention includes an account management module 3350 for managing user accounts and a device management module 3315 for managing IoT devices. In the illustrated embodiment, the account management module 3350 includes anonymous account generation logic 3311 for generating anonymous accounts and associating those accounts with one or more IoT devices as described herein. Once the anonymous account generation logic 3311 has generated an anonymous account, the user of that account may control and receive data from the IoT devices in the same manner as other users with non-anonymous accounts (although certain limitations may be placed on anonymous accounts as described below).

At some subsequent point in time (e.g., after the user has been provided an opportunity to test the IoT devices), the IoT app on the user device 135 may present the user with the option to open an account by providing a limited amount of personal information (e.g., an email address, phone number, etc). Once the user has entered this information, account conversion logic 3312 converts the database to a non-anonymous account and adds the user data to the database. For example, in FIG. 33, the database 3351 includes four entries corresponding to four different IoT devices which are initially associated with an anonymous account.

Figure 34:
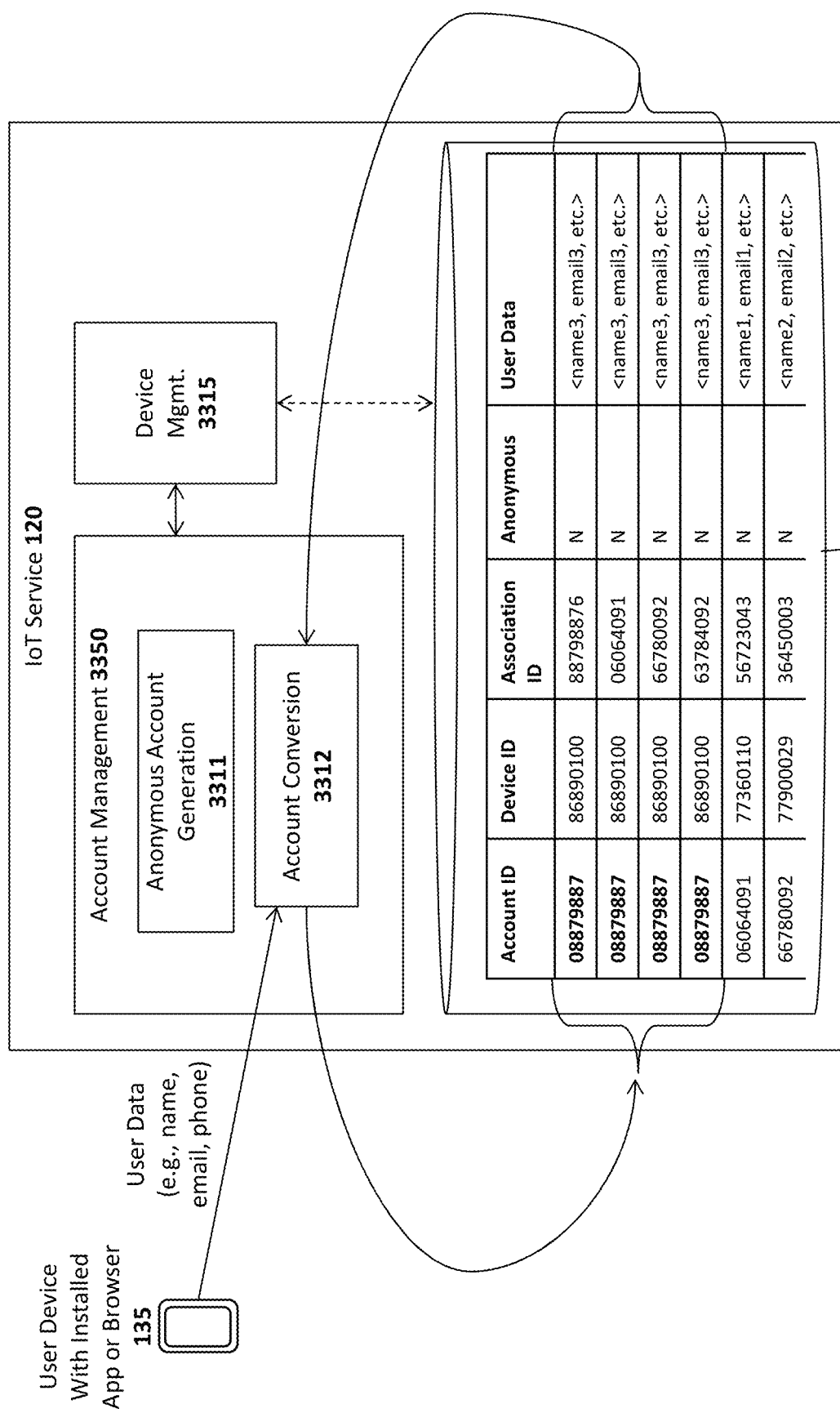

Once the user has entered some specified amount of personal information, the account conversion logic 3312 converts these entries to non-anonymous account entries as shown in FIG. 34, and stores the user data associated with the account within the database 3351. While the database 3351 is illustrated as a table for simplicity of explanation, the actual database structure may include multiple interrelated tables and/or may use other types of data storage structures. The underlying principles of the invention are not limited to any particular database or data storage arrangement.

After the user account has been made non-anonymous, the IoT service/IoT app may prompt the user for additional information as needed. For example, if the user chooses to access a service or transaction which requires a fee, the IoT app may prompt the user to enter financial account information (e.g., a credit card, paypal account, etc), which it may then securely store in the database 3351.

One embodiment of the invention is specifically tailored to allow a first user to configure a plurality of IoT devices for a second user, and then transfer those IoT devices to an anonymous or non-anonymous account of the second user on the IoT service 120. For example, the first user may be a professional installer who uses a first mobile device (his/her own device) with an IoT app to configure a plurality of IoT devices for the second user (e.g., by capturing association IDs as described). Once all of the IoT devices have been provisioned on the IoT service 120 and associated with the first user's account, the first user may cause a code to be generated via the IoT app which can then be used to transfer the IoT devices to the second user's account. In one embodiment, a QR code is generated and/or provided by the IoT service 120 in response to the first user's request, submitted via the IoT app (e.g., navigating to a menu item for a device transfer from within the IoT app). Other mechanisms may also be employed to provide the code to the second user such as emailing or texting the code to the second user.

Regardless of how the code is generated or conveyed, in one embodiment, it is associated at the IoT service 120 with the plurality of new IoT devices configured by the first user on behalf of the second user. In one embodiment, when configuration of the IoT devices is complete, the first user displays the QR code on the screen of the first mobile device. The second user then opens the IoT app and scans the QR code (which, as mentioned, may be generated by the IoT service 120 or by the first mobile device and transmitted to the IoT service 120).

In one embodiment, after verifying the code, the account conversion module 3312 on the IoT service 120 transfers the IoT devices from the first user's account to the second user's account. In one particular implementation, the first user's account is anonymous and the second user's account is (initially) anonymous or non-anonymous, although the underlying principles of the invention are not limited to this implementation. For example, both the first user's account and the second user's account may be anonymous accounts, non-anonymous accounts or a combination, depending on the specific implementation.

Figure 35:
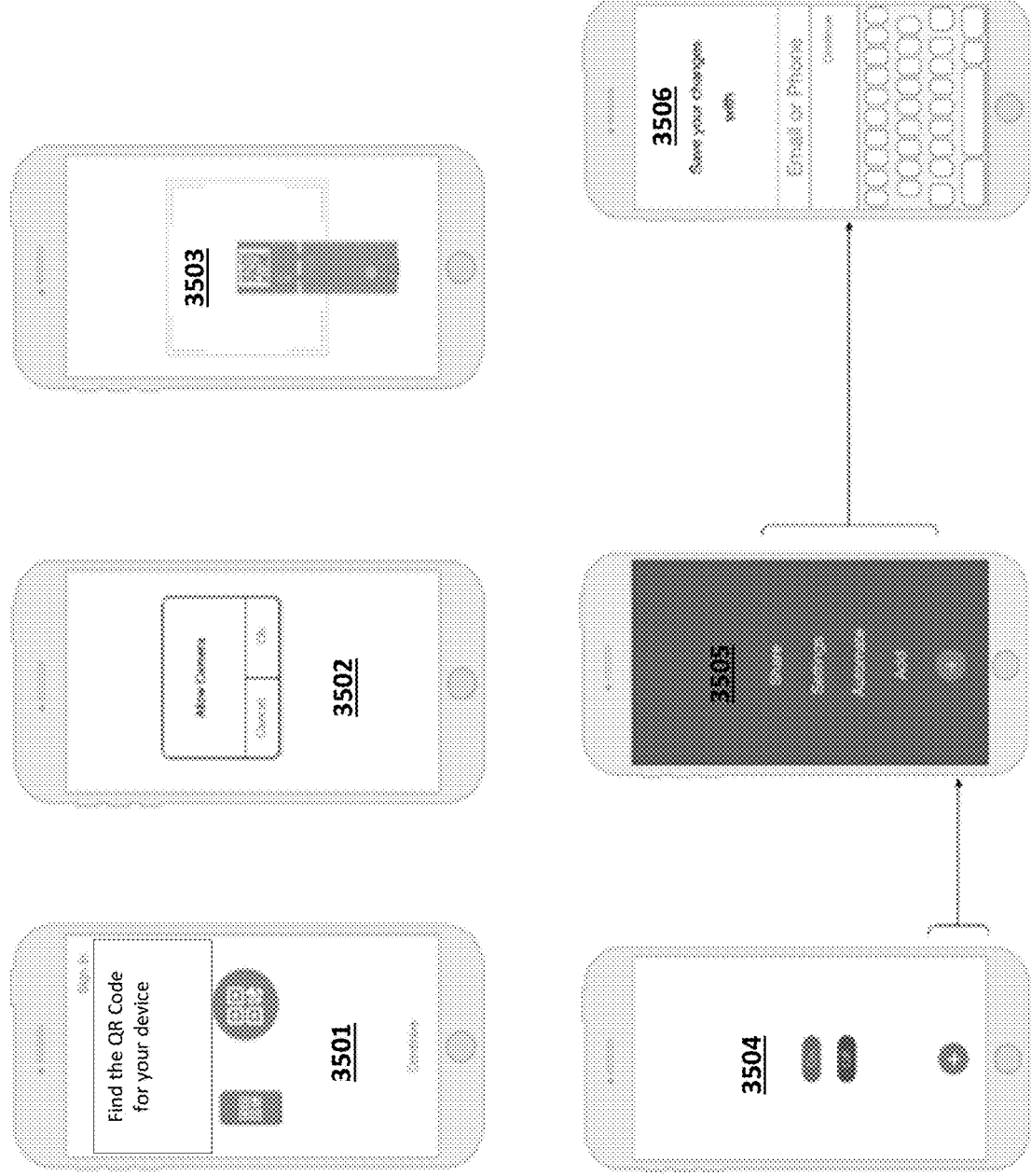
FIG. 35 illustrates a method and user interface for anonymously configuring and controlling IoT devices.

One embodiment of a method and user interface for an exemplary IoT app will be described with respect to FIG. 35. In this example, it is assumed that the user has a new IoT device designed to securely connect with the IoT service (e.g., as described above) and has not yet established an account on the IoT service.

At 3501 the user launches the IoT app on the mobile device which displays instructions to scan the QR code from the IoT device. If the user does not have an IoT hub installed, the IoT app, when executed, performs the functions of an IoT hub (e.g., securely connecting the IoT device to the IoT service as described above). The mobile device OS prompts the user to authorize the use of the camera by the IoT app at 3502. At 3503, the user captures an image of the QR code on the IoT device. A square capture region is outlined within the GUI to aid the user in focusing on the QR code. At 3504, the user is provided with a set of graphical controls to control the IoT device (e.g., ON/OFF in the example) and may also be provided with data collected by the IoT device (depending on the type of IoT device and the implementation) and securely transmitted through the IoT service. Thus, in this example, the user gains secure, bi-directional access to the IoT device prior to establishing an account on the IoT service and entering any personal information. In one embodiment, this is accomplished by the anonymous account generation module 3311 generating an anonymous account when the user scans the QR code and associating the IoT device ID/association ID with the anonymous account.

Upon selecting the "+" icon in 3504, the user is presented with a menu as shown in 3505 which includes various options, some of which may require the user to submit personal information at 3506. For example, the user may enter an email address or phone number. In response, the account conversion logic 3312 may convert the anonymous account to a non-anonymous account as described above with respect to FIG. 34.

Figure 36A:
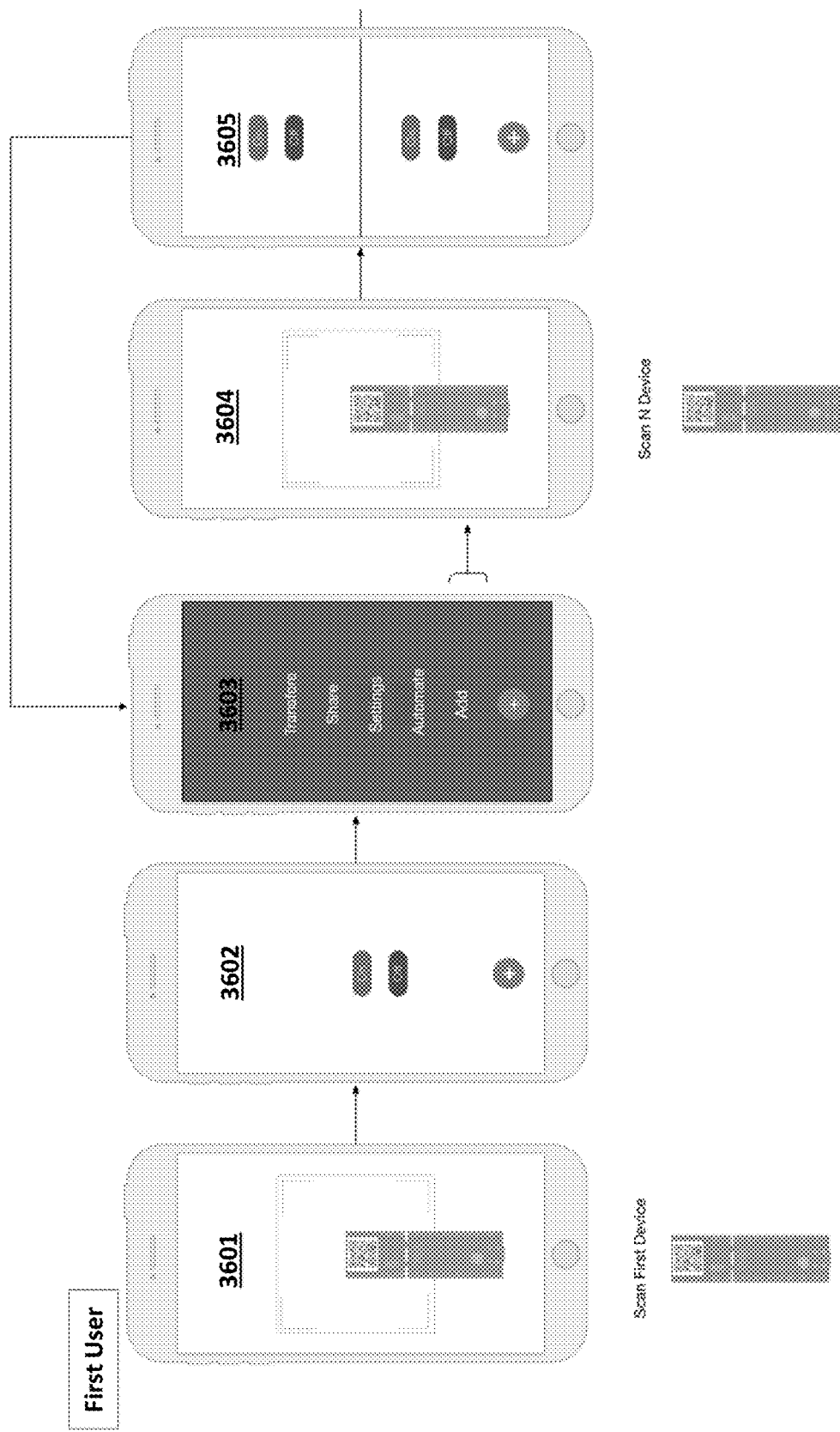
FIGS. 36A-B illustrate one embodiment in which a first user configures IoT devices and transfers the IoT devices to the account of a second user.

A method and an exemplary user interface through which a first user configures IoT devices on behalf of a second user will be described with respect to FIGS. 36A-B. Referring first to FIG. 36A, at 3601, the first user scans a first IoT device, resulting in control graphics shown in 3602. The first user opens a menu at 3603 and choses to add another IoT device at 3604. Upon scanning the second device, two sets of control graphics are shown in 3605 (one for each device). As indicated by the arrow, the first user may continue to return to the menu and add devices. As each device is added, the IoT service 120 is updated as described above. For example, if the first user has a non-anonymous account, then the data for each of the IoT devices is stored within the database 3351 and associated with the first user's account. If an anonymous account is being used, then the first user may convert to a non-anonymous account by entering personal information (e.g., such as an email address or phone number).

Figure 36B:
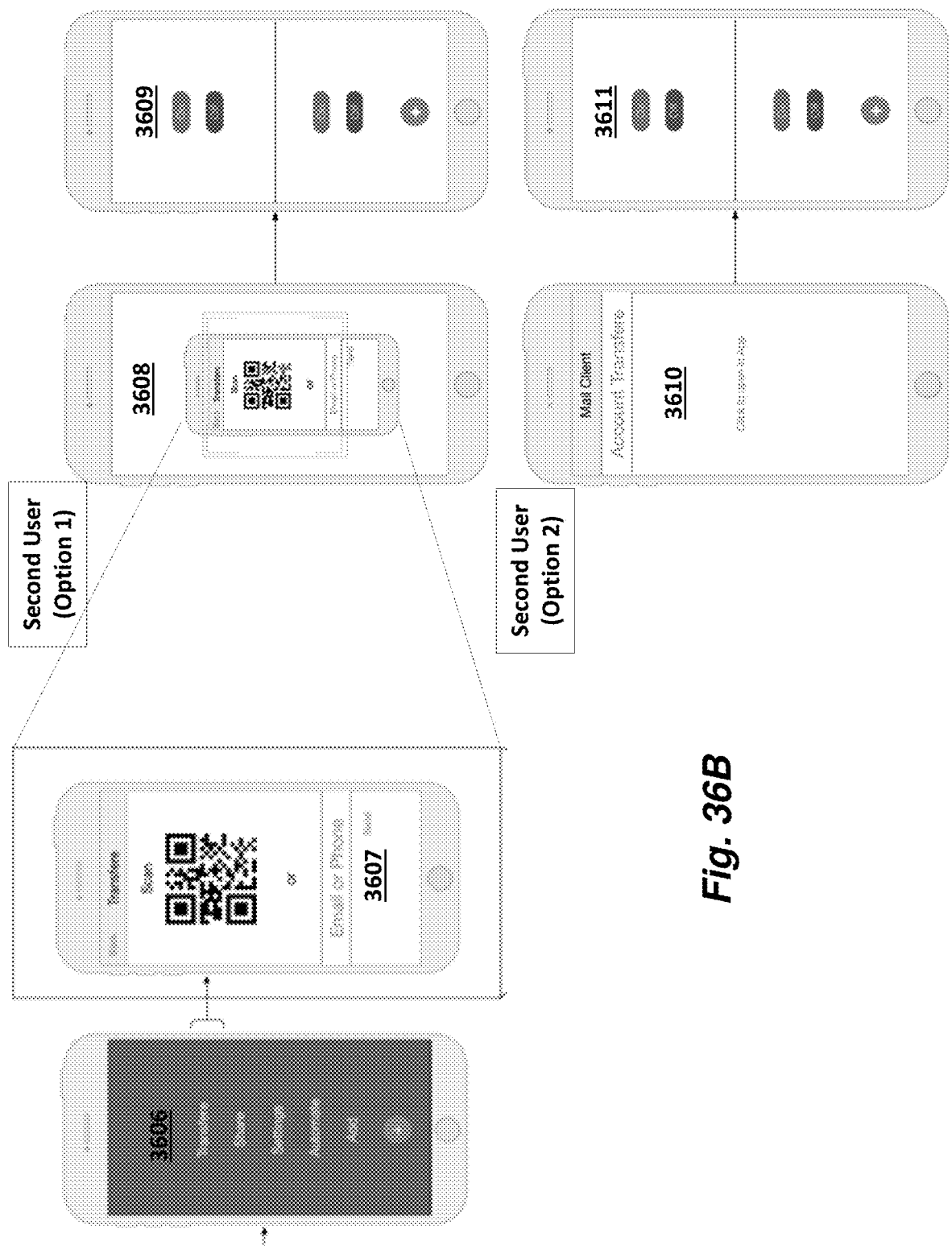

Turning to FIG. 36B, when all of the IoT devices have been configured, the first user may select the "transfer" option from the menu at 3606 to transfer the IoT devices to the second user's account. As illustrated, different options may be available for the transfer. In one embodiment (option 1), a QR code is displayed on the first user's mobile device as previously described. The code may be generated by the account conversion logic 3312 on the IoT service in response to the first user selecting the "transfer" menu item. Once generated, it may be associated in the database 3351 with the set of IoT devices configured by the first user. At 3608, the first user may scan the QR code using the IoT app which will then transmit the code to the IoT service. Upon confirming the code, the account conversion logic 3312 then transfers the IoT devices associated with the code and the first user's account to the second user's account, resulting in the control graphics shown at 3609 (two sets of control graphics for two IoT devices in the example).

Alternatively, or in addition, at 3610 the first user may enter identification information associated with the second user such as the second user's email address or account number, or may manually send the second user the QR code (e.g., via email or text). Upon accessing the IoT service via the IoT app and providing the necessary information, the second user is presented with the same set of control graphics at 3611 as the IoT devices are transferred to the second user's account.

Figure 37A:
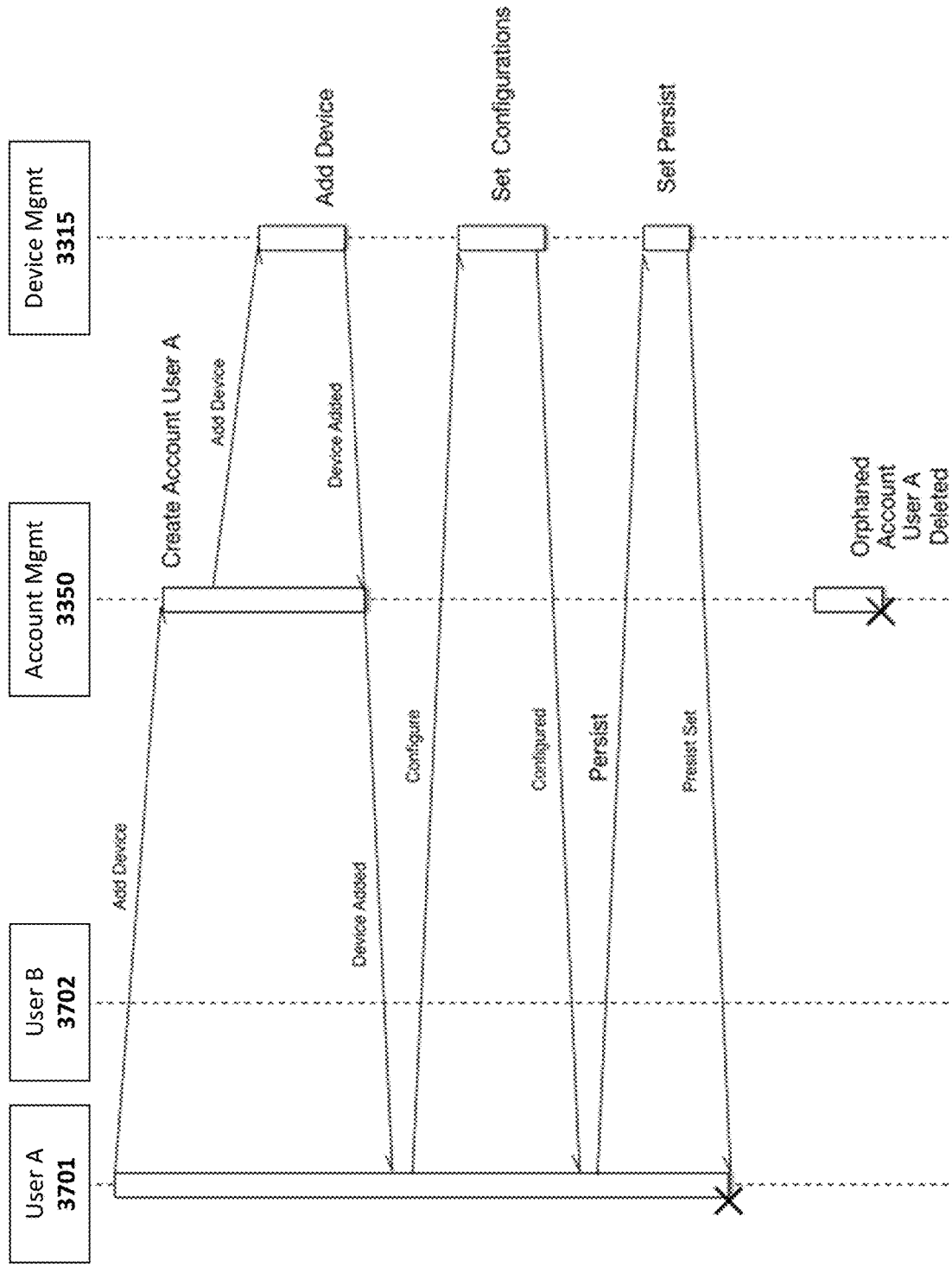
FIGS. 37A-B and 38A-B are transaction diagrams illustrating various embodiments of the invention.
Figure 37B:
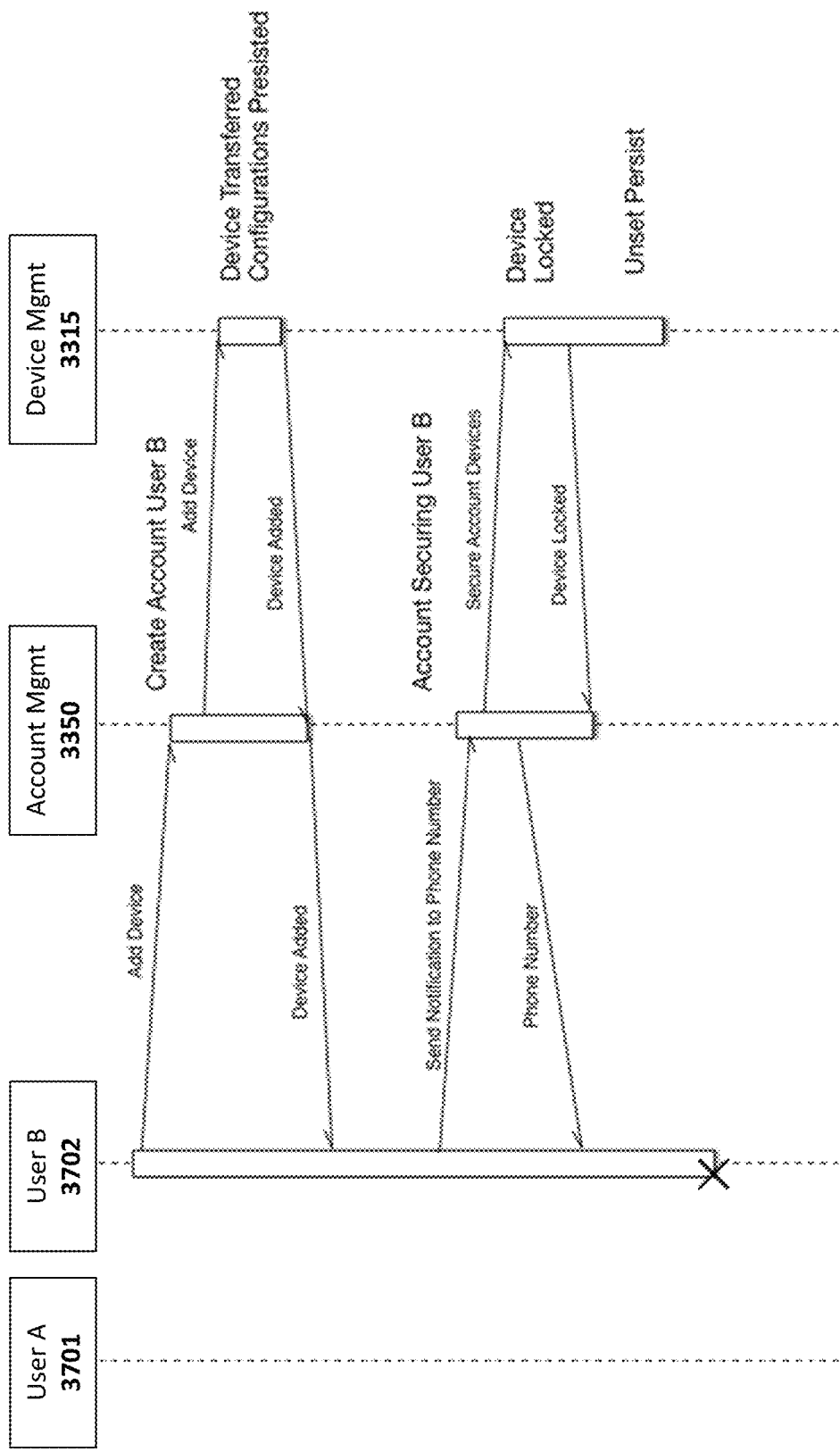

FIGS. 37A-B are transaction diagrams illustrating different embodiments of the invention in which two users, User A 3701 and User B 3702, implement IoT device management operations via communication with the account management module 3350 and device management module 3315. It is assumed that each user has the IoT app installed on a computing device which performs the illustrated transactions.

In the example in FIGS. 37A-B, User A 3701 adds, configures, and persists the configuration for a device on behalf of User B 3702. In this example, User A performs its operations with an anonymous user account but is still provided with the ability to configure and persist multiple devices. As used herein, persisting a configuration means that the configuration of the devices survives device transfers. For example an IoT thermostat can be installed by a professional installer (User A) and configured with Wifi credentials and schedules without having to share account user names and passwords of the end user's device account (User B). The end user only needs to associate the device to get started with the pre-configured IoT device. In another embodimennt, User A may performs its operations configuring the IoT devices in a non-anonymous user account and then transfers the configuration to User B.

In FIG. 37A, User A 3701 initially uses the IoT app to add a new IoT device (e.g., by capturing the QR code as described above). The "add device" command is received by the account management module 3350 which creates an anonymous account for User A and transmits a command to "Add Device" to the device management module 3315, which adds the new IoT device to the database and notifies the account management module 3350. As mentioned, in one embodiment, this is accomplished by using the association ID to identify the device ID and securely transmitting the device ID to the account management module 3350 and/or User A 3701.

User A then performs a configuration of the IoT device and the device management module 3315 sets the configuration data and provides notifications to User A 3701. When configuration is complete, User A generates a persist command (e.g., via the IoT app user interface) which causes the device management module 3315 to persist the configuration for each of the configured IoT devices. User A's orphaned, anonymous account may subsequently be deleted, but the IoT device configurations persisted by the device management module 3315.

A mentioned, these IoT device configurations may be associated with a code in the database which, when entered/captured by User B's IoT app, will transfer the configured IoT devices to User B. For individual IoT devices the code may be the device ID/association ID. Thus, as shown in FIG. 37B, User B 3702 generates an "Add Device" command via the IoT app which is transmitted to the account management module 3350. The command identifies the IoT device and, in response, the account management module 3350 creates an anonymous account for User B 3702. The device management module 3315, upon receiving the command, transfers the persisted device configurations to User B's account, and transmits a notification to the account management module 3350 and to the IoT app of User B.

In one embodiment, once an account is linked to an email or phone number (i.e., becomes a non-anonymous account), no further transfers of the devices associated with that account are permitted without the user's consent. Thus, when User B 3702 transmits a notification using a phone number, the account management module 3350 converts the account to a non-anonymous account and transmits a notification to the device management module 3315 to secure the IoT devices associated with the account. The device management module 3315 locks the devices and notifies the account management module 3350.

Figure 38A:
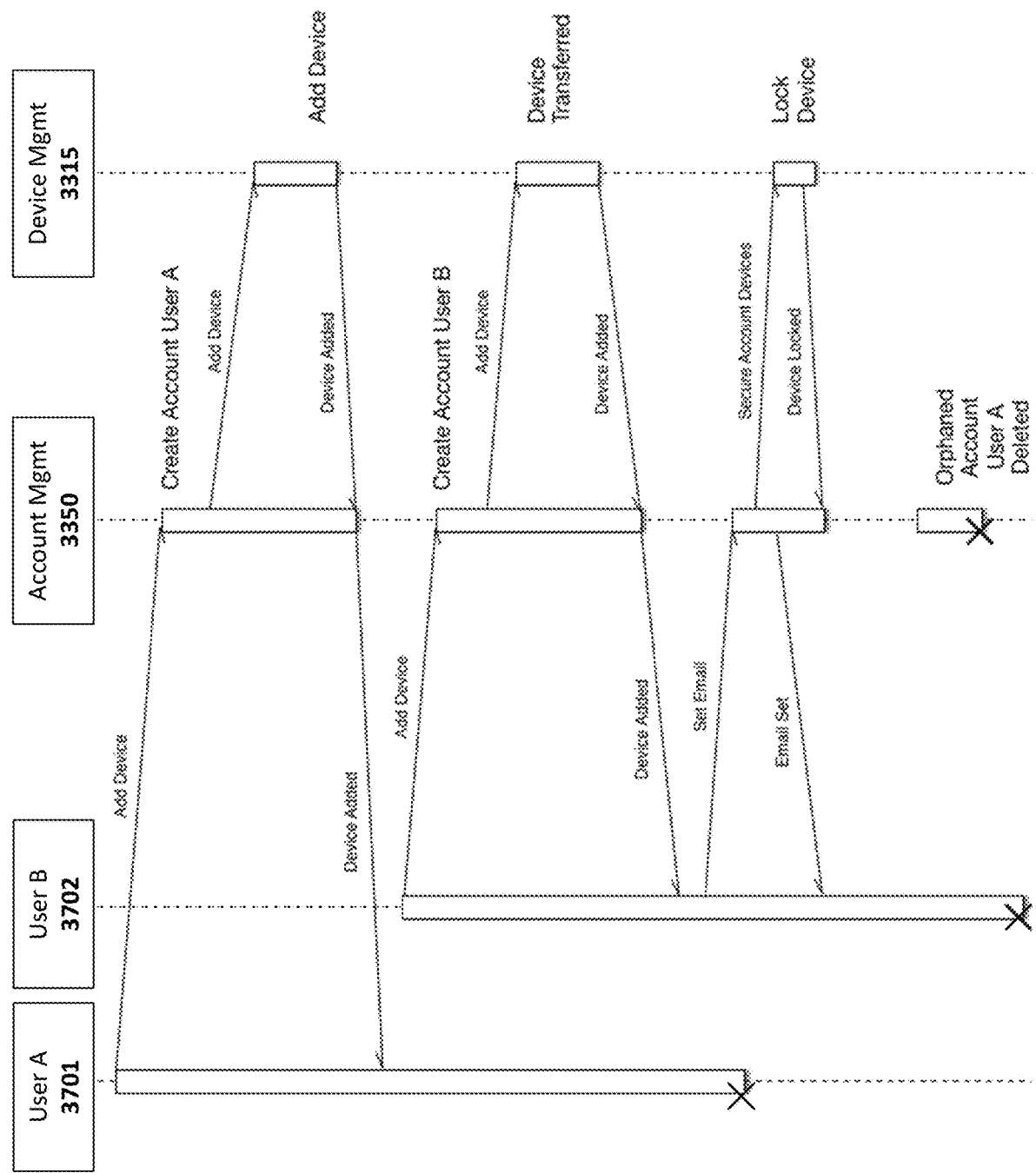
Figure 38B:
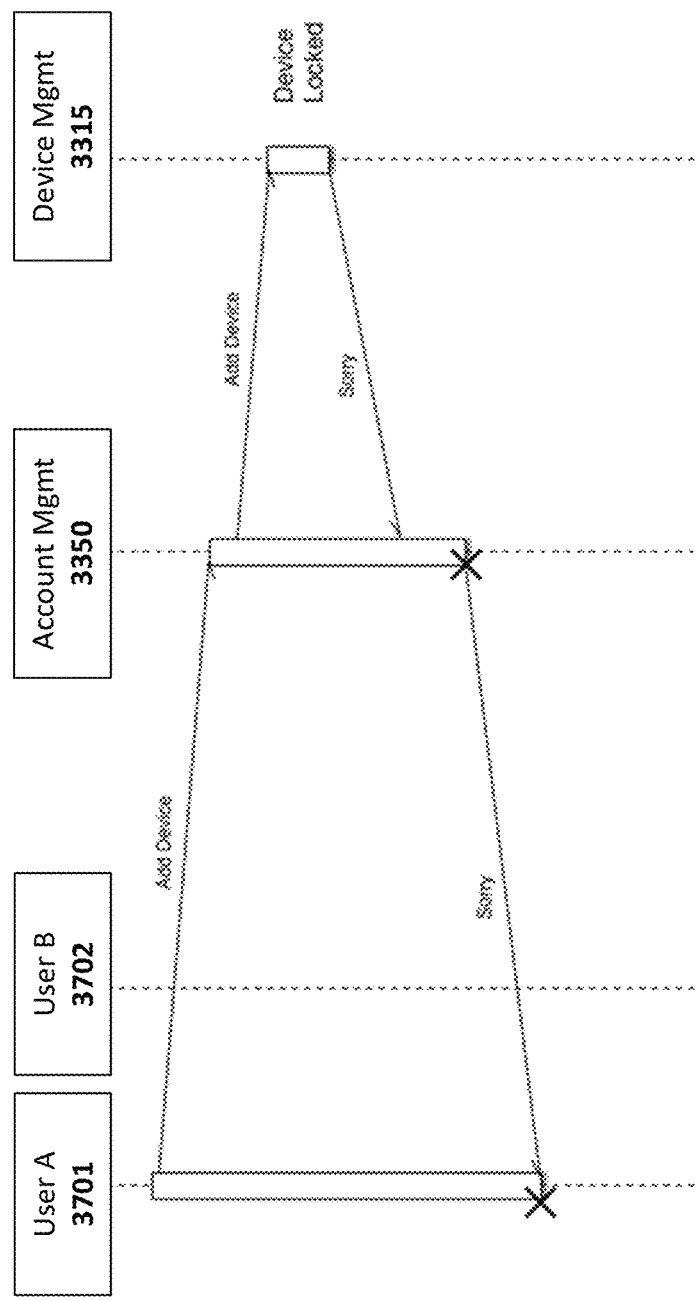

FIGS. 38A-B illustrate an example in which User A 3701 adds an IoT device which is added to an anonymous account (e.g., scanning a QR code of the IoT device). Subsequently, User B 3702 adds the same IoT device. Because the IoT device is associated with an anonymous account, the device management module 3315 transfers the device to the new account created for user B. User B 3702 then associates an email address with the anonymous account. The account management module 3350 informs User B that the non-anonymous account was created and responsively converts the account to a non-anonymous account. It sends a message to the device management module 3315 to secure the IoT device. The device management module 3315 locks the IoT device and notifies the account management module. The account management module 3350 subsequently deletes the orphaned account of User A. As illustrated in FIG. 38B, once the device management module 3315 has locked the device on behalf of User B's account, a subsequent attempt by User A to add the device will be unsuccessful.

In one embodiment, to provide the user with additional IoT device/service benefits, the IoT app on the client can encourage the user to turn their anonymous account into a non-anonymous, linked account. By linking the account to an email or a phone number the user is provided with the ability to recover the account even after a client session has expired. Adding a phone or email to the account can also enable benefits such as notifications, sharing with other users, sending a payment receipt, and/or creating device rules.

In one embodiment, the architecture described above allows public use IoT devices which may be temporarily associated with users who install the IoT app. By way of example, and not limitation, public use IoT devices may include parking meters, vending machines, and/or a self-driving cars. As discussed above, one embodiment of the invention provides immediate use of an IoT device through creation of an anonymous account and also offers account linking to send a receipt to a phone number or email address. This implementation will help to drive account adoption and data analytics.

In one embodiment, when a device Is linked to a phone number or an email the user can "share" the device with other accounts. For example, the GUI menu at 3505 in FIG. 35 includes a "Share" option. The first user may select this option and enter identification information for a second user (e.g., email address, telephone number) to share one or more IoT devices with the second user. When sharing, an IoT device can be controlled by both users.

In contrast, in one embodiment, the "transfer" option (see, e.g., 3606 in FIG. 36B) in combination with the automatic account creation as described above (i.e., creating an anonymous account once a user has in response to receipt of user data) makes it easy to lend a device where the owner gives up direct control of the device to another user account but is maintained as the owner of the IoT device by the account management logic 3350 (and can thus revoke the loaned IoT devices). One embodiment implements different forms of "transfers." For example, a permanent transfer may transfer the IoT devices from the first user's account permanently to the second user's account. Once transferred, the first user does not regain control of the IoT devices unless the second user transfers them back to the first user. In contrast, the embodiments discussed below implement a temporary transfer (i.e., a device loan), where the first user transfers control of the IoT devices to the second user for a specified time period. In one embodiment, the first user is prevented from accessing the IoT devices when they are loaned to the second user.

Figure 39:
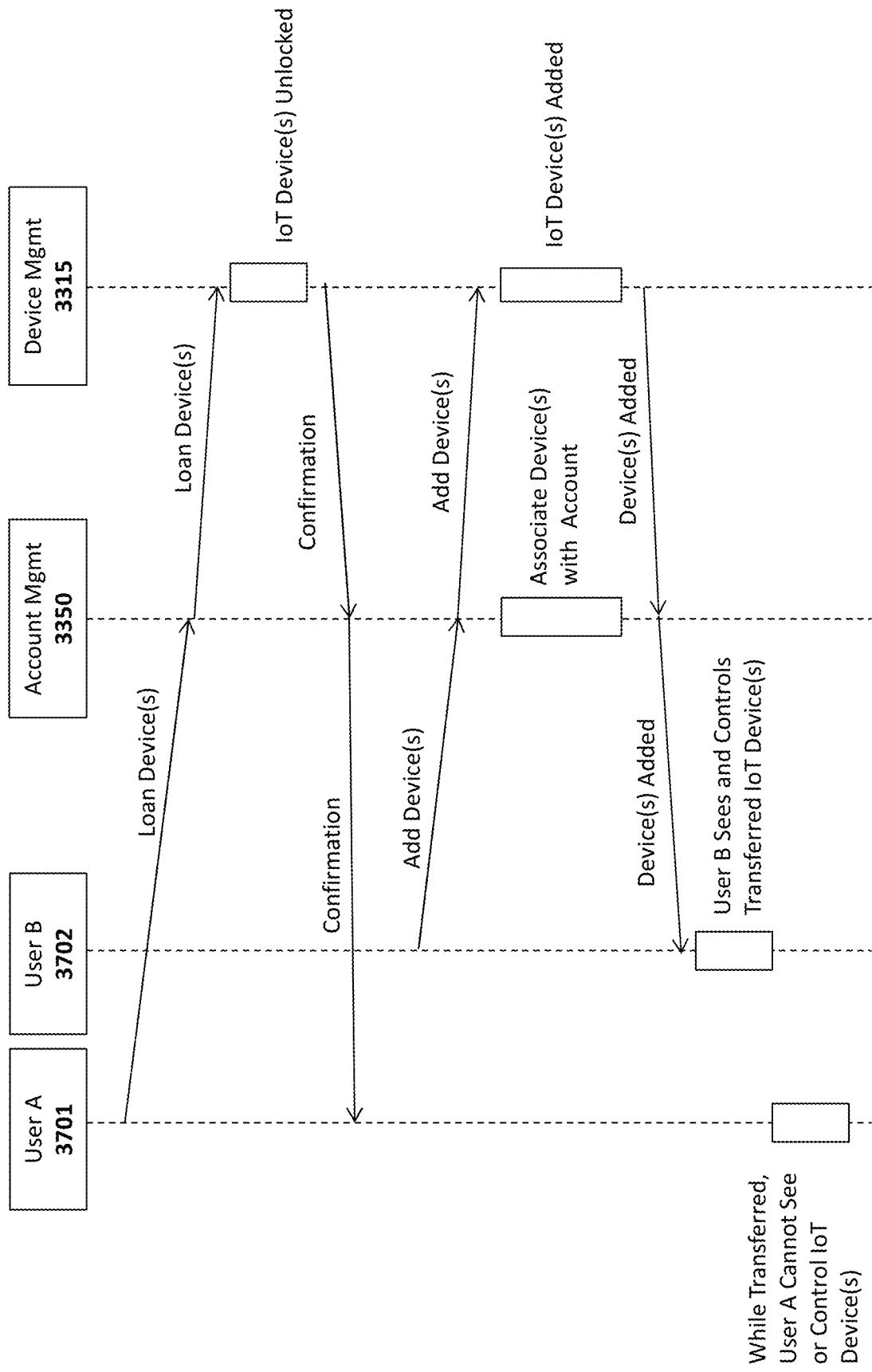
FIG. 39 illustrates a series of transactions in which a first user (User A) loans one or more IoT devices to a second user (User B)

In particular, FIG. 39 illustrates a series of transactions in which a first user (User A) loans one or more IoT devices to a second user (User B). User A in this example, who is the owner of the IoT device(s), sends a "loan devices" command to the account management logic 3350 which authorizes the device transfer operation. As mentioned, a "loan" may be defined as a temporary device transfer. The device management logic 3315 then unlocks the IoT devices, allowing the IoT device(s) to be associated with another account (anonymous or non-anonymous).

User B subsequently adds one or more of the IoT device (s) (e.g., by capturing QR codes). In response, the account management logic 3350 authorizes the operation and creates an account for User B (an anonymous account if User B does not have an account). Upon receipt of the authorization from the account management logic, the device management logic 3315 then adds the devices to User B's account and generates a confirmation. User B may then view and control any of the transferred IoT devices. In contrast, User A is temporarily prevented from viewing or controlling the IoT devices.

Thus, using device lending as described above, device configurations can persist but the current user with access to the IoT devices is ensured to be the only one controlling the IoT devices at any time. This embodiment may be particularly useful in situations where privacy is a concern. For example, when a house equipped with IoT devices is rented out (e.g., using Airbnb or a similar service), the renters may need temporary access to the IoT devices (e.g., thermostats, security devices, video cameras, etc). A renter would likely be concerned if the property owner retained access to the IoT devices while the renter is there. Using the techniques described herein, the property owner can assure the renter that all of the IoT devices, including the security devices and video cameras, have been temporarily transferred to the renter, thereby preventing access by the property owner during the rental period.

Device lending may be achieved either by lending to a specific user account or to anyone (i.e., an anonymous user account). The embodiments described above simplifies the device transfer process. The property owner simply enables the lending to any tenant without exchanging any account information. The tenant would then be able to take control of the IoT devices without further instructions.

Due to the anonymous nature of anonymous accounts described herein, the need for passwords is essentially eliminated. There might still be a need to log in to multiple devices at the same time where the device does not have access to the email or phone number. To add this feature, the user may set a password and even enter a username which is not an email.

System and Method for Machine Learning (ML)-Based IoT Device Provisioning

To install a new IoT device, a user typically installs and executes an IoT device app, which steps the user through the installation process based on a script. At a particular stage in the installation process, the IoT device app prompts to the user to capture a QR code or other optical code from the surface or display of the IoT device. Once the optical code is captured, this identification information allows the IoT device app and/or IoT service to uniquely identify the IoT device, securely communicate with the IoT device (e.g., as described above for various embodiments), and/or register the IoT device with the IoT service.

However, current implementations provide inadequate solutions when the user cannot locate the optical code. In some implementations, for example, the IoT device app asks the user to select the IoT device model via a series of drop-down selection fields, or by entering a known portion of the model number. This can be a challenge, given the potentially large number of IoT device models manufactured by the same company, some of which may be similar in appearance and/or which may have similar functionality.

To address these limitations, embodiments of the invention use object recognition techniques to identify the IoT device model. In particular, at this stage of the setup process, the IoT device app asks the user to capture at least one image of the IoT device. The IoT device app forwards the image(s) to the IoT service, which performs image recognition using a pre-trained, ML-based image recognition engine. The IoT service then transmits information indicating the IoT device model number to the IoT device app, which uses the information to complete the setup process.

Figure 40:
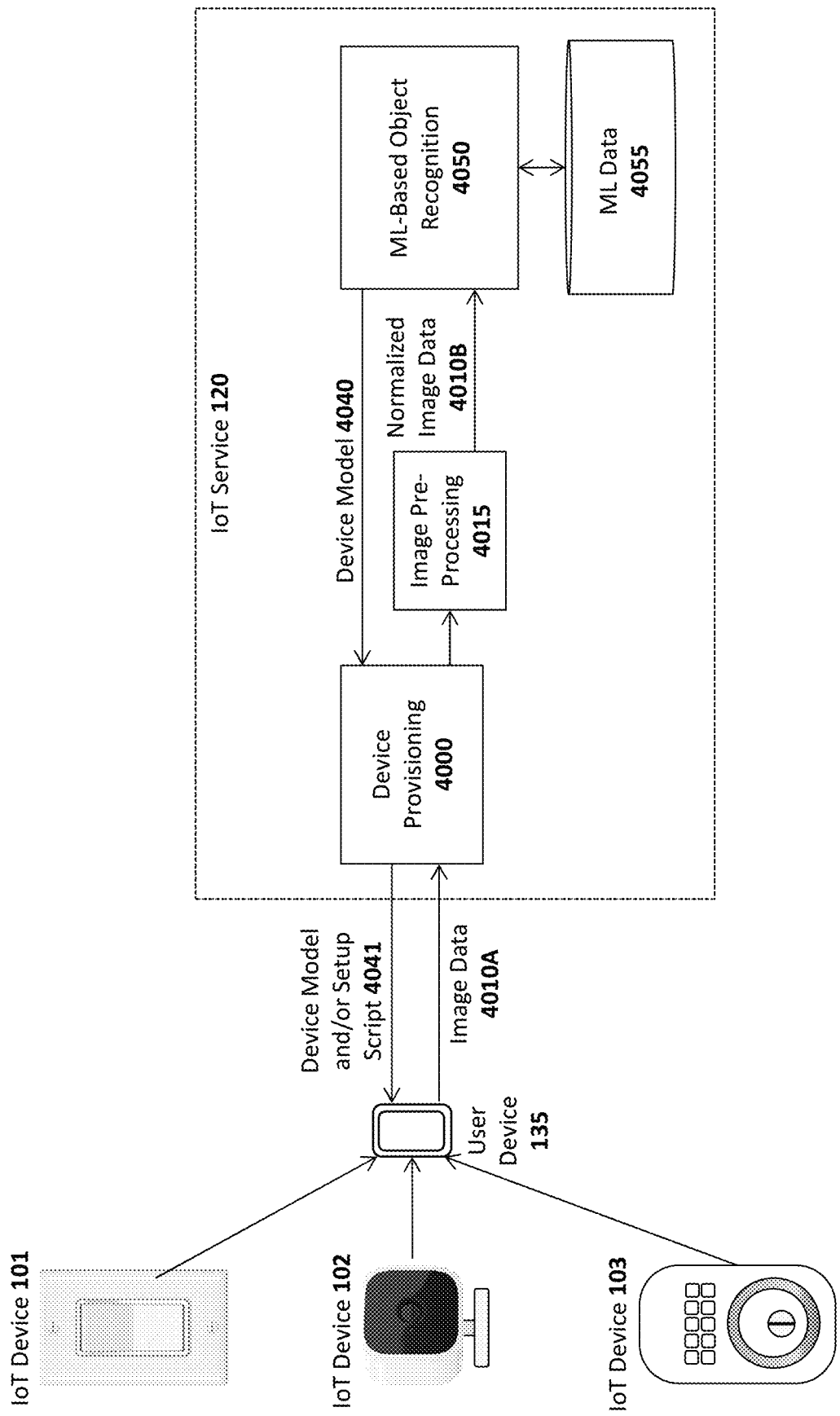
FIG. 40 illustrates one embodiment of a process for machine-learning (ML)-based IoT device detection and provisioning.

By way of example, and not limitation, FIG. 40 illustrates an example of three different IoT devices: a wall switch 102, a video camera 102, and a door lock 103. If an optical code is not available when setting up one of these devices, the IoT device app executed on the user device 135 prompts the user to capture one or more images of this particular IoT device 101 102, or 103.

The IoT device app transmits the image data 4010A over a secure connection to device provisioning logic 4000 on the IoT service 120. In one embodiment, the device provisioning logic 4000 operates as an interface between the IoT device 101-103 and IoT service 120 during the setup process. Image pre-processing 4015 may be performed to normalize the image data received from different types of user devices. For example, the input image may be scaled to a particular resolution and/or the image file may be translated into a new format with particular characteristics for processing by the ML-based object recognition engine 4050 (e.g., a particular bit depth, color space, etc).

The normalized image data 40108 is provided to the ML-based object recognition engine 4050 which has been trained with images of the IoT devices sold by the entity operating the IoT service 120 (e.g., as described below with respect to FIG. 41). The device model 4040 identified by the ML-based object recognition engine 4050 is communicated to the device provisioning logic 4000, which responsively communicates the device model and/or additional setup instructions 4041 to the IoT app on the user device. For example, once the IoT device is identified, the user may be asked (via the IoT device app) to perform a series of button presses or turn the IoT device on and off a certain number of times to cause the IoT device to enter into a special setup mode (if it is not in this mode already).

Figure 41:
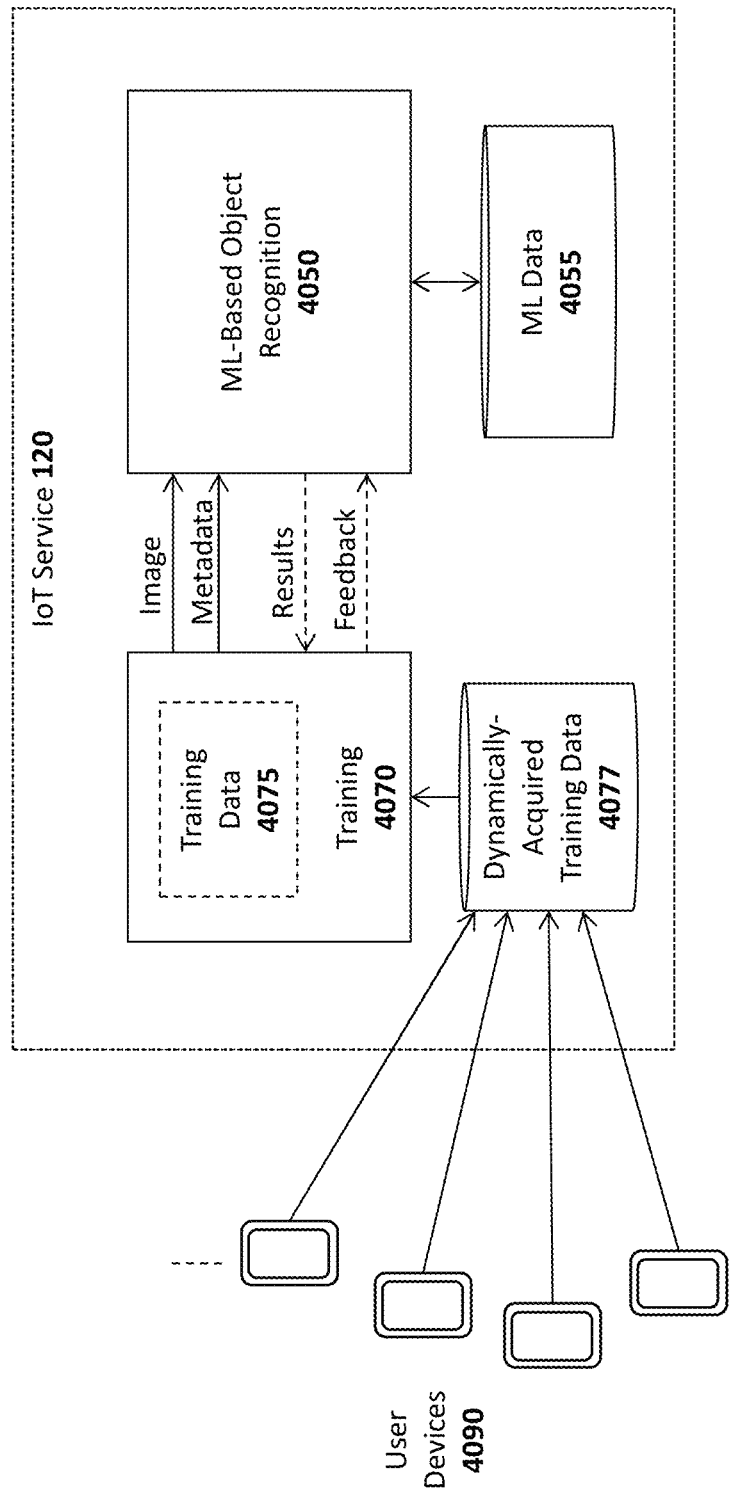
FIG. 41 illustrates one embodiment of an architecture for machine-learning (ML)-based IoT device detection and provisioning.

FIG. 41 illustrates an example of a training sequence. In particular, training logic 4070 uses training data 4075 comprising images and associated metadata to train the ML-based object recognition engine 4050. The training logic 4070 may provide each image and associated metadata identifying the IoT device in each image, which the ML-based object recognition engine 4050 uses to "learn" the object characteristics of each IoT device. In some embodiments, once a certain amount of learning has been accomplished, the ML-based object recognition engine 4050 may indicate results (e.g., identified IoT devices or candidates) to the training module 4070 which may provide feedback to the ML-based object recognition engine 4050 (e.g., indicating whether the correct IoT device was identified) which the ML-based object recognition engine 4050 uses for additional learning.

The ML-based object recognition engine 4050 may continue to learn once operational, as new dynamically acquired training data 4077 is collected from the field and new training data 4075 is provided by the IoT device manufacturer. For example, each time a user captures an image of an IoT device from a user device 4090, and that IoT device has been identified, this information may be used by the training logic 4070 to further teach the ML-based object recognition engine 4050. Moreover, as new IoT device products become available, the training data 4075 associated with these products may be provided directly to the training logic 4070 so that the ML-based object recognition engine 4050 can learn the object characteristics associated with the new IoT devices.

In this manner, the ML-based object recognition engine 4050 learns how to differentiate between the different IoT devices based on object characteristics in the different images. The accumulated learning is stored as ML data 4055 on the IoT service 120. In one implementation, the training data 4075 includes images of each IoT device model, in both an installed state and an uninstalled state (e.g., a wall switch installed in a wall box vs the same wall switch removed from its packaging but not yet installed), so that the IoT devices may be identified at different stages of installation.

While FIGS. 40-41 illustrate an implementation in which the ML-based object recognition engine 4050 is on the IoT service 120, some embodiments may also include ML-based object recognition components on the individual user devices 4090 (e.g., within the IoT device apps). For example, the ML data 4055 generated by the ML-based object recognition engine 4050 may be included and continually updated in the IoT device apps. An object recognition engine within an IoT device app may then use the ML data 4055 to recognize IoT devices locally, without communicating with the IoT service 120. These embodiments may be useful, for example, where a network connection to the IoT service 120 is unavailable. In some embodiments, a portion of the image recognition is performed on the user device 4090 (e.g., for cases where recognition can be done relatively easily), while another portion is done by the ML-based object recognition engine 4050 on the IoT service 120 (e.g., when more intensive operations are required).

Various forms of ML-based object recognition may be performed in accordance with the underlying principles of the invention. For example, the machine learning techniques may be based on artificial neural networks with representation learning. This may include, but is not limited to, convolutional neural networks and other forms of deep learning arrangements. Moreover, the machine learning engines may be trained using supervised learning, semi-supervised learning, unsupervised learning, or any combination thereof (e.g., using different types of machine learning at different training stages).

Figure 42:
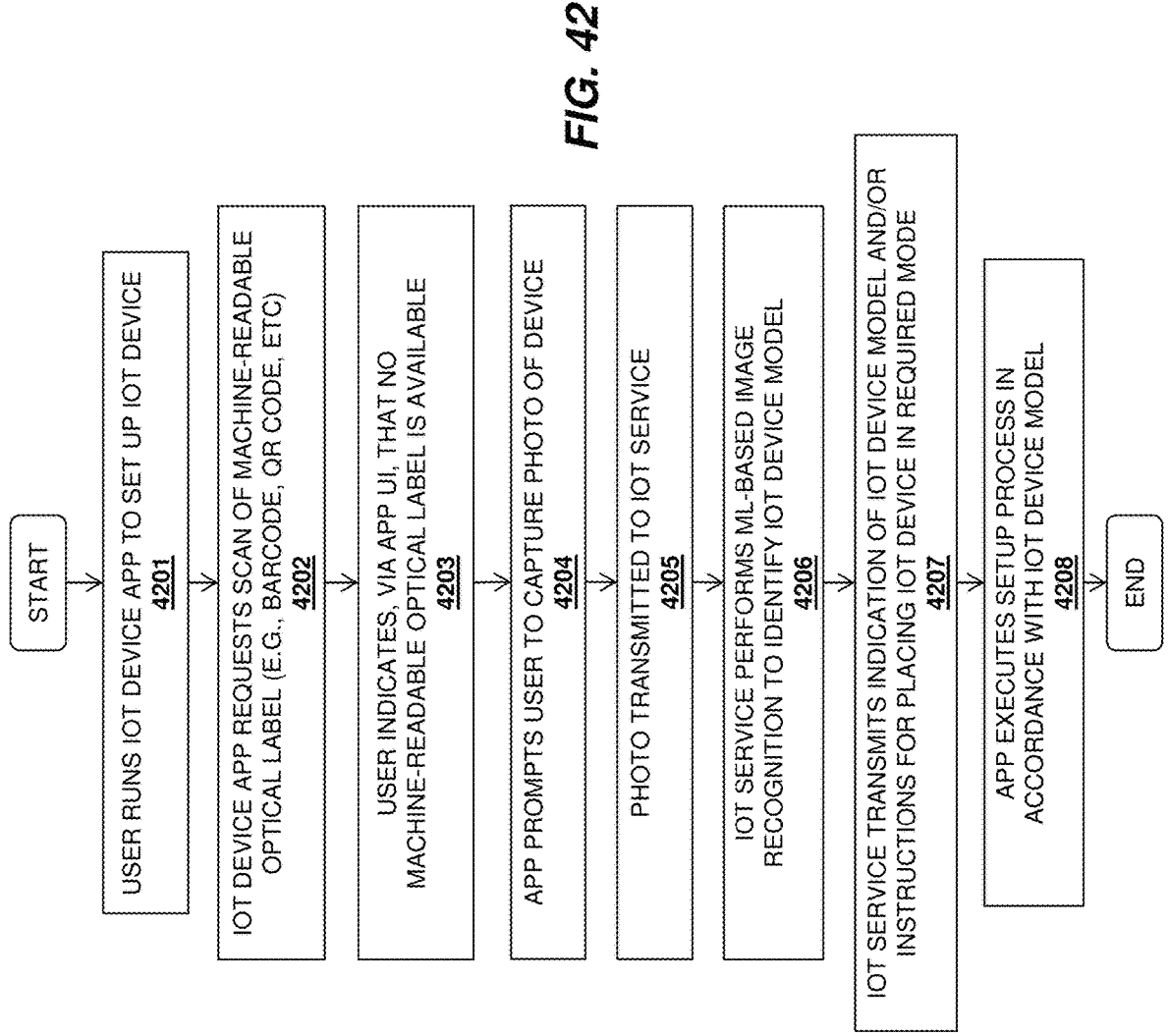
FIG. 42 illustrates a method in accordance with one embodiment of the invention.

A method in accordance with various embodiments of the invention is illustrated in FIG. 42. The method may be implemented within the context of the architectures described herein, but is not limited to any particular IoT service or machine-learning architecture.

At 4201, a user initiates the process to set up a new IoT device (or a previously-owned IoT device) by running the IoT device app on the user's mobile device. At 4202, the IoT device app reaches a stage in the setup process in which the user is asked to scan a machine-readable optical label such as a barcode or QR code. If the optical label is available, then the user scans the optical label and the setup process continues as described with respect to various embodiments above (e.g., establishing a secure communication channel between the IoT device and the IoT service and registering the IoT device).

At 4203, the user indicates via the IoT app that no optical label is available and, at 4204, the IoT device app prompts the user to capture a photo of the IoT device. In one embodiment, the IoT app include an integrated photo capture component which, when provided access to the mobile device camera by the OS, instructs the user to hover the camera a certain distance from the IoT device to capture an image.

At 4205, the photo data (or select portions of the photo data) is transmitted to the IoT service, and at 4206, the IoT service performs ML-based object recognition to identify the IoT device model. As mentioned, the user may be instructed to take additional pictures as needed to ensure that the likelihood of a correct detection result is above a specified threshold (e.g., 80%, 75%, etc).

Once identified, at 4207, the IoT service transmits an indication of the IoT device model and/or additional information such as the process for placing the IoT device in a specified setup mode (although the latter information may be stored on the IoT device and accessed upon identification of the IoT device model). Finally, at 4208, the IoT device app continues to execute the setup process based on the IoT device model.

System and Method for IoT Device Identification and Initialization Using Bluetooth Advertising Channels As described above, low power Bluetooth devices such as Bluetooth Low Energy (BTLE) or BT 5 (hereinafter "BT") devices transmit advertising packets to broadcast connectivity information and establish connections with other BT devices. Embodiments of the invention implement a system of interaction between IoT devices and a mobile app using BT advertising packets to provide the mobile app with an "awareness" of the specific types of nearby devices. With this awareness, the mobile app provides the user with IoT device-specific images, video, audio, and/or instructions during the device onboarding process.

For various reasons, end users may be required to interact physically with IoT devices during the onboarding process. The circumstances may include, but are not limited to, loss of the instruction manual and/or other documentation, the purchase of a previously-owned and returned device (RMA) which may still be bound to the previous owner's account, or the purchase of an IoT device which is required to be placed in a "setup mode" prior to onboarding (usually to assure physical access to the device). In practice, usually this take the form of pressing multiple buttons together, holding down single buttons for some amount of seconds, turning power on and off a number of times, or some other series of interactions that trigger the underlying firmware of the IoT device to enter the setup process.

However, because the various types of IoT devices may take on a virtual endless array of physical hardware forms, there is no standardized way to inform end users of exactly how to interact with any single IoT device. Documentation can be put in original packaging, but this is often lost or otherwise unavailable during the onboard process. In addition, authoring, validating, printing and including custom diagrams for every possible hardware configuration either in writing or in an online experience is not typically feasible.

Other solutions include asking the end user to select the IoT device from a large list of possibilities. For large deployments with many devices, this results in an unpleasant user experience. Many IoT device types look similar to one another, the chances for user error is high, and onboarding frustration leads to higher return rates.

Figure 43:
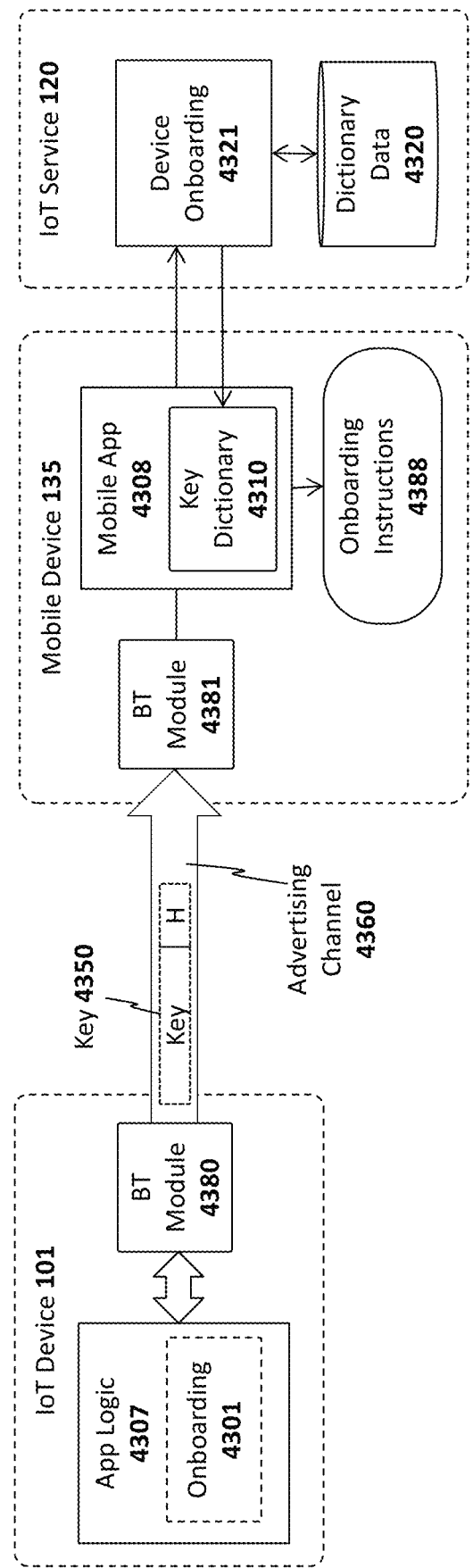
FIG. 43 illustrates an embodiment in which keys received from Bluetooth advertising packets are used to dynamically retrieve setup information.

Referring to FIG. 43, one embodiment of the invention addresses these limitations using BT advertising channels 4360 to provide the mobile app 1902 running on the user's mobile device 135 with an "awareness" of the specific types of nearby devices, such as IoT device 101. In particular, an application 4307 including onboarding logic 4301 may be loaded from firmware and executed on the IoT device 101 (e.g., executed on a microcontroller or other processor of the IoT device 101).

In one embodiment, the IoT device 101 includes a Bluetooth module 4380 implementing a low-power Bluetooth protocol such as BT 5. As previously described, when in the BT advertising mode, the BT module 4380 periodically transmits packets with an advertising payload that can be up to 31 bytes long. In one embodiment of the invention, during its BT advertising sequence, the Bluetooth module 4380 transmits a "key" 4350 over the BT advertising channel 4360 which uniquely identifies the model of the IoT device 101. The key 4350 may be a numerical value sized to fit within the BT advertising data space (e.g., up to 31 Bytes long) and programmed in the BT module 4380 during manufacture. Alternatively, the key 4350 may be programmed in the IoT device firmware (or other non-volatile storage) and provided to the BT module 4380 via the onboarding logic 4301.

Regardless of how the key is formatted, it is received via the BT module 4381 of the mobile device 135 in response to the mobile app 4308. As illustrated, the mobile app 4308 may be securely connected to device onboarding logic 4321 running on the IoT service 120 during the onboarding process. In one implementation, the mobile app 4308 downloads and/or is pre-installed with a key dictionary 4310 that associates various Bluetooth advertising "keys" with IoT device documentation including images, text, video, and/or audio assets, to provide instructions 4388 to the user related to onboarding the IoT device 101. For example, once the IoT device model is identified with the key, the instructions 4388 may identify a series of button presses or other IoT device inputs to cause the IoT device 101 to enter into a setup mode in which it can be successfully configured and associated with the user's account on the IoT service 120.

In one particular implementation, the key dictionary 4310 is a JSON-formatted dictionary, although the underlying principles of the invention are not limited to any particular data format. As new IoT devices are released, new dictionary data and associated keys may be added to a dictionary database 4320 on the IoT service 120, and provided to mobile apps 4308 as required.

In one embodiment, when hardware interaction between the end user and the IoT device 101 is required, the mobile app 4308 will scan the area, via the BT module 4381, looking for Bluetooth devices that are advertising these special keys. If no IoT devices are found, the user may be shown generic information prompting them to move closer to the IoT device and to ensure that the IoT device is powered on. If only one IoT device 101 is found (i.e., detected based on the particular key 4350 received), the mobile app 4308 will display custom instructions 4388 based on that IoT device's key, as specified by the key dictionary 4310.

In one embodiment, the key dictionary 4310 may include per-key hyperlinks or other addresses pointing to device-specific onboarding instructions 4388 including video, audio, images, and/or text to guide the user through the IoT device onboarding process. The key dictionary 4310 may also include or link to text or other content stored locally on the mobile device 135.

If keys from multiple IoT devices are detected by the mobile device 135, one embodiment of the mobile app 4308 will display custom instructions 4388. For example, a prioritized list of IoT devices may be provided based on Bluetooth signal strength (e.g., with IoT devices with the strongest Bluetooth signal at the top of the list). Users may also be shown, via a user interface of the mobile app 4308, additional options if the IoT device shown initially is not the target IoT device 101. In one implementation, any IoT devices which are already associated with the user's account are filtered from the list of available IoT devices.

When the target IoT device 101 is identified, the mobile application 4308 will access the key dictionary 4310 using the key 4350 to identify the IoT device model and produce the onboarding instructions 4388. As described above, the onboarding instructions 4388 may include drawing images, video, audio, and/or text to guide the user through the setup flow.

Figure 44:
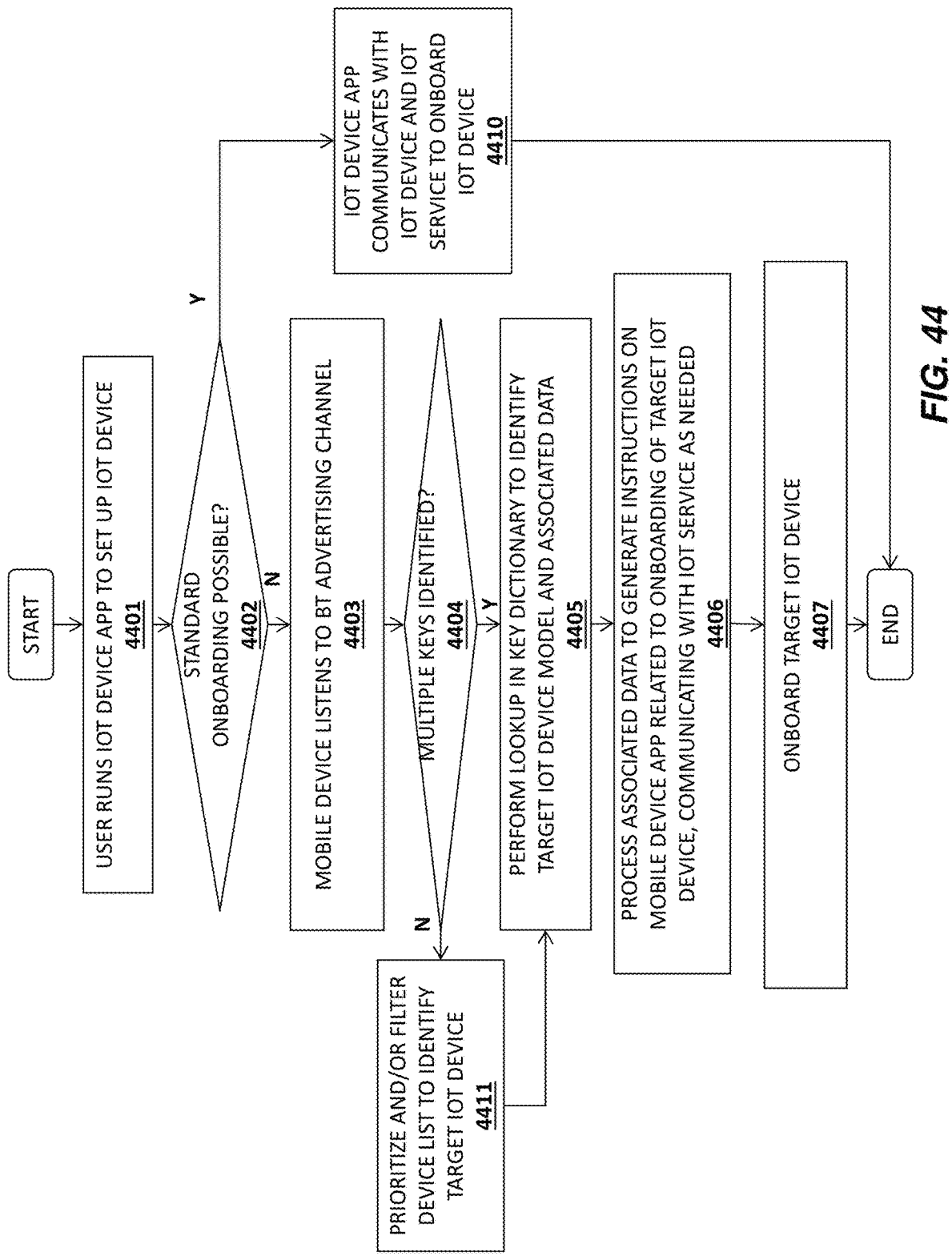
FIG. 44 illustrates a method in accordance with one embodiment of the invention.

A method in accordance with one embodiment of the invention is illustrated in FIG. 44. The method may be performed on the various device and system architectures described above, but is not limited to any particular architecture.

At 4401, the user runs the IoT device app on a mobile device and indicates onboarding of a new IoT device (e.g., via user-selectable menu options). If the IoT device can be identified, determined at 4402, then standard onboarding process can be used and, at 4410, the IoT device app communicates with the IoT device and the IoT service to configure and associate the IoT device with the user's account on the IoT service.

If the IoT device cannot be identified via standard techniques, then in response to the IoT device app, the mobile device listens to BT advertising channels at 4403. If multiple keys are identified, determined at 4404, then at 4411, the list of keys/IoT devices are prioritized and/or filtered as described above. For example, the key/IoT device with the largest signal strength value may be placed at the top of the priority list and/or any IoT devices already associated with the user's account may be filtered out of the list.

Once the target IoT device is identified, the IoT device app performs a lookup in the key dictionary to identify the target IoT device model and/or associated data. For example, the key dictionary may contain links to various forms of instructional content related to the IoT device model including, video, audio, text, and/or images, which are provided via the mobile device at 4406. At 4407, after the configuration process is complete, the target IoT device is fully onboarded and associated with the user's account on the IoT service.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections.

The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system comprising:
   a target Internet of Things (IoT) device to transmit a key over a Bluetooth (BT) advertising channel, the key associated with a model of the target IoT device;
   mobile application program code which, when installed on a mobile device, is to cause the mobile device to listen to the BT advertising channel to extract the key; and
   a key dictionary to be installed on the mobile device, the key dictionary mapping each of a plurality of keys with an IoT device model and associated data, the mobile application program code to perform a lookup using the key extracted from the BT advertising channel to identify the target IoT device model and/or associated data, and to use the associated data for onboarding the target IoT device, the associated data to include hyperlinks or other addresses pointing to device-specific onboarding instructions to register the IoT device with a corresponding user account on an IoT service.

2. The system of claim 1, wherein the associated data is usable by the mobile application program code to provide instructions to the user for configuring the target IoT device and adding the IoT device to the user's account on an IoT service.

3. The system of claim 2, wherein the associated data comprises audio and/or video assets, text, and one or more network links which identify video, audio, text, and/or images to provide the instructions to the user.

4. The system of claim 3, wherein the key dictionary is stored in a JSON data format.

5. The system of claim 2, wherein if multiple keys are extracted from multiple BT advertising channels, then the mobile application program code is to prioritize and/or filter out certain keys to identify the key of the target IoT device.

6. The system of claim 5, wherein the mobile application program code is to filter out keys of IoT devices already associated with the user's account on the IoT service.

7. The system of claim 6, wherein the mobile application program code is to prioritize the keys based on measured signal strength of each of the respective BT advertising channels.

8. The system of claim 1, wherein the mobile application program code is to cause the mobile device to listen to the BT advertising channel to extract the key only if an initial onboarding process is unavailable or unsuccessful.

9. A method comprising:
   transmitting, by a target Internet of Things (IoT) device, a key over a Bluetooth (BT) advertising channel, the key associated with a model of the target IoT device;
   listening to the BT advertising channel, by a mobile device in response to mobile application program code, and extracting the key;
   performing a lookup in a key dictionary using the key extracted from the BT advertising channel, the key dictionary installed on the mobile device and mapping each of a plurality of keys with an IoT device model and associated data;
   identifying the target IoT device model and/or associated data from the key dictionary; and
   using the associated data for onboarding the target IoT device, the associated data to include hyperlinks or other addresses pointing to device-specific onboarding instructions to register the IoT device with a corresponding user account on an IoT service.

10. The method of claim 9, wherein the associated data is usable by the mobile application program code to provide instructions to the user for configuring the target IoT device and adding the IoT device to the user's account on an IoT service.

11. The method of claim 10, wherein the associated data comprises audio and/or video assets, text, and one or more network links which identify video, audio, text, and/or images to provide the instructions to the user.

12. The method of claim 11, wherein the key dictionary is stored in a JSON data format.

13. The method of claim 10, wherein if multiple keys are extracted from multiple BT advertising channels, then the mobile application program code is to prioritize and/or filter out certain keys to identify the key of the target IoT device.

14. The method of claim 13, wherein the mobile application program code is to filter out keys of IoT devices already associated with the user's account on the IoT service.

15. The method of claim 14, wherein the mobile application program code is to prioritize the keys based on measured signal strength of each of the respective BT advertising channels.

16. The method of claim 9, wherein the mobile application program code is to cause the mobile device to listen to the BT advertising channel to extract the key only if an initial onboarding process is unavailable or unsuccessful.

17. A system comprising:
   a target Internet of Things (IoT) device to transmit a key over a Bluetooth (BT) advertising channel, the key associated with a model of the target IoT device;
   mobile application program code which, when installed on a mobile device, is to cause the mobile device to listen to the BT advertising channel to extract the key;
   an IoT service to be connected with the mobile application program code and to install and/or update a key dictionary on the mobile device, the key dictionary mapping each of a plurality of keys with an IoT device model and associated data,
   the mobile application program code to perform a lookup using the key extracted from the BT advertising channel to identify the target IoT device model and associated data, and to use the associated data for onboarding the target IoT device, the associated data to include hyperlinks or other addresses pointing to device-specific onboarding instructions to register the IoT device with a corresponding user account on an IoT service.

18. The system of claim 17, wherein the associated data is usable by the mobile application program code to provide instructions to the user for configuring the target IoT device and adding the IoT device to the user's account on an IoT service.

19. The system of claim 18, wherein the associated data comprises audio and/or video assets, text, and one or more network links to identify video, audio, text, and/or images on the IoT service to be provided as the instructions to the user.

20. The system of claim 19, wherein the key dictionary is stored in a JSON data format.

21. The system of claim 18, wherein if multiple keys are extracted from multiple BT advertising channels, then the mobile application program code is to prioritize and/or filter out certain keys to identify the key of the target IoT device.

22. The system of claim 21, wherein the mobile application program code is to filter out keys of IoT devices already associated with the user's account on the IoT service.

23. The system of claim 22, wherein the mobile application program code is to prioritize the keys based on measured signal strength of each of the respective BT advertising channels.

24. The system of claim 17, wherein the mobile application program code is to cause the mobile device to listen to the BT advertising channel to extract the key only if an initial onboarding process is unavailable or unsuccessful.

* * * * *